US012260748B2

(12) United States Patent
Hehn et al.

(10) Patent No.: US 12,260,748 B2
(45) Date of Patent: Mar. 25, 2025

(54) METHOD, SYSTEM, MODULE AND SOFTWARE FOR INTELLIGENTLY GOVERNING A MULTI-WAY STOP INTERSECTION

(71) Applicants: AUDI AG, Ingolstadt (DE); VOLKSWAGEN AKTIENGESELLSCHAFT, Wolfsburg (DE)

(72) Inventors: Thorsten Hehn, Ingolstadt (DE); Joerg Plechinger, Munich (DE); Daniel Pfaller, Wettstetten (DE); Markus Mueller, Hohenwart (DE); John Walpuck, West Bloomfield, MI (US); Jovan Zagajac, Ann Arbor, MI (US); Hendrik-Joern Guenther, Peine (DE); Kevin Lieberman, Belmont, CA (US)

(73) Assignees: VOLKSWAGEN AKTIENGESELLSCHAFT, Wolfsburg (DE); AUDI AG, Ingolstadt (DE)

( * ) Notice: Subject to any disclaimer, the term of this patent is extended or adjusted under 35 U.S.C. 154(b) by 769 days.

(21) Appl. No.: 17/420,506

(22) PCT Filed: Jan. 3, 2020

(86) PCT No.: PCT/EP2020/050091
§ 371 (c)(1),
(2) Date: Jul. 2, 2021

(87) PCT Pub. No.: WO2020/141220
PCT Pub. Date: Jul. 9, 2020

(65) Prior Publication Data

US 2022/0084399 A1 Mar. 17, 2022

Related U.S. Application Data

(60) Provisional application No. 62/788,382, filed on Jan. 4, 2019.

(51) Int. Cl.
*G08G 1/01* (2006.01)
*G07C 5/06* (2006.01)
*G08G 1/16* (2006.01)

(52) U.S. Cl.
CPC ............. *G08G 1/0145* (2013.01); *G07C 5/06* (2013.01); *G08G 1/0125* (2013.01); *G08G 1/166* (2013.01)

(58) Field of Classification Search
CPC .... G08G 1/0145; G08G 1/0125; G08G 1/166; G08G 1/0967; G08G 1/162; G07C 5/06
See application file for complete search history.

(56) References Cited

U.S. PATENT DOCUMENTS 6,169,495 B1 * 1/2001 Koike ................ G08G 1/09675 340/436
9,818,299 B1 11/2017 Jammoussi et al.
(Continued)

FOREIGN PATENT DOCUMENTS

CN 103390354 A 11/2013
CN 105139677 A 12/2015
(Continued)

OTHER PUBLICATIONS

Written Opinion of the International Searching Authority and International Search Report dated Apr. 15, 2020 for International Application No. PCT/EP2020/050091, 14 pages.
(Continued)

*Primary Examiner* — Aniss Chad
*Assistant Examiner* — Chase L Cooley
(74) *Attorney, Agent, or Firm* — STAAS & HALSEY LLP

(57) ABSTRACT

Movement of vehicles through an intersection relative to one another is actively coordinated. The coordination includes sharing data among the vehicles using Vehicle-to-Every-
(Continued)

thing messaging technology. The shared data is used to sequence the movement of the vehicles through the intersection.

14 Claims, 32 Drawing Sheets

(56) References Cited

U.S. PATENT DOCUMENTS

| | | | | |
|---|---|---|---|---|
| 10,684,626 | B1 * | 6/2020 | Martin | G08G 1/0962 |
| 2013/0018572 | A1 * | 1/2013 | Jang | G08G 1/164 701/119 |
| 2013/0304279 | A1 | 11/2013 | Mudalige et al. | |
| 2017/0256167 | A1 | 9/2017 | Kim et al. | |
| 2019/0279508 | A1 * | 9/2019 | Wang | H04W 4/46 |

FOREIGN PATENT DOCUMENTS

| | | | |
|---|---|---|---|
| CN | 105957376 | A | 9/2016 |
| CN | 106871915 | A | 6/2017 |
| CN | 107730883 | A | 2/2018 |
| CN | 107958612 | A | 4/2018 |
| CN | 108877268 | A | 11/2018 |
| JP | 2017-21735 | A | 1/2017 |
| WO | 2012/009620 | A1 | 1/2012 |

OTHER PUBLICATIONS

Chinese Office Action dated Oct. 8, 2022 for Chinese Application No. 202080015752.9.

Jia-peng Li; "Research on Vehicle Guidance and Optimization System of Unsignalized Intersection Based on Petri Net Model", Software Guide, vol. 17, No. 8, Aug. 2018; 7 pages.

Ziru Zheng; "Research of Unsignalized Intersection Optimal Control Method in Intelligent Vehicle Infrastructure Cooperative Systems", Full Text Database of Outstanding Master's Dissertations in China (Master's) Engineering Science and Technology II, No. 6, Jun. 2015; 96 pages.

* cited by examiner

Map matching & HV state provider

On cycle:

- create and populate HV Data
- perform map matching, determine offset to closest lane
- determine HV current lane
- determine HV target lane based on turn signal status
- determine distance to stop location
- perform ETA estimation Compare Intended direction of $V_1$ Start position of $V_2$ with respect to $V_1$ + Intended direction of $V_2$ relative to start position of $V_2$

| | ↑ | → | ← |
|---|---|---|---|
| No others | ✓ | ✓ | ✓ |
| R↑ | | ✓ | |
| R→ | | ✓ | |
| R← | | ✓ | |
| L↑ | | | |
| L→ | ✓ | ✓ | ✓ |
| L← | | | |
| A↑ | ✓ | ✓ | |
| A→ | | ✓ | |
| A← | | | |

```
function Compare(V1, V2) {
   if table_lookup(V1.direction, [V2.position, V2.direction]) == ✓ {
      return Y
   }
   else {
      return N
   }
}
```

Figure 24

METHOD, SYSTEM, MODULE AND SOFTWARE FOR INTELLIGENTLY GOVERNING A MULTI-WAY STOP INTERSECTION

CROSS-REFERENCE TO RELATED APPLICATIONS

This application is a U.S. national stage of International Application No. PCT/EP2020/050091, filed on Jan. 3, 2020. The International Application claims the priority benefit of U.S. Provisional Patent Application No. 62/788,382 filed on Jan. 4, 2019. Both the International Application and the U.S. Provisional Patent Application are incorporated by reference herein in their entirety.

COPYRIGHT

A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file or records, but otherwise reserves all (copyright or mask work) rights whatsoever.

FIELD

The present disclosure relates to method operations, a system and system components for active coordination of navigation through multi-way stop intersections. In particular, the present disclosure relates to systems, components, and methodologies that perform enable active coordination through an intersection using Vehicle-to-Everything (V2X) messaging.

SUMMARY

According to the present disclosure, systems, components, and methodologies are provided for enabling improved navigation through multi-way stop intersections (e.g., non-signalized intersection, partially signalized intersection, and fully signalized intersection) for increased efficiency and safety.

In accordance with at least one embodiment, method operations and functionality are provided that enable transportation vehicles to actively coordinate how they proceed through an intersection by communicating via Vehicle-to-Everything (V2X) messages.

In accordance with at least some disclosed embodiments, operations and functionality may be used to reinforce traffic rules and increase traffic flow at multi-way stop intersections.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 24 illustrates additional detail regarding the comparison operation illustrated in FIG. 23.

DETAILED DESCRIPTION

Figure 1:
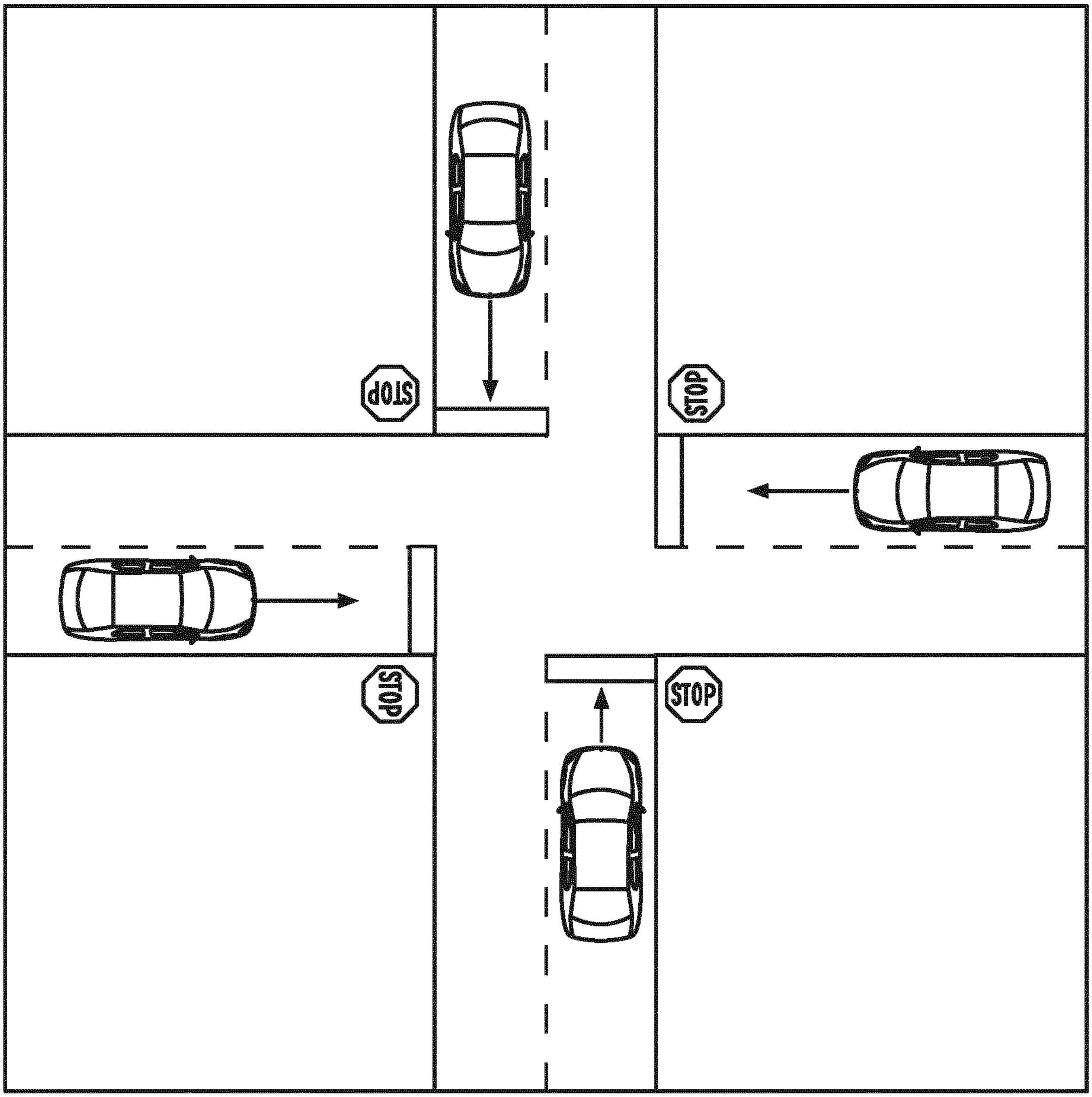
FIGS. 1-7 provide illustrative diagrams illustrating interaction of a plurality of transportation vehicles navigating through an intersection in accordance with the disclosed embodiments.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

According to the US Federal Highway Administration (FHA), more than half of all on-road vehicle crashes in the United States in 2007 occurred at intersections. Of the 8,657 fatalities that occurred at intersections that year, over 70% were at non-signalized intersections, i.e., intersections that do not have indicators for users on each intersection approach that indicate how and/or when to proceed through the intersection. Non-signalized Multi-way stop intersections on roads today require negotiation to be performed by drivers of transportation vehicles using sporadic and/or ambiguous hand gestures and error-prone human analysis of the state of an intersection as well as the state of all transportation vehicles navigating through that intersection.

Disclosed embodiments provide a technical solution for improving traffic flow efficiency and safety. More specifically, the disclosed embodiments provide a technical solution that eliminates ambiguity in transportation vehicle movement projections. As a result, disclosed embodiments may be utilized to safely send multiple transportation vehicles through an intersection at the same time (local laws permitting), thereby improving traffic flow efficiency while maintaining safety.

For example, if four transportation vehicles stop at an intersection and all of the transportation vehicles are turning right, there is no reason that all the transportation vehicles cannot execute that movement in the intersection at the same time. Thus, by implementing this functionality of the disclosed embodiments, this intersection can be cleared in 25% of the time that such a process would have taken under the current traffic paradigm.

Disclosed embodiments provide a technical solution to improve both safety and efficiency of multi-way stop intersections by utilizing V2X messaging technology, in particular, Vehicle-to-Vehicle (V2V) messaging technology.

In accordance with at least some disclosed embodiments, transportation vehicles include components and functionality that enable the vehicle to actively coordinate how the transportation vehicle proceeds through an intersection relative to other vehicles at the intersection using V2V messages.

In accordance with at least some disclosed embodiments, V2V messaging coordination can be used to reinforce traffic rules at a multi-way intersection. Additionally, in accordance with at least some disclosed embodiments, V2V messaging can be used to increase traffic flow at multi-way intersections.

The standardized foundation of Vehicle-to-Vehicle (V2V) communication technology is the Basic Safety Message (BSM). The BSM includes a large collection of vehicle data, e.g., Global Positioning System (GPS) related data including latitude and longitude, speed, lateral and longitudinal acceleration, brake information, headlight status, turn signal status, vehicle length, width and mass, etc. Once implemented in a fully connected transportation vehicle, the BSM is broadcast by all connected transportation vehicles at a transmission frequency of 10 Hz. It can be appreciated that Cooperative Awareness Message (CAM) can also be broadcast by all of the connected transportation vehicles.

In accordance with disclosed embodiments, BSM/CAM data may be used to generate a detailed view of an intersection and all vehicles in and around that intersection. Logic may then be applied to this detailed view to determine a proper sequence of the transportation vehicles to proceed in, at and/or through the intersection. For example, once a candidate sequence is identified, consensus with all other transportation involved vehicles may be obtained before the transportation vehicles proceed through the intersection.

To obtain consensus and ensure agreement among all transportation vehicles at the intersection regarding the order in which transportation vehicles are to proceed in, at and through the intersection, disclosed embodiments define a new safety message that contains the necessary information to determine consensus (or lack thereof), the Multi-Way Stop Message ("MWSM"). One implementation of the specific payload format of this MWSM is shown in Appendix A.

The MWSM message may be broadcast at a regular cadence, for example, approximately 10× per second, similarly to the known BSM/CAM, to ensure that transportation vehicles are communicating with up-to-date information.

In accordance with disclosed embodiments, the MWSM transmitted by a transportation vehicle (the Host Vehicle or HV) may contain instances of the three lists (approachList, stopList, inConflictZone) that the transportation vehicle HV has stored, as well as some of HV's specific data, e.g., ego-data, including current lane, target lane, etc. Appendix B includes a further example of the MWSM of Appendix A with additional detail for the ego-data to be included in a transmitted MWSM.

In accordance with disclosed embodiments, when transportation vehicle HV receives an MSWM from another transportation vehicle (Remote Vehicle or RV), the HV's analysis module first analyzes the RV's ego-data to determine which of the three lists the RV may be categorized in. After that determination is made, HV's analysis module compares the RV's lists to its own lists to ensure that the data in the lists are in agreement. If they are not, the HV's intersection navigation analysis module may move to an error state. The same operations are performed using the RV's analysis module as well to reach consensus and agreement.

If the lists are in agreement, the MWSM may be used to ensure that all transportation vehicles participating in the intersection crossing (e.g., HV and RV in this example) agree on which transportation vehicles should be in which of the three lists.

In accordance with disclosed embodiments, as long as all vehicles have the same lists stored, applying the application logic (defined in the attached document) will result in agreeing on the same order of vehicles to proceed through the intersection, and more particular, the conflict zone.

FIGS. 1-7 provide illustrative diagrams illustrating interaction of a plurality of transportation vehicles navigating through an intersection in accordance with at least one disclosed embodiment.

As shown in FIG. 1, as part of an approach to a multi-way intersection (here, a four way intersection including stop signs), at least two (and up to four) C-V2X (that is cellular-V2X) enabled transportation vehicles approach an intersection. It can be appreciated that C-V2X is an example of the various vehicle communication technologies that can be used in conjunction with the present disclosure. For instance, the present disclosure can be used in conjunction with DSRC/5G-V2X and any current or upcoming V2X technologies. The C-V2X technology has been used herein for the purpose of describing particular illustrative embodiments only and is not intended to be limiting. It should also be noted that all of the transportation vehicle may not be automobiles. Rather, the innovation works as well with other types of transportation including motorcycles, or even a personal computing device implementation for providing the disclosed intersection navigation analysis module disclosed herein for use with bicycles, scooters, or pedestrians.

As part of this approach phase (also detailed herein with reference to FIGS. 8, 9 and 16, herein), map matching functionality may be performed to determine what the traffic rules are that pertain to the HV approaching the intersection. For the purposes of explanation only, the HV is considered to be the transportation vehicle that is receiving; however, it should be understood that an RV may perform the same operations as an HV because the designation is merely a label to denote operations performed as part of receipt of data. For example, map-matching may be performed to determine the vehicle is in a lane that has a stop sign, yield sign, etc. The software of the intersection navigation analysis module may then begin monitoring vehicle velocity in response to a parameter being met, e.g., an estimation being performed that determines that the vehicle is some amount of time, e.g., away from reaching the intersection.

Figure 12:
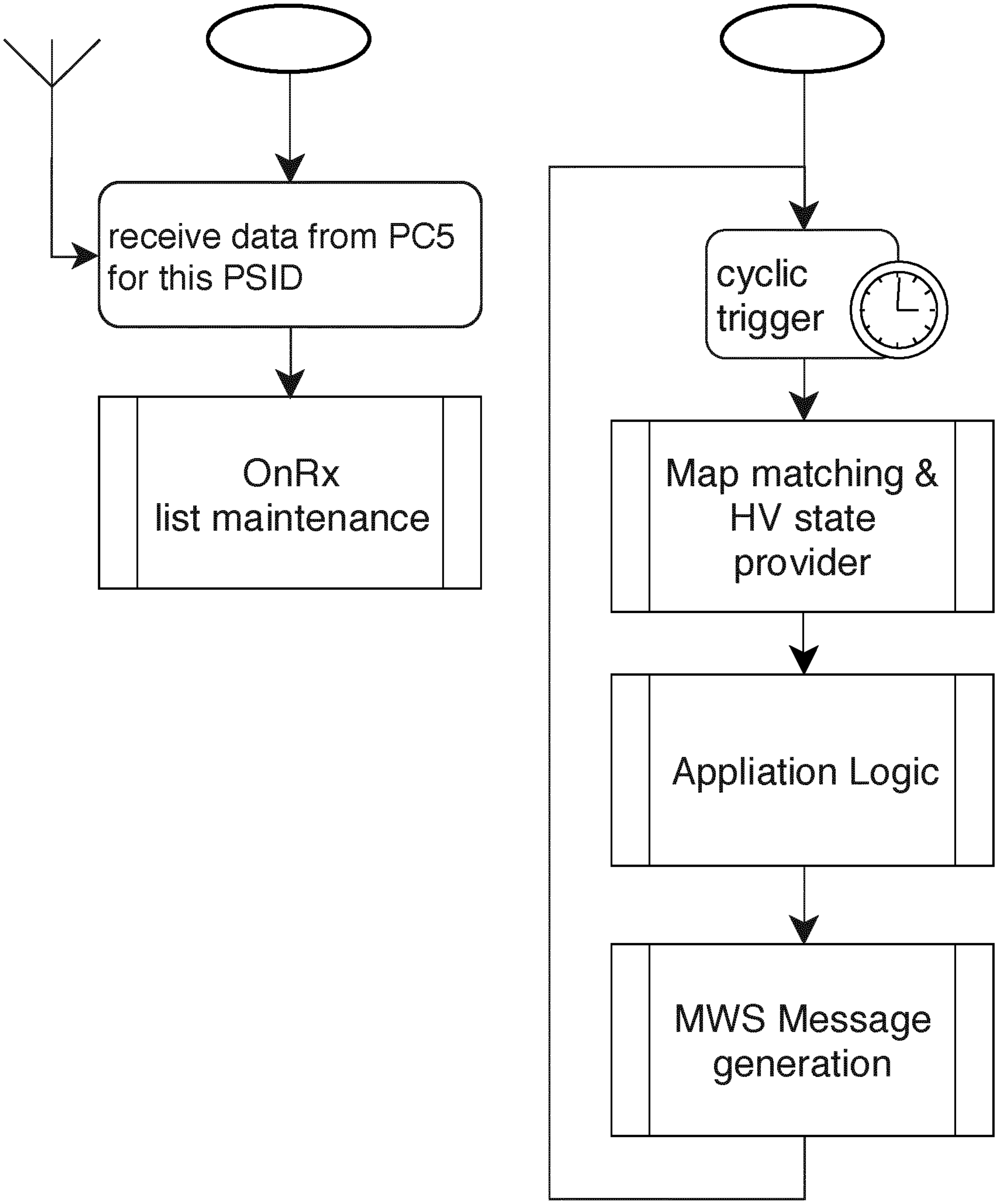
FIGS. 12 and 13 illustrate additional details regarding analysis and process operations performed as part of matching received BSM/CAM data of other vehicles identified as approaching an intersection in accordance with disclosed embodiments.
Figure 13:
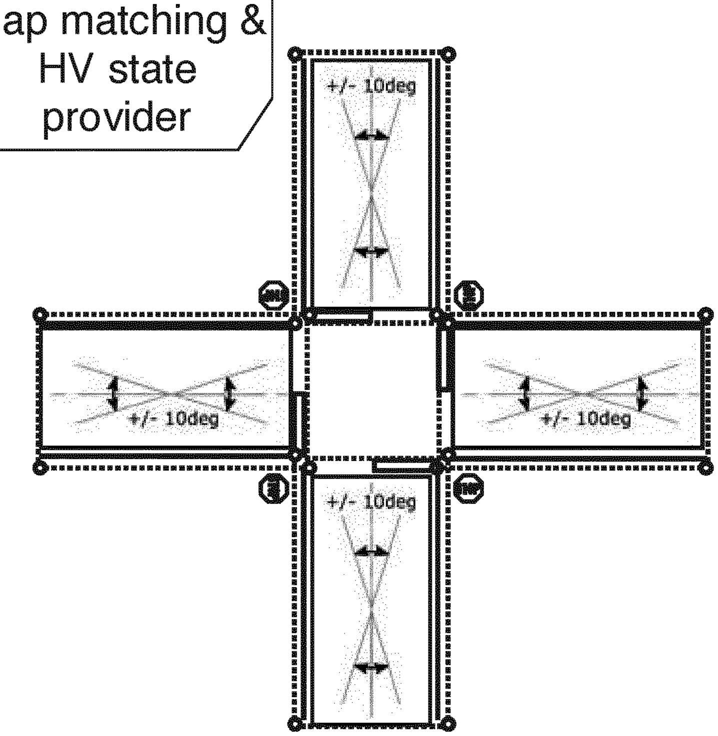

The intersection navigation analysis module then begins matching received BSMs/CAMs of other vehicles identified as approaching the intersection as explained herein with reference to FIGS. 12 and 13 herein.

It should be understood that preceding vehicles in the same lane of travel as the vehicle, that is other vehicles in front of the vehicle may or may not be taken into account in analysis.

It should be understood that, an intersection may be equipped with one or more C-V2X devices broadcasting map information. Alternatively, or in addition, there may be provided a backend service connected via wireless cellular communication technology to provide map data. If no map data is received, map matching may be performed using a pre-defined map database, for example, map data stored in a navigation system of the transportation vehicle, as is known.

Figure 2:
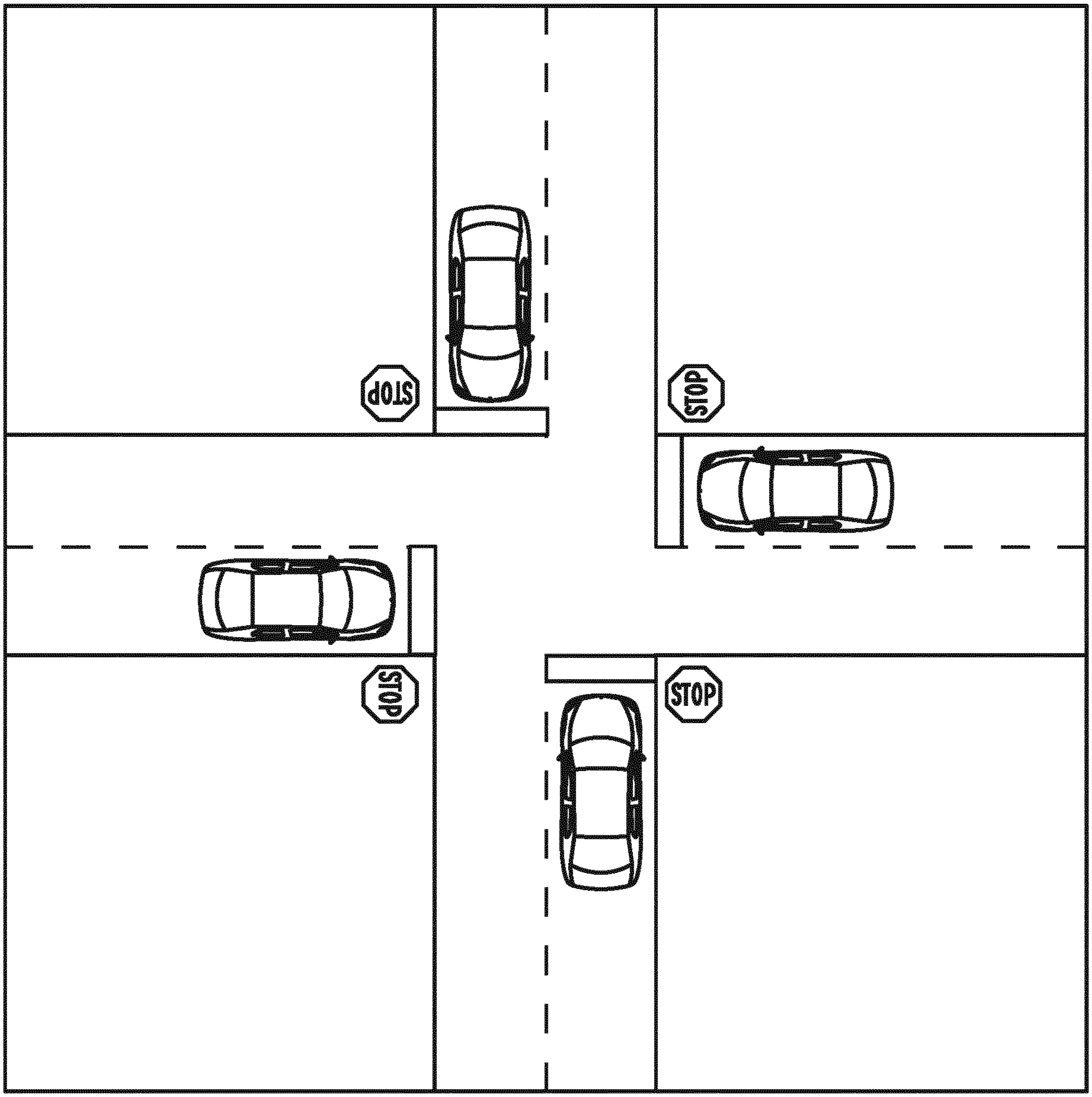
Figure 8:
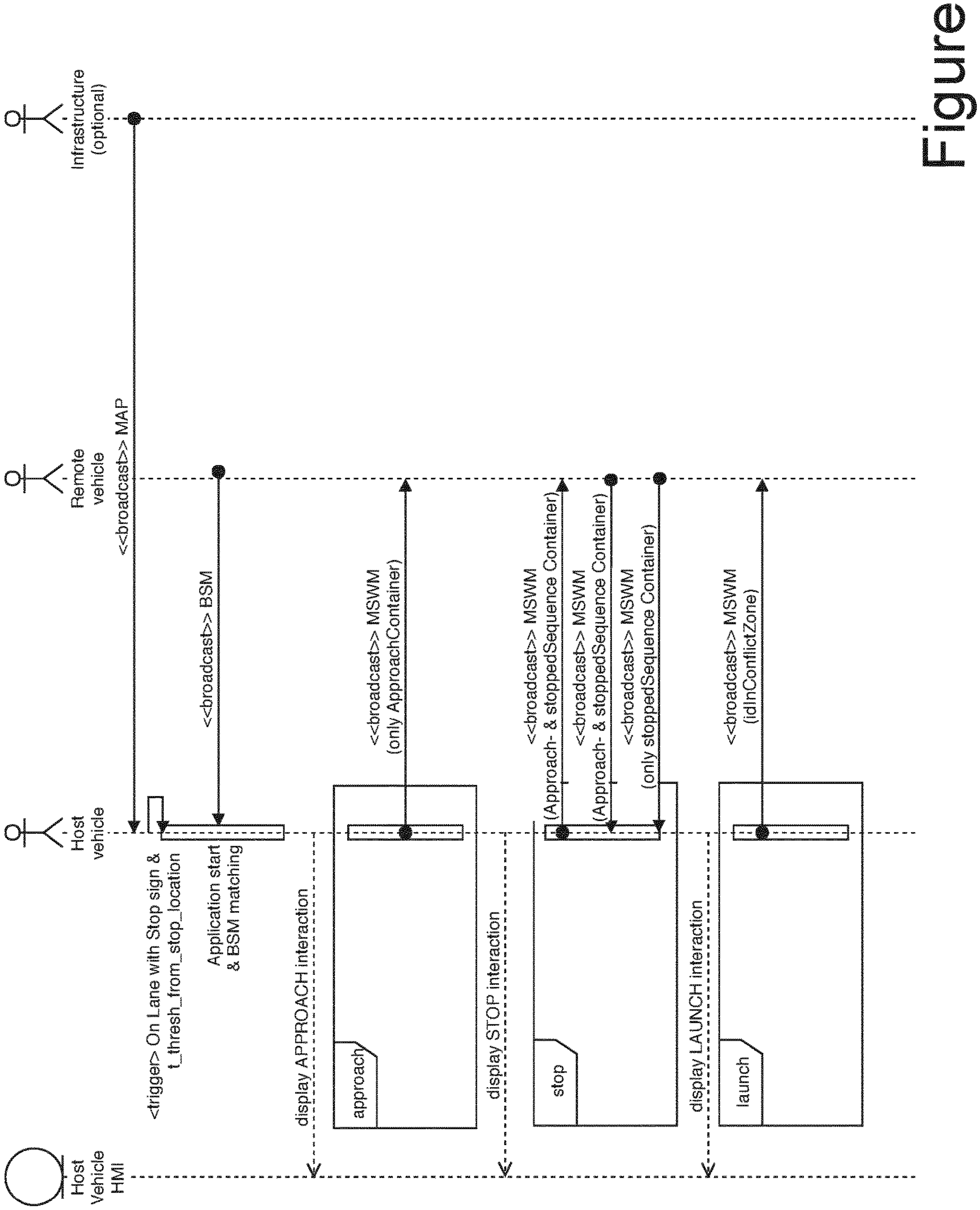
FIG. 8 illustrates an example of operations provided in a sequence charge that outlines Multi-Way Stop Message (MWSM) message generation and basic internal processes performed in conjunction with disclosed embodiments for exchange of information to reach agreement on an intersection navigation sequence.
Figure 10:
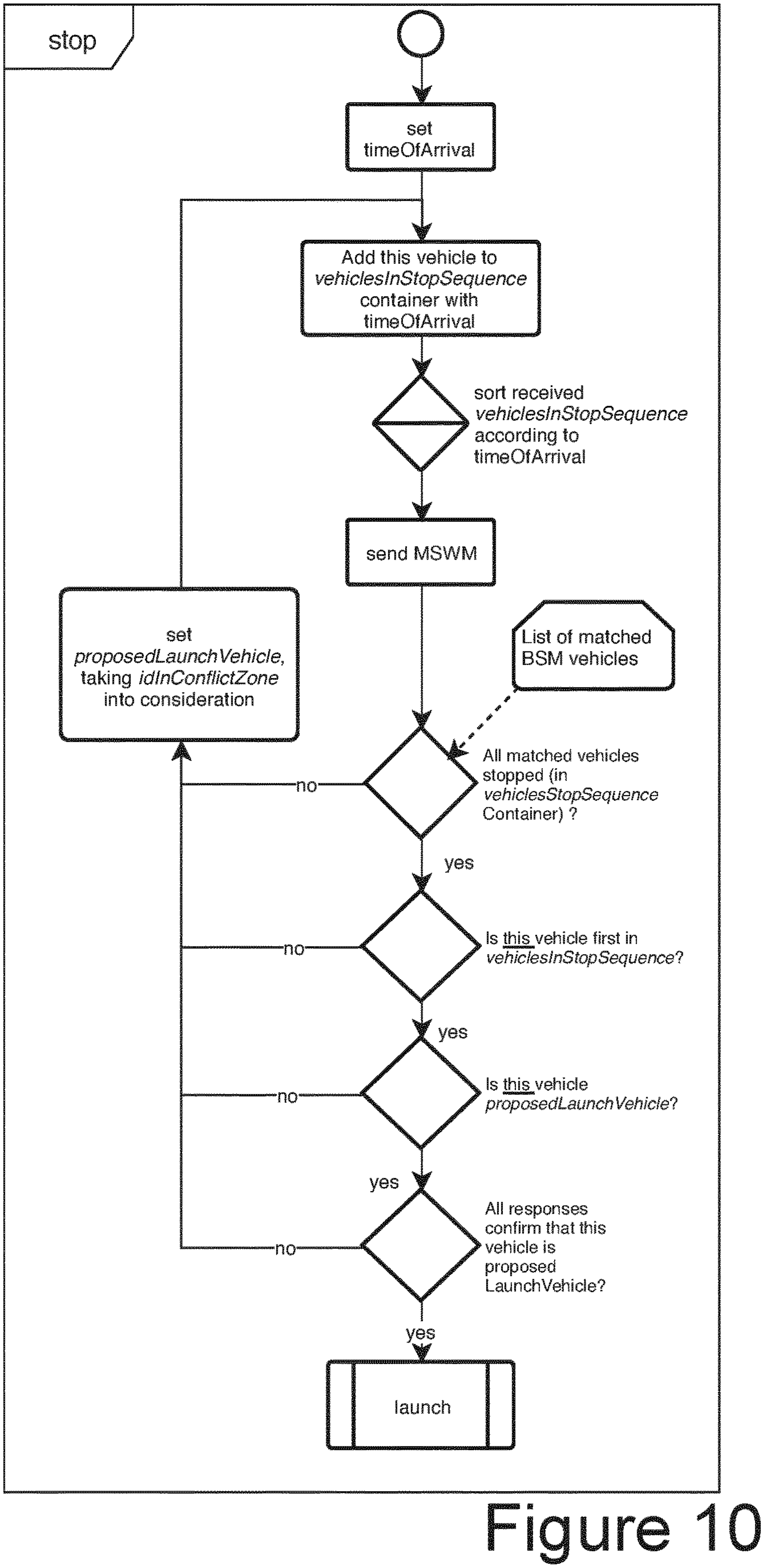
FIG. 10 illustrates additional details regarding analysis and process operations performed as part of a stop phase in accordance with disclosed embodiments.
Figure 17:
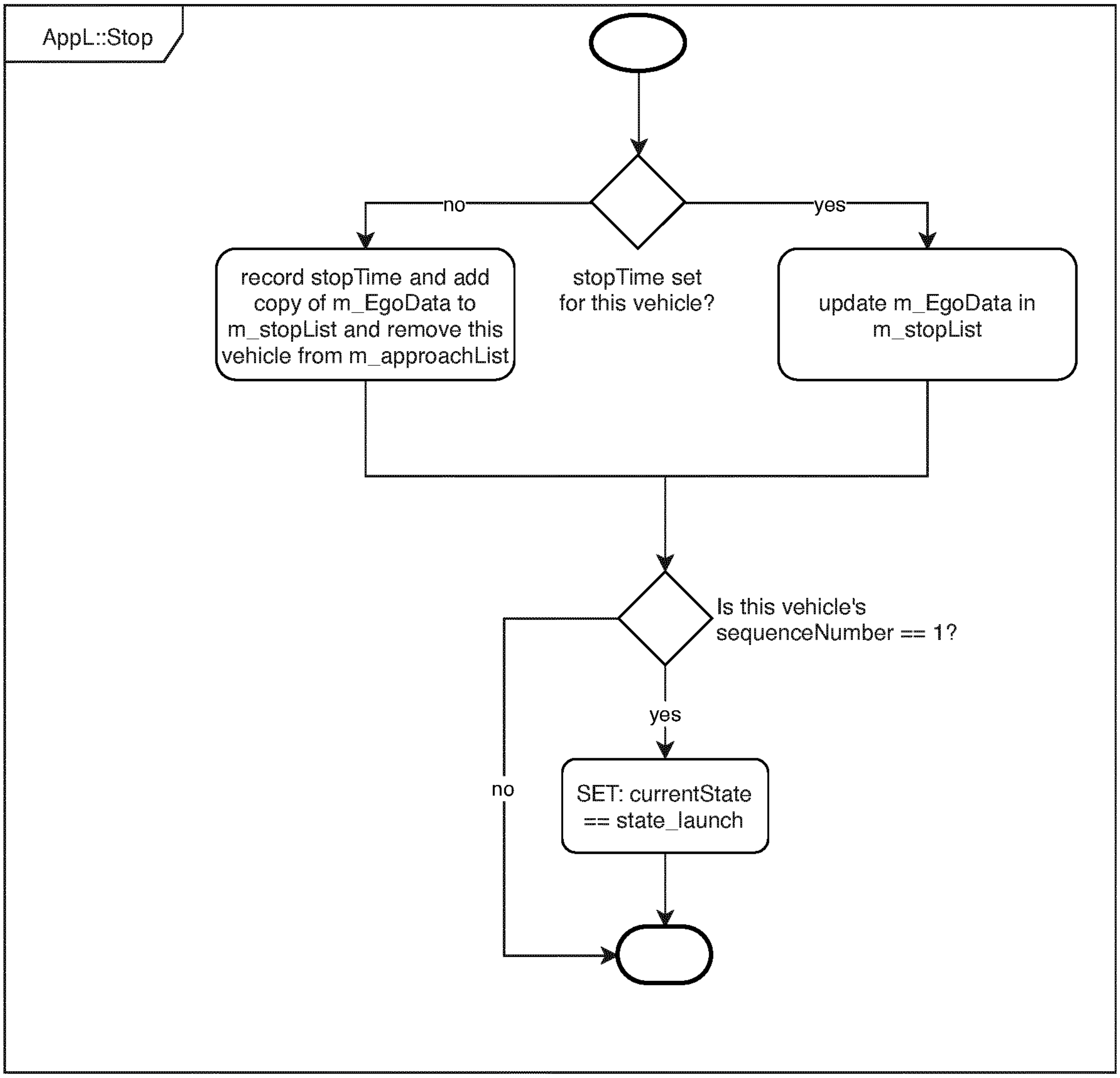
FIG. 17 illustrates additional details regarding analysis and process operations performed as part of a stop phase and formulation of a stopList in accordance with disclosed embodiments.

The approach phase ends when the approaching vehicles come to a complete stop as part of what may deemed a stop phase, as shown in FIG. 2 (and discussed further with reference to FIGS. 8, 10, and 17 herein). As part of the stop phase, consensus protocol operations begin to determine a "first to launch" candidate from among the vehicles positioned at the intersection. It should be understood that, optionally, as part of this phase, an output notification may be output to the driver of the transportation vehicle via the Human Machine Interface (HMI) included in the transportation vehicle, which may be part of the infotainment system included in the transportation vehicle. For example, a display may indicate "Approaching intersection: expect NUM other vehicles" or something similar (where NUM is the variable indicating the number of vehicles the driver should expect to see at the upcoming intersection).

Optionally, the stop phase may include consideration and analysis performed by one or more external infrastructure provided parameters which may alter the decentralized nature of the communication and collaboration of the vehicles. For example, optionally, an external infrastructure computational unit may be configured to monitor traffic conditions and operate as an automated traffic director to expedite traffic moving in one of the directions at the intersection. In such a configuration, the infrastructure computational unit may be in communication with and have access to traffic monitoring data provided by one or more external services, have access to traffic light data in a vicinity of the intersection, etc. As a result, the infrastructure computational unit may be able to expedite traffic and signal to vehicles when the vehicles are supposed to stop, wait and launch to coordinate traffic flow on a macro level beyond the particular intersection.

Figure 3:
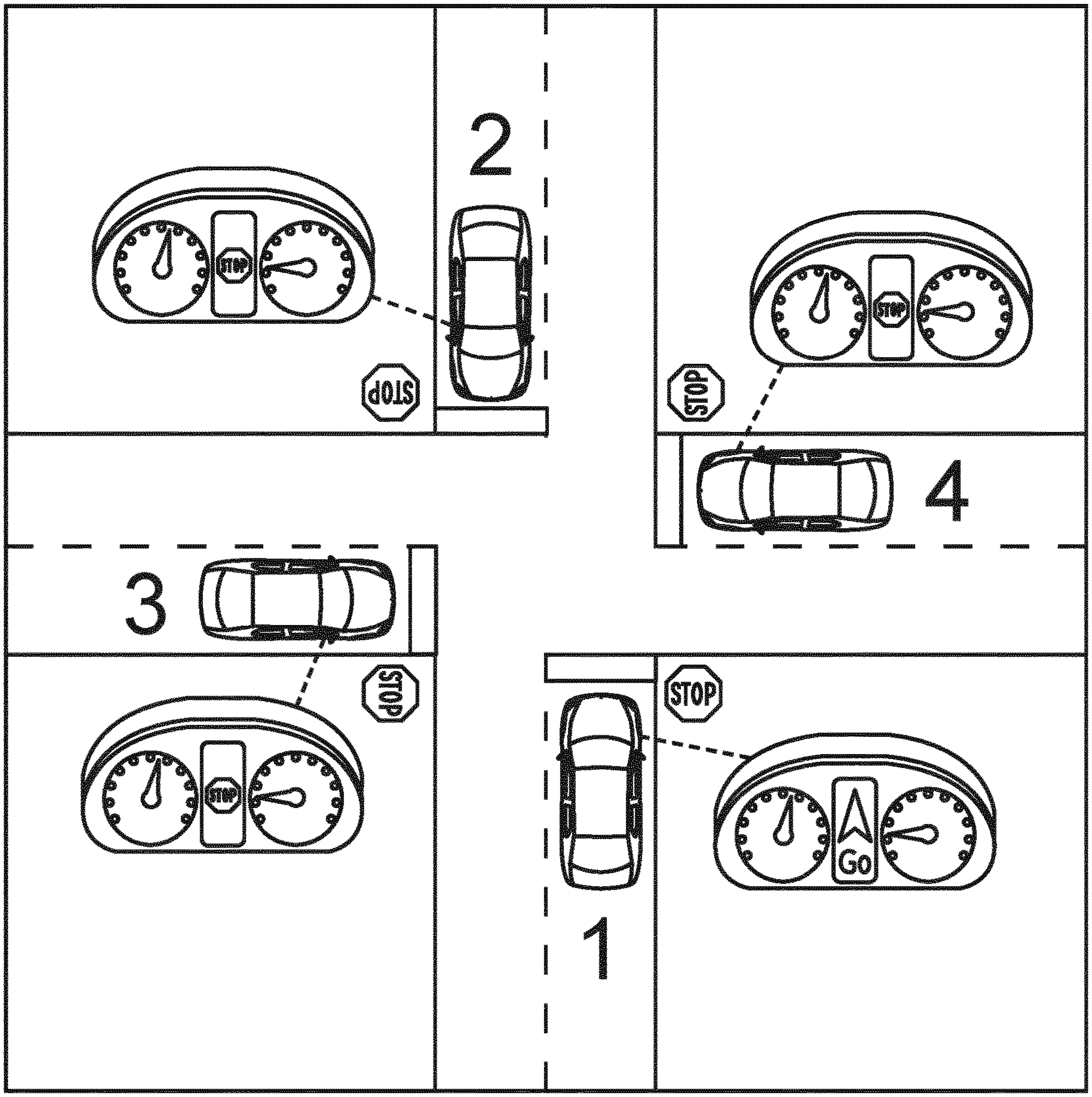

Following the stop phase, the agreement phase includes operations during which vehicles agree on identification of a first vehicle to launch from stop, as shown in FIG. 3 (and discussed further with reference to FIGS. 8, and 21-26C herein). This may be based, for example, on whoever reached a full stop at the intersection first. As part of driver output via a vehicle HMI, all vehicles may output a Stop message until consensus/feedback are received from all other vehicles at the intersection.

More details regarding messages and message flow is provided herein with reference to FIG. 8.

Optionally, during the agreement phase the driver may be required to press a physical button, for example, on a steering wheel to confirm that the driver is aware and agrees to the role assigned to the driver's transportation vehicle in the order sequence for traveling through the intersection.

Figure 4:
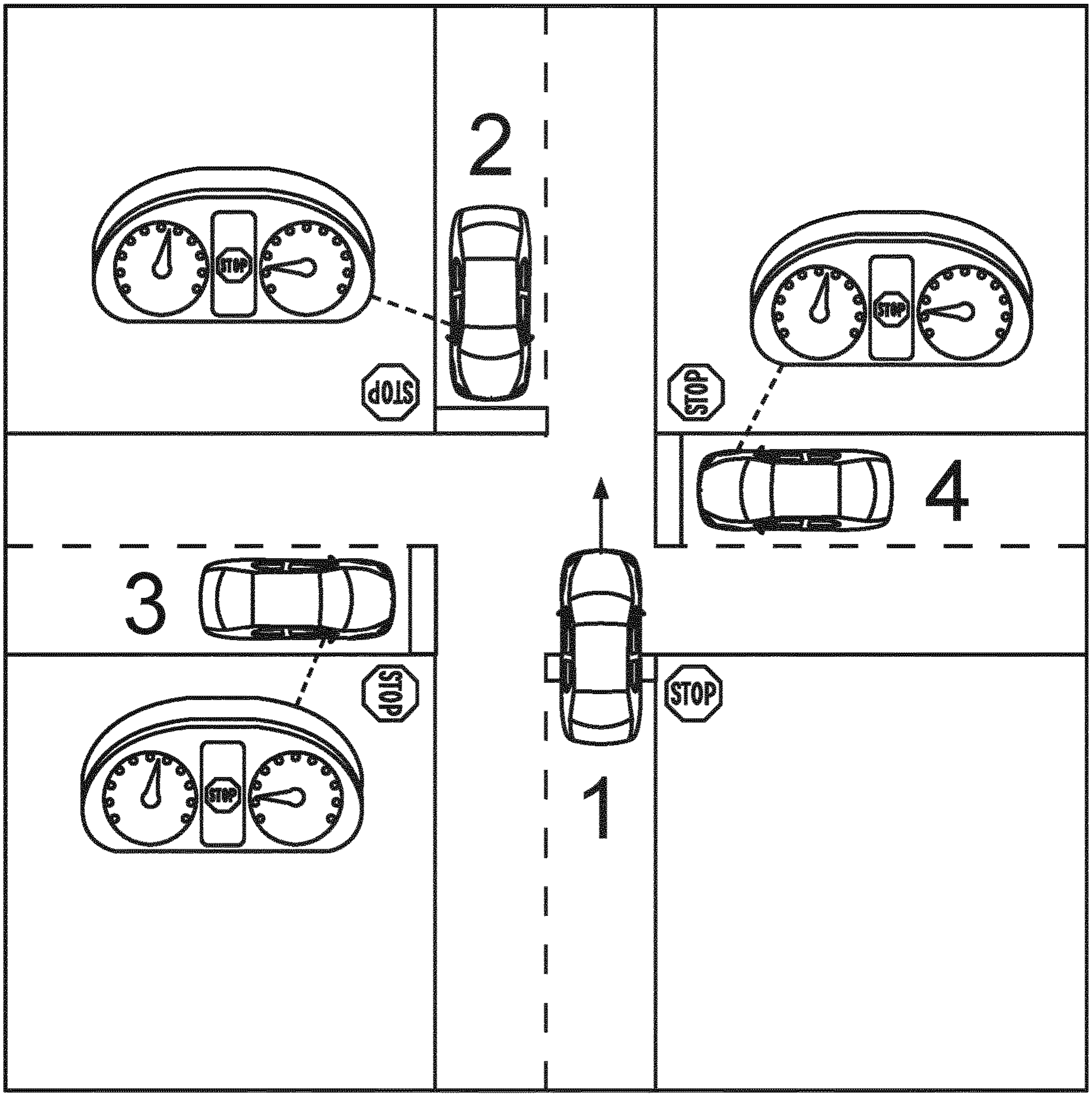
Figure 5:
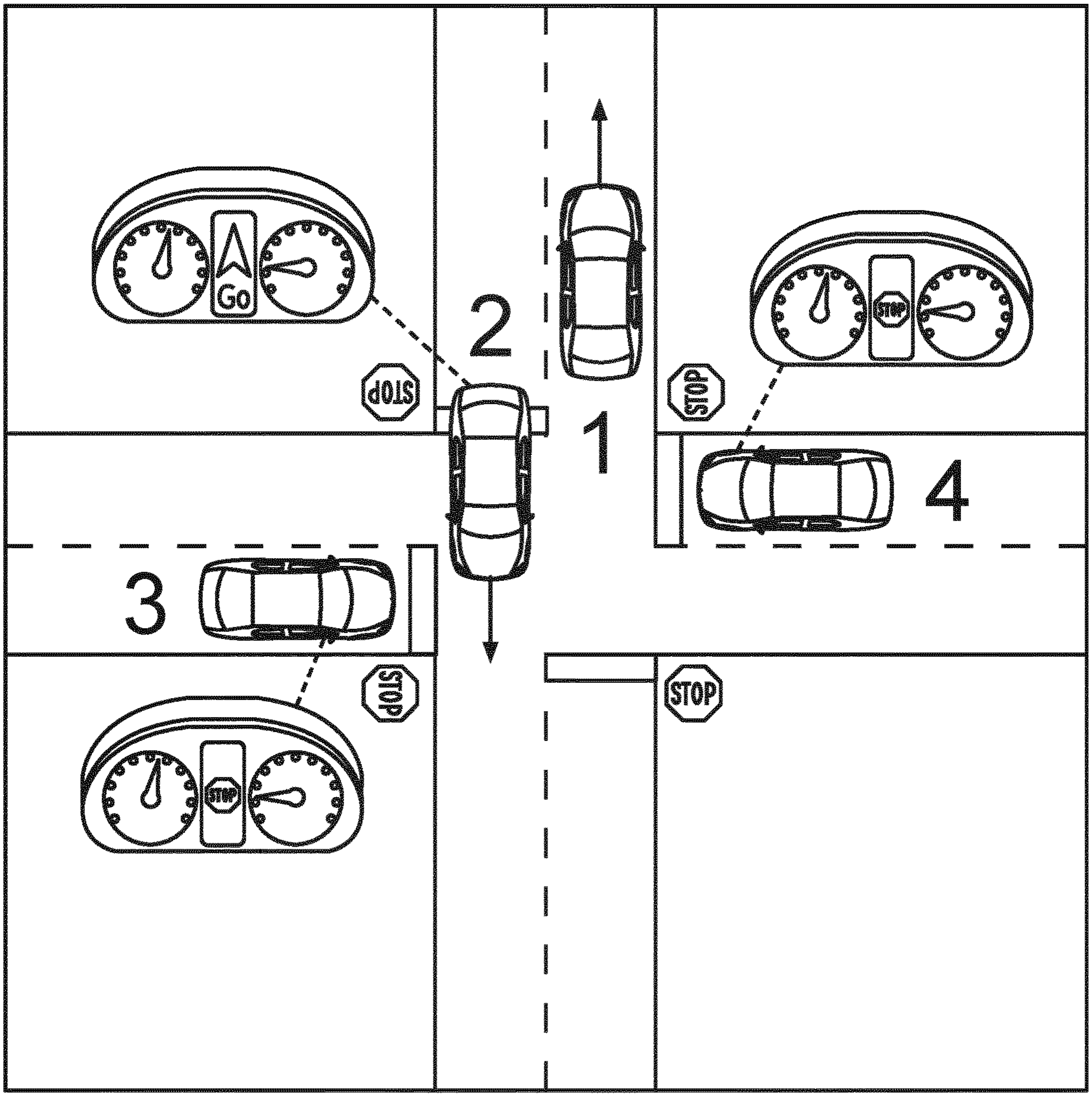
Figure 6:
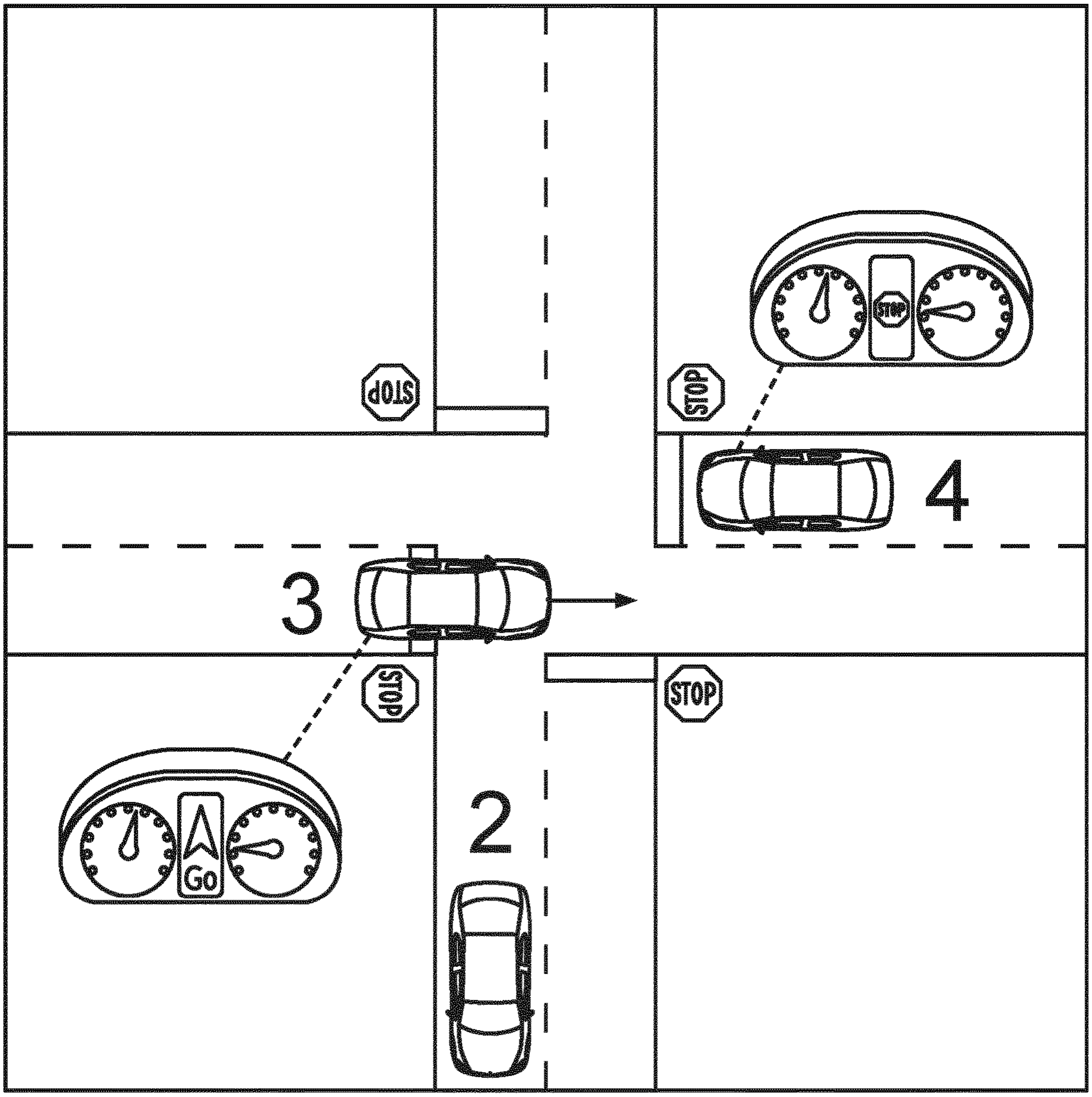
Figure 7:
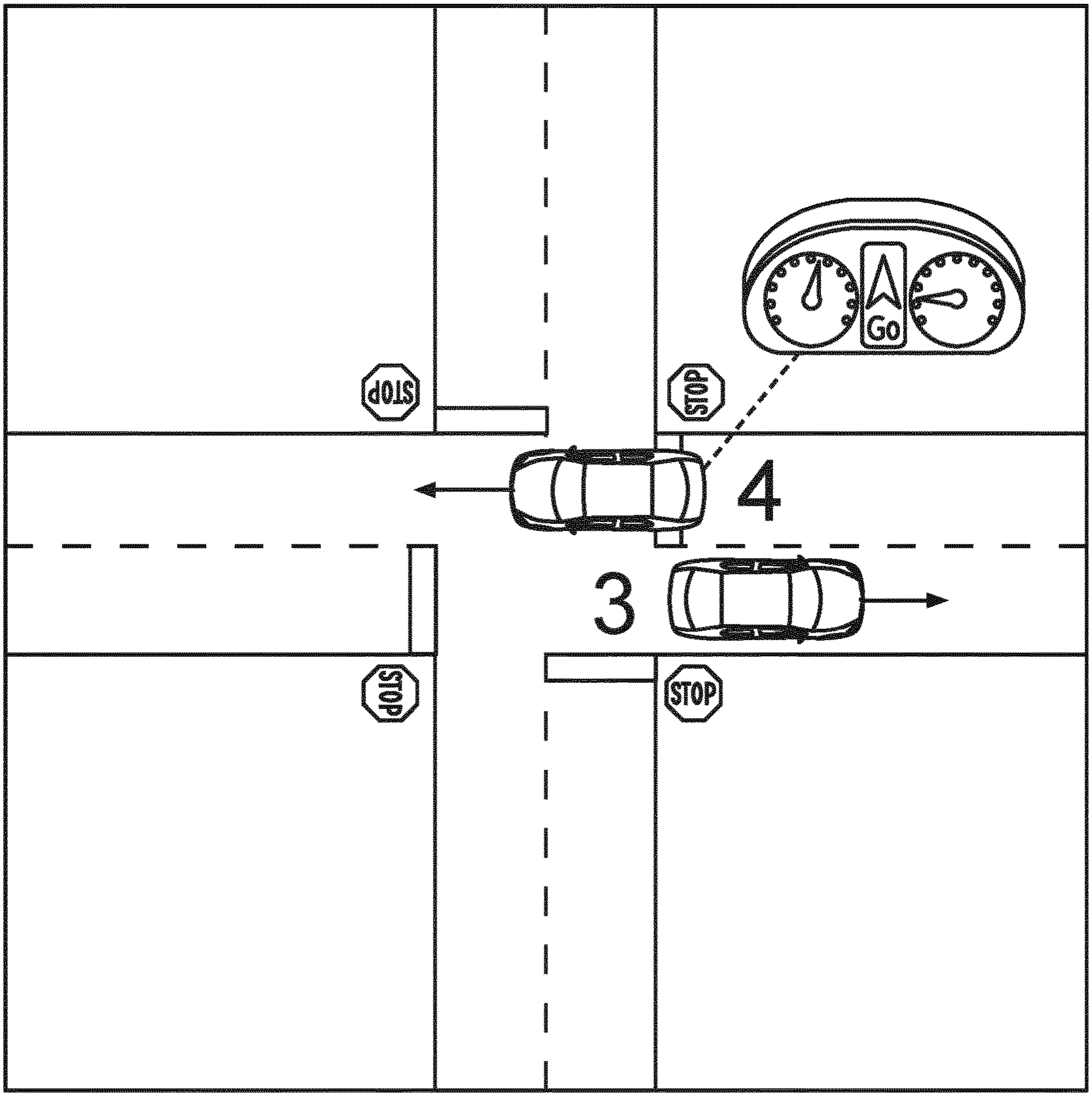

Subsequently, the vehicles launch, or move, in the order agreed upon as part of a launch phase, shown in FIGS. 4-7 (which collectively illustrate the launch sequence agreed to by the vehicles). More specifically, FIG. 4 illustrates launch of the first vehicle (vehicle 1) as it departs from its stopping position and travels through the conflict zone of the intersection. FIG. 5 illustrates launch of the second vehicle (vehicle 2) as it departs from its stopping position and travels through the conflict zone of the intersection. FIG. 6 illustrates launch of the third vehicle (vehicle 3) as it departs from its stopping position and travels through the conflict zone of the intersection. FIG. 7 illustrates launch of the fourth vehicle (vehicle 4) as it departs from its stopping position and travels through the conflict zone of the intersection. In the progression of the sequence illustrated in FIGS. 4-7, once the intersection or the conflict zone of the intersection is clear from a vehicle, the next vehicle gets clearance to enter the intersection (e.g., by output of a "if safe, proceed" message on the HMI of the vehicle).

Figure 9:
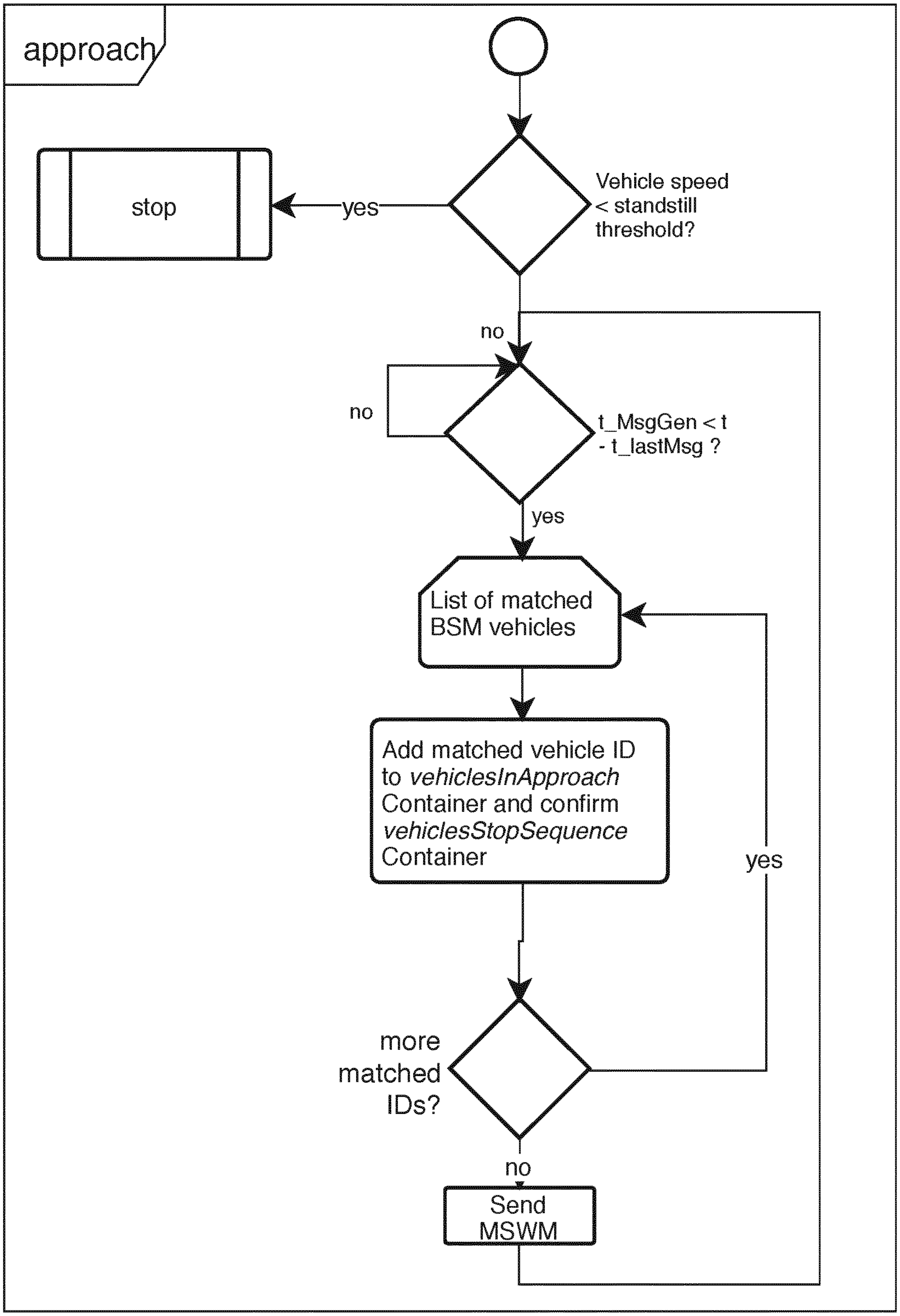
FIG. 9 illustrates additional details regarding analysis and process operations performed as part of an approach phase in accordance with disclosed embodiments.
Figure 16:
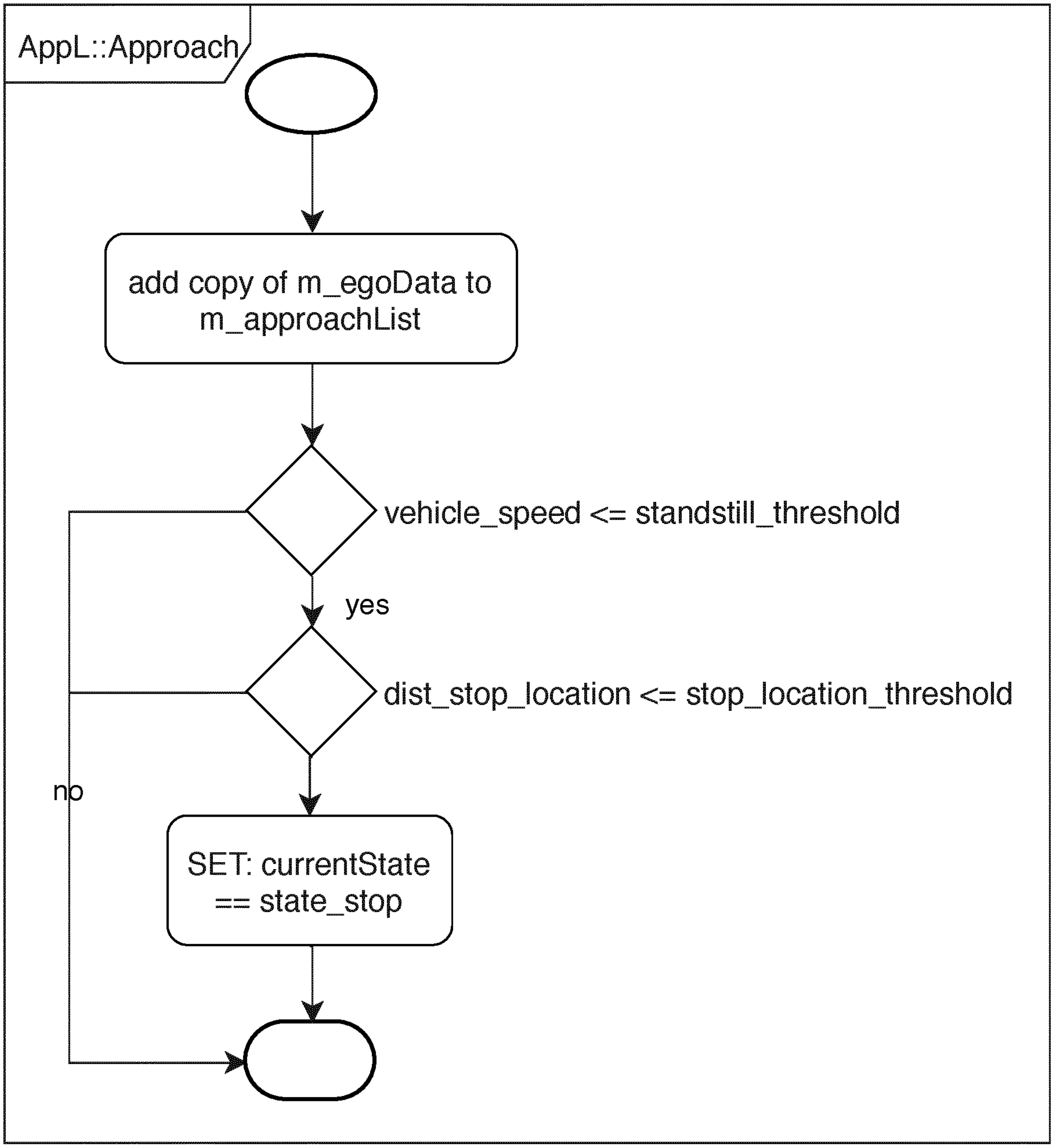
FIG. 16 illustrates additional details regarding analysis and process operations performed as part of an approach phase and formulation of an approachList in accordance with disclosed embodiments.

FIG. 8 illustrates additional detail regarding the message exchange and basic internal processes performed in a vehicle depending on its relative role as a Host Vehicle (HV) or a Remote Vehicle (RV). As shown in FIG. 8, and as alluded to above, an optional infrastructure element may provide input to the HV as part of processing performed by the HV. As shown in the sequence chart, RVs (and HVs operating as RVs to other vehicles) all broadcast BSM/CAM data to enable each other to recognize themselves as connected V2X vehicles. In response to receiving BSM/CAM data from an RV, a HV will broadcast its MSWM to the RV as part of the approach phase. Additional details regarding analysis and process operations of the approach phase are illustrated in FIGS. 9 and 16.

Figure 11:
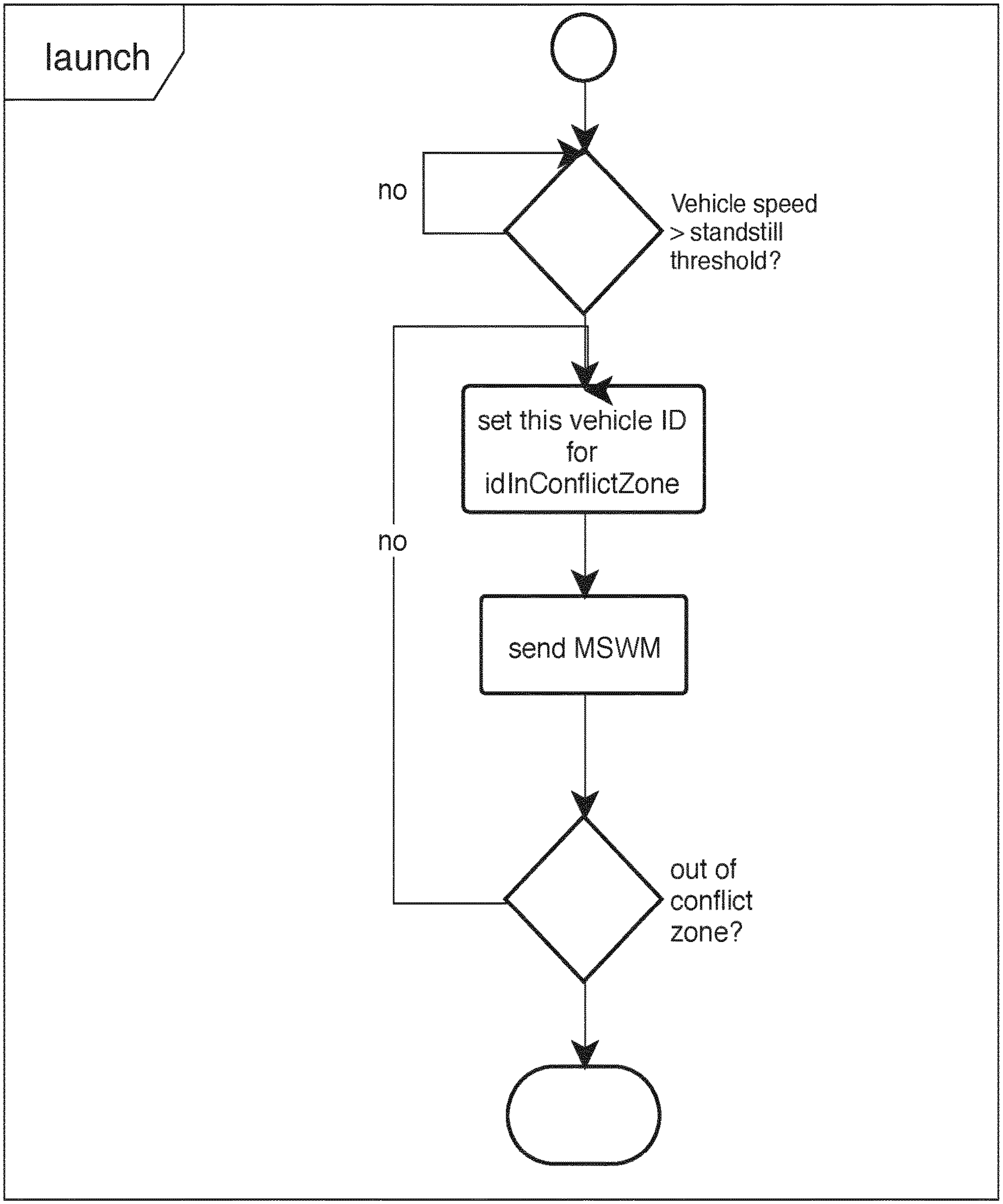
FIG. 11 illustrates additional details regarding analysis and process operations performed as part of a launch phase in accordance with disclosed embodiments.
Figure 20:
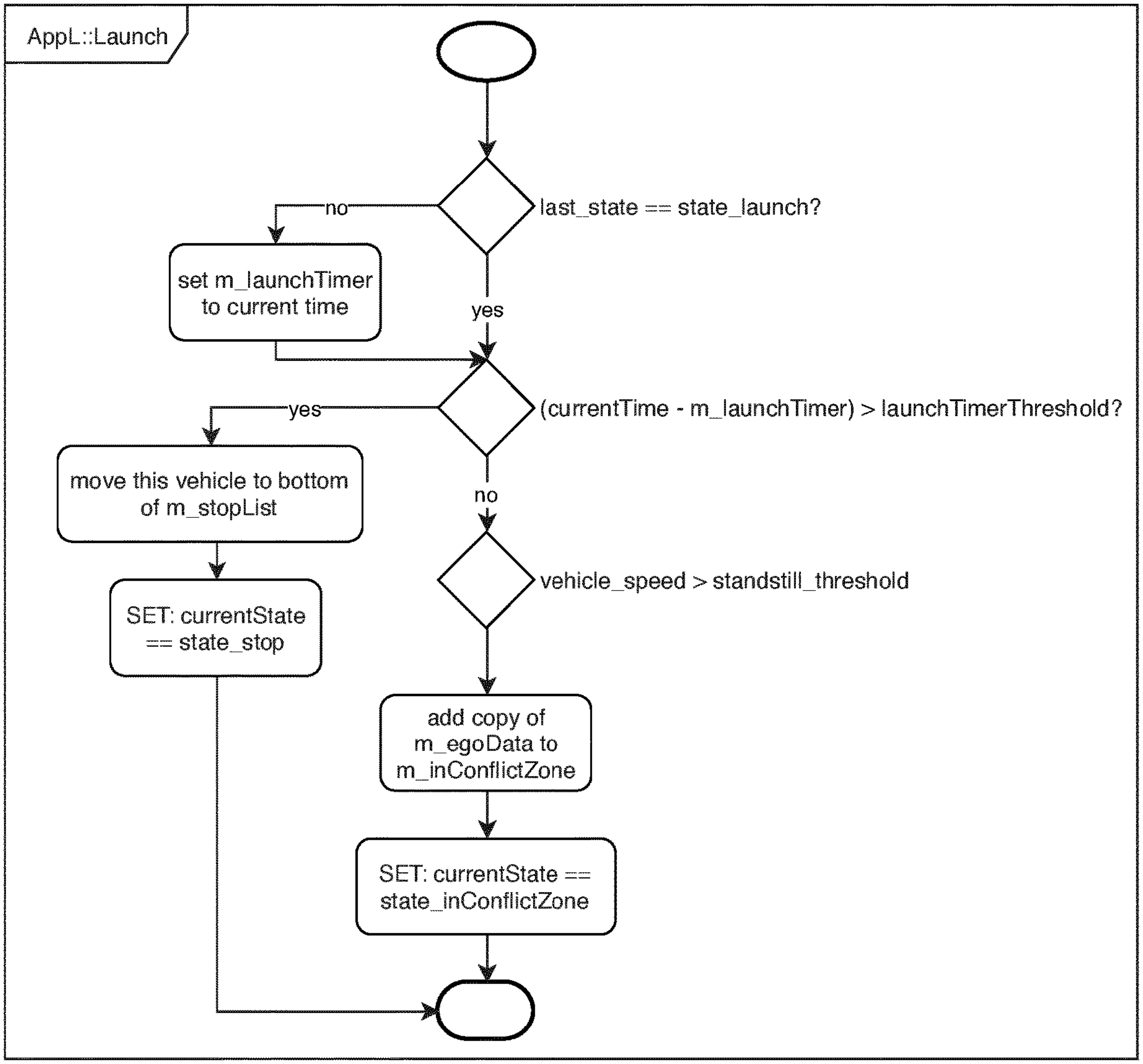
FIG. 20 illustrates additional details regarding analysis and process operations performed as part of a launch phase in accordance with disclosed embodiments.

Following completion of the approach phase, the HV displays the Stop message to the driver through the HV HMI. Following stop of the HV at the intersection, the stop phase includes further broadcast of the MSWM to facilitate the agreement phase. Additional details regarding analysis and process operations performed during the stop phase are illustrated in FIGS. 10 and 17. Thereafter, once agreement is reached regarding launch sequence for the intersection, the launch phase is commenced to enable orderly and efficient navigation through the intersection, as illustrated in FIGS. 4-7. Additional details regarding analysis and process operations of the launch phase are illustrated in FIGS. 11 and 20.

As explained above, the intersection navigation analysis module for a vehicle (as an HV) in accordance with the disclosed embodiments matches received BSM/CAM data of other vehicles (RVs) identified as approaching the intersection as explained herein with reference to FIGS. 12 and 13 herein.

As shown in FIG. 12, various operations are performed simultaneously with those data reception operations including various cycle triggered operations including map matching and HV state analysis, various logic operations for performing analysis to determine launch sequence and MWSM generation for transmission to other vehicles.

FIG. 13 provides additional detail regarding map matching and HV state analysis, which may include, various operations performed on a cycle triggered basis, including creation and population of HV data, map matching, determination of offset to closest lane, determination of HV current land, determination of HV target lane based on turn signal status, determination of distance to stop location, and estimation of Estimated Time of Arrival (ETA) at stop location.

Figure 14:
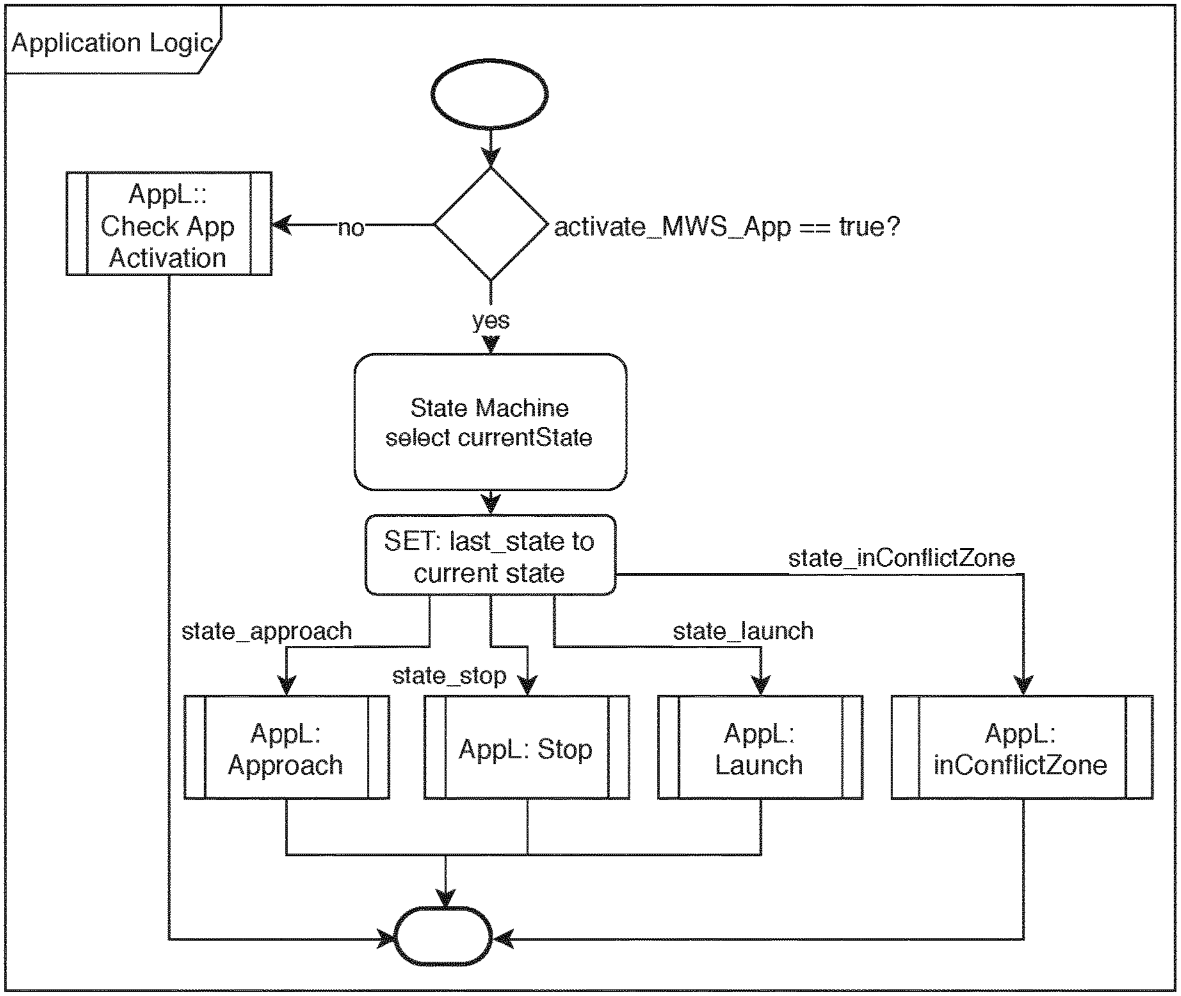
FIG. 14 illustrates additional details regarding the application logic referred to in FIG. 12 to provide functionality of the disclosed embodiments.

Returning to FIG. 12, various application logic is included in an intersection navigation analysis module to perform the operations and provide the functionality disclosed herein. Thus, FIG. 14 provides additional detail regarding the application logic referred to in FIG. 12. That application logic includes but is not limited to a mechanism for checking activation of the functionality of the analysis module (see FIG. 15) as well as use of a state machine that enables transition between the various phases, or states, of the system, e.g., approach (see also FIG. 16), stop (see also FIG. 17), launch (see also FIG. 20) and a state inConflictZone with more detail shown in FIG. 18)

Figure 19:
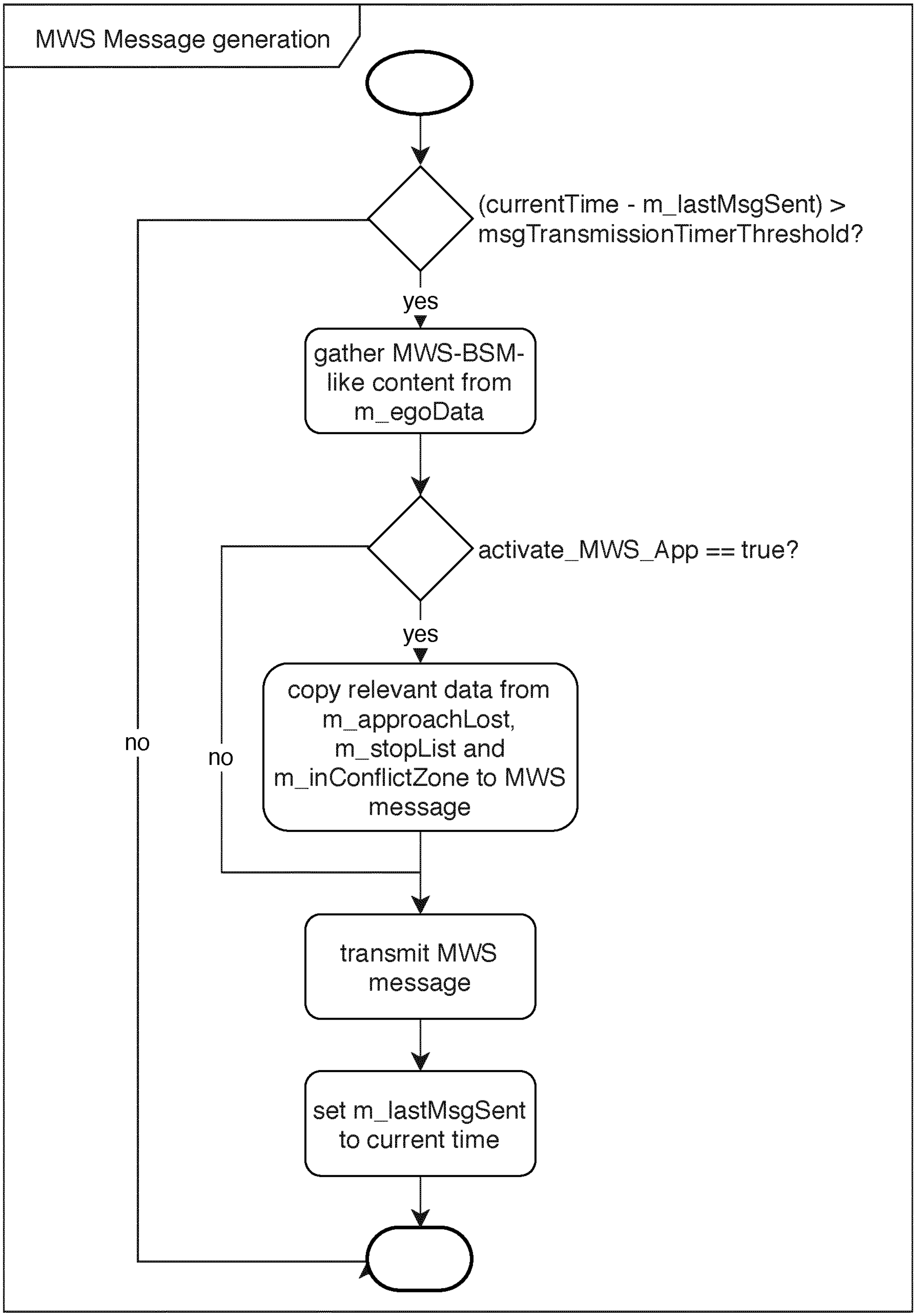
FIG. 19 provides additional detail regarding the generation of MSWM messages for transmission to other vehicles in accordance with disclosed embodiments.

FIG. 19 provides additional detail regarding the generation of MSWM messages for transmission to other vehicles. As shown in that figure, this generation and transmission of MSWM data involves operations to function as an RV relative to other transportation vehicles performing operations as a HV to implement the communication and cooperation approach to intersection navigation in accordance with the disclosed embodiments.

As explained briefly above, in accordance with disclosed embodiments, a plurality of lists are generated, stored and updated in association with each transportation vehicle that is connected and operating in conjunction with the disclosed embodiments. Those lists include an approachList, a stopList and an inConflictZone list.

The approachList includes an unordered list of transportation vehicles that have been confirmed as approaching an intersection. A transportation vehicle may be added to the approachList as part of and during a map-matching process detailed in FIGS. 12 and 13, discussed above.

The stopList includes a list of transportation vehicles stopped at the intersection, ordered by the order in which each transportation vehicle reached the determined stop location for their respective segment of the intersection (starting with the earliest to arrive and ending with the latest to arrive).

The inConflictZone list includes an unordered list of transportation vehicles in motion that are in the process of actively passing through a central part of the intersection, which is referred to as the conflict zone because it is the area of the intersection wherein conflict between paths of travel of the vehicles occurs.

Process operations for generating and maintaining these lists are shown in more detail in FIG. 21. More specifically, following receipt of data, various data reception operations are performed. This may involve map-matching data of an RV using the MWS-BSM/CAM-like data and generating an error if the matching result is not in line with received matching result. Operations also include checking to determine if received vehicle ID is on any list (approachList, stopList, inCon?ictZone and storing this determination in memory. These operations may also include checking whether a received RV vehicle speed exceeds a standstill speed threshold.

Thus, for example, if the received vehicle data from the RV indicates that the RV vehicle is still moving, the vehicle is added to the approachList if the vehicle was on no list before. However, if the moving RV vehicle was on the approachList before, it is left on the approachList list. If the moving RV vehicle was on the stoplist before, the vehicle is added to the inCon?ictZone list. If the moving RV vehicle was on the inCon?ictZone list before, it is left on the inCon?ictZone list.

However, if the received RV vehicle data indicates that the RV is at a standstill, the lists are updated as follows. If the stationary RV vehicle was on the stopList before, it is left on the stop list. If the stationary RV vehicle was on the inCon?ictZone list before, an error is generated or the vehicle is kept on inCon?ictZone list. If the stationary RV vehicle was on approach list before, the RV vehicles is moved to the stopList. Subsequently, a cross-check/validation of a target list with received ?ags to determine whether to output an error if the HV's decision on determined state does not match up with a received state from the RV and debouncing algorithms/failure counting may be performed to ensure that a computed list and a received list match up over a certain duration.

Subsequently, sequence numbers may be computed based on updated lists as disclosed in more detail with reference to FIGS. 22-26C discussed herein). That is sequence numbers may be computed for all vehicles in the stopList and inCon?ictZone list (all vehicles in the con?ictZone must have sequence number 1 indicating they are first). Thereafter, a cross-check/validation of the computed sequence numbers is performed with the received sequence numbers (again, an error is output if the HV's decision does not match up with a received state, with debouncing algorithms/failure counting used to make sure that computed list and received list match up over a certain duration.

Figure 22:
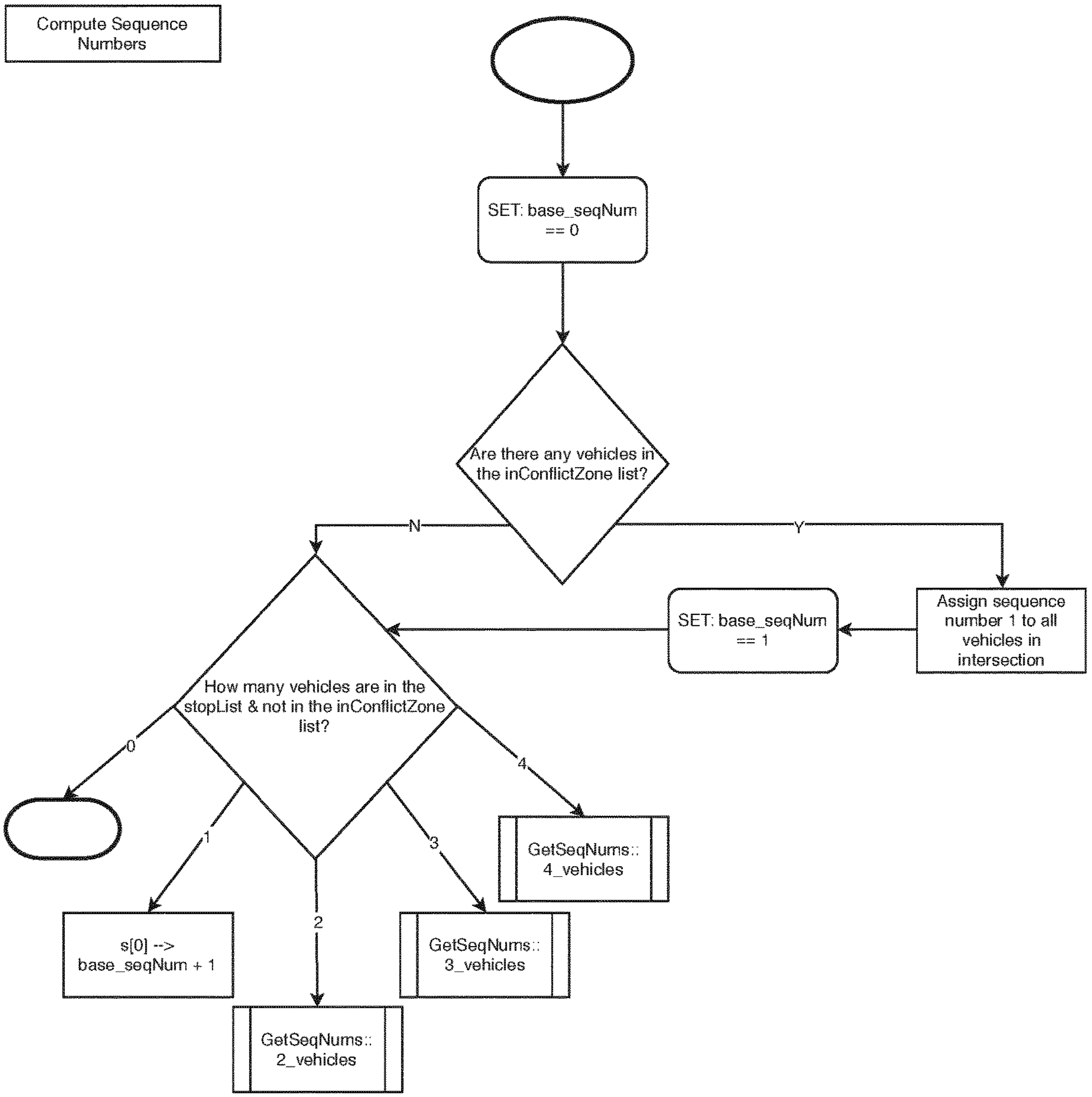
FIG. 22 illustrates various process operations for computing sequence numbers to be associated with each of a plurality of transportation vehicles at an intersection conflict zone in accordance with disclosed embodiments.
Figure 23:
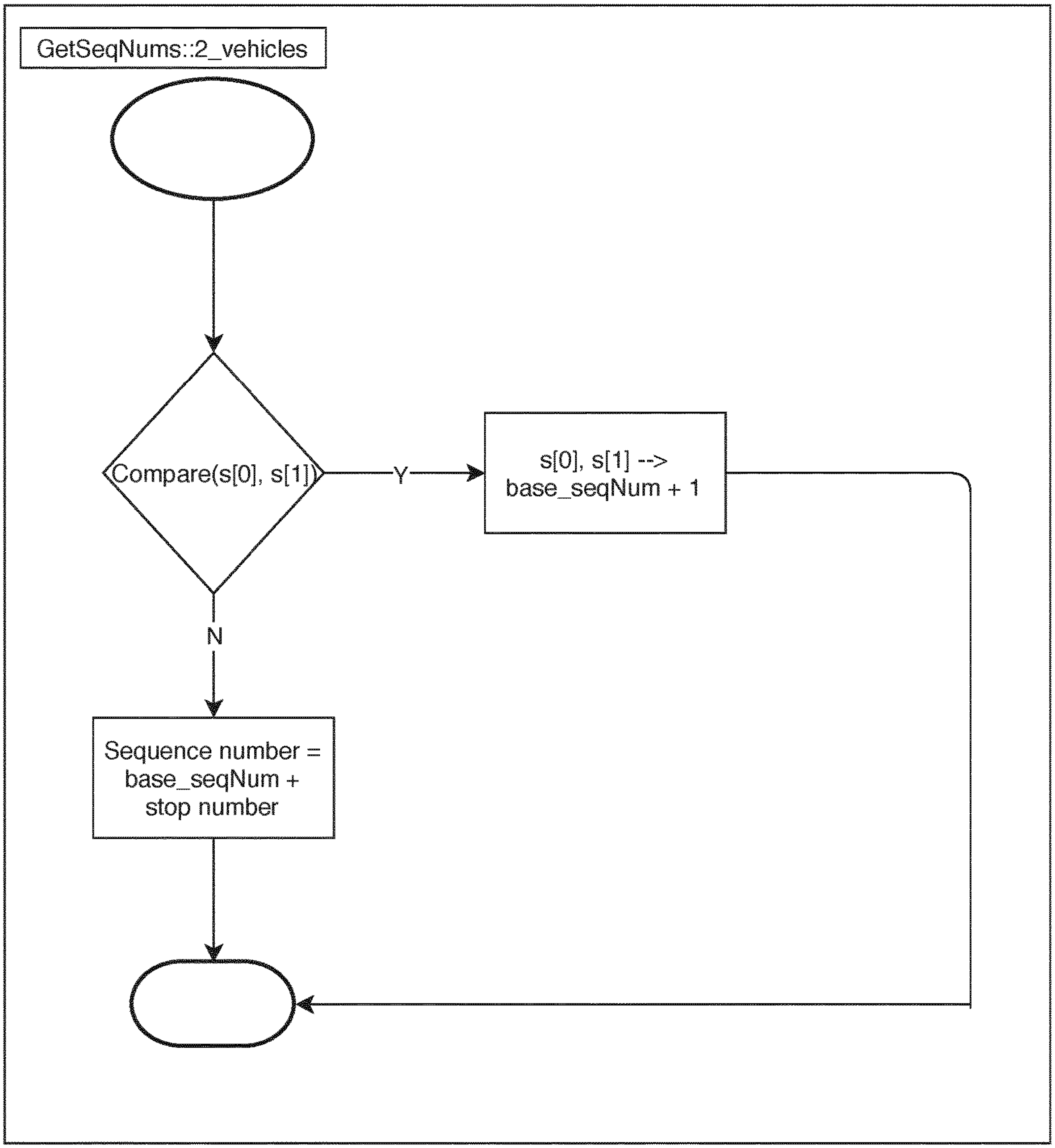
FIG. 23 illustrates additional detail regarding sequence computation for analysis for two vehicles at an intersection.
Figure 25A:
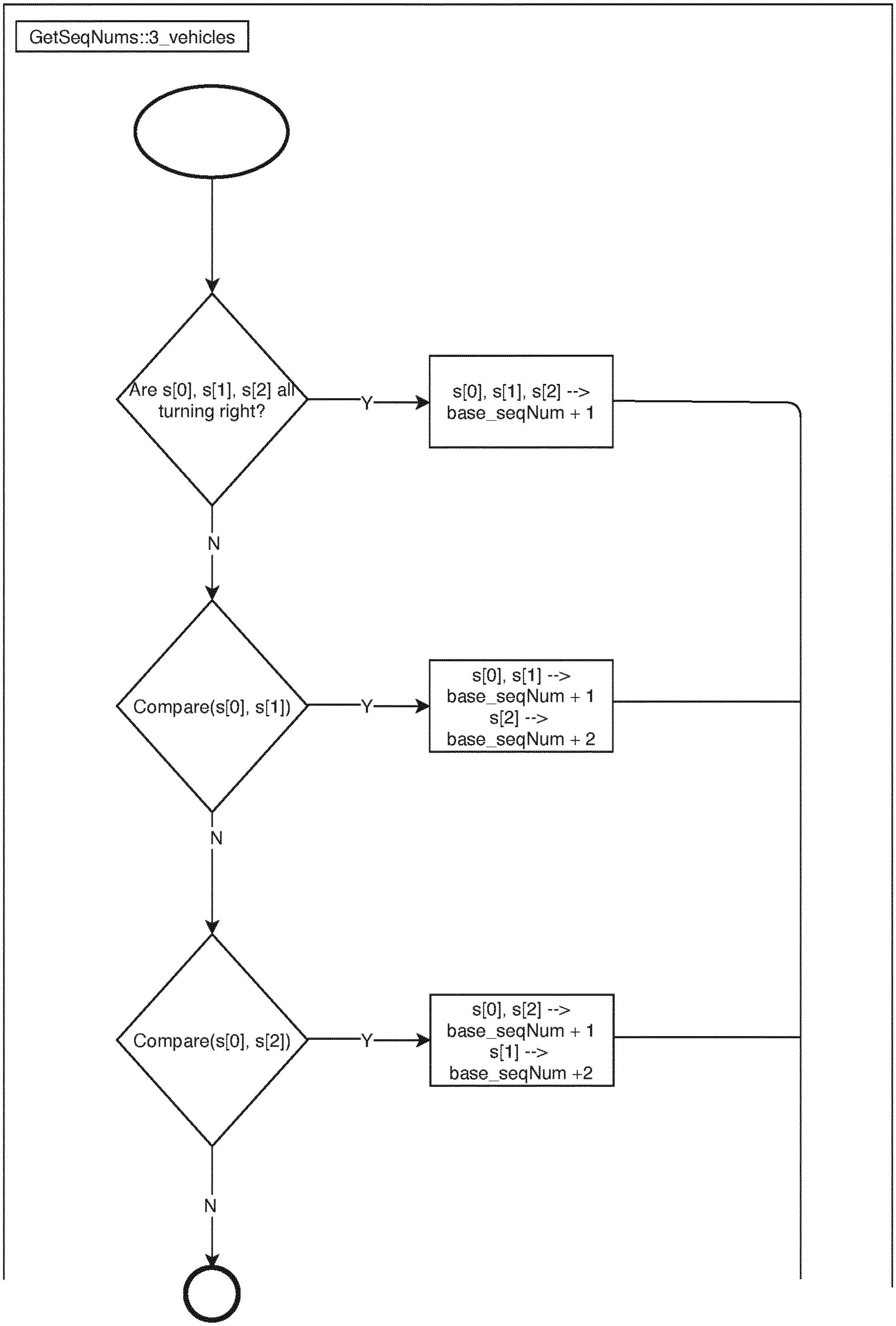
FIGS. 25A-25B illustrate additional detail regarding sequence computation for analysis for three vehicles at an intersection.
Figure 25B:
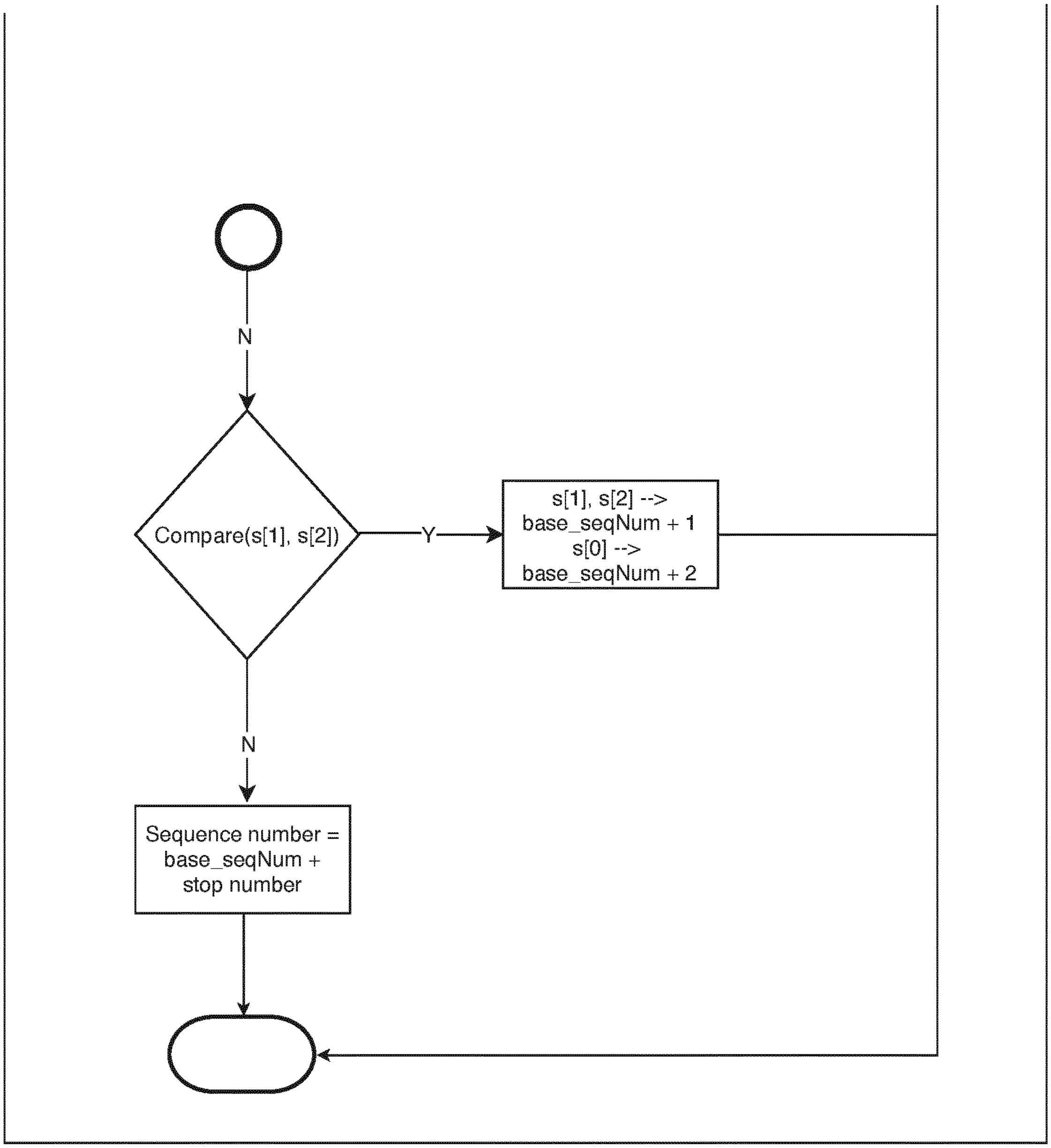
Figure 26A:
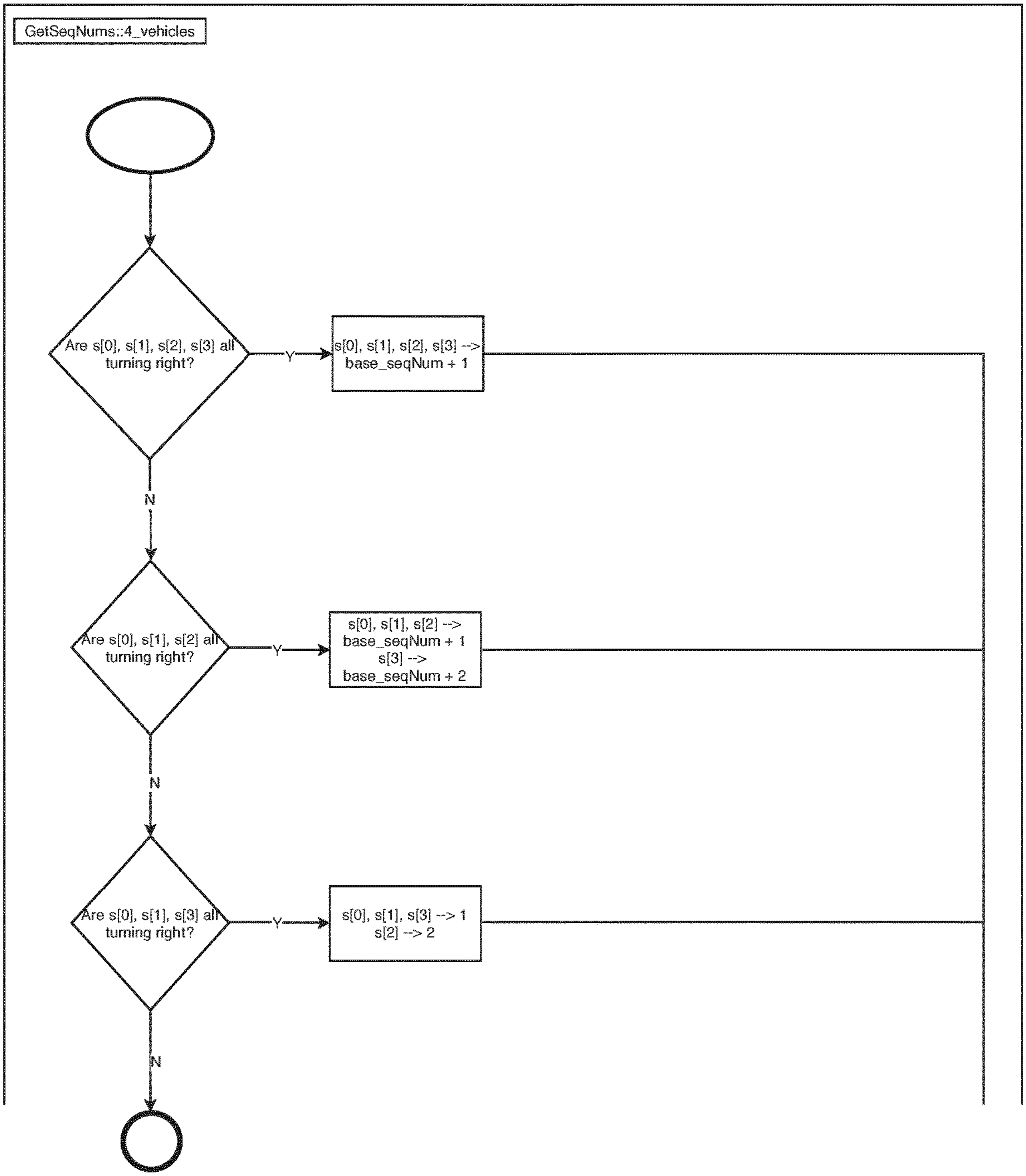
FIGS. 26A-26C illustrate additional detail regarding sequence computation for analysis for four vehicles at an intersection.
Figure 26B:
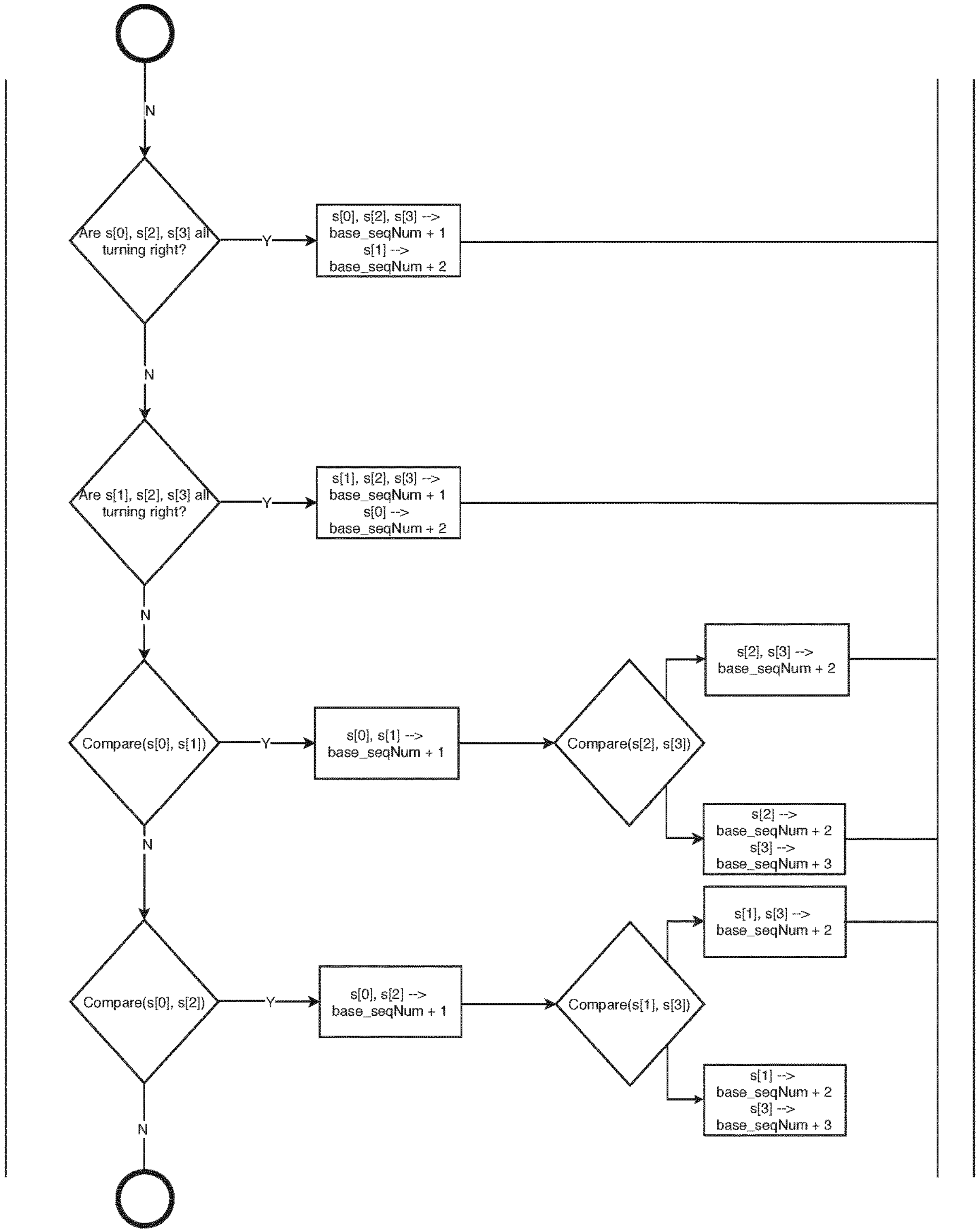
Figure 26C:
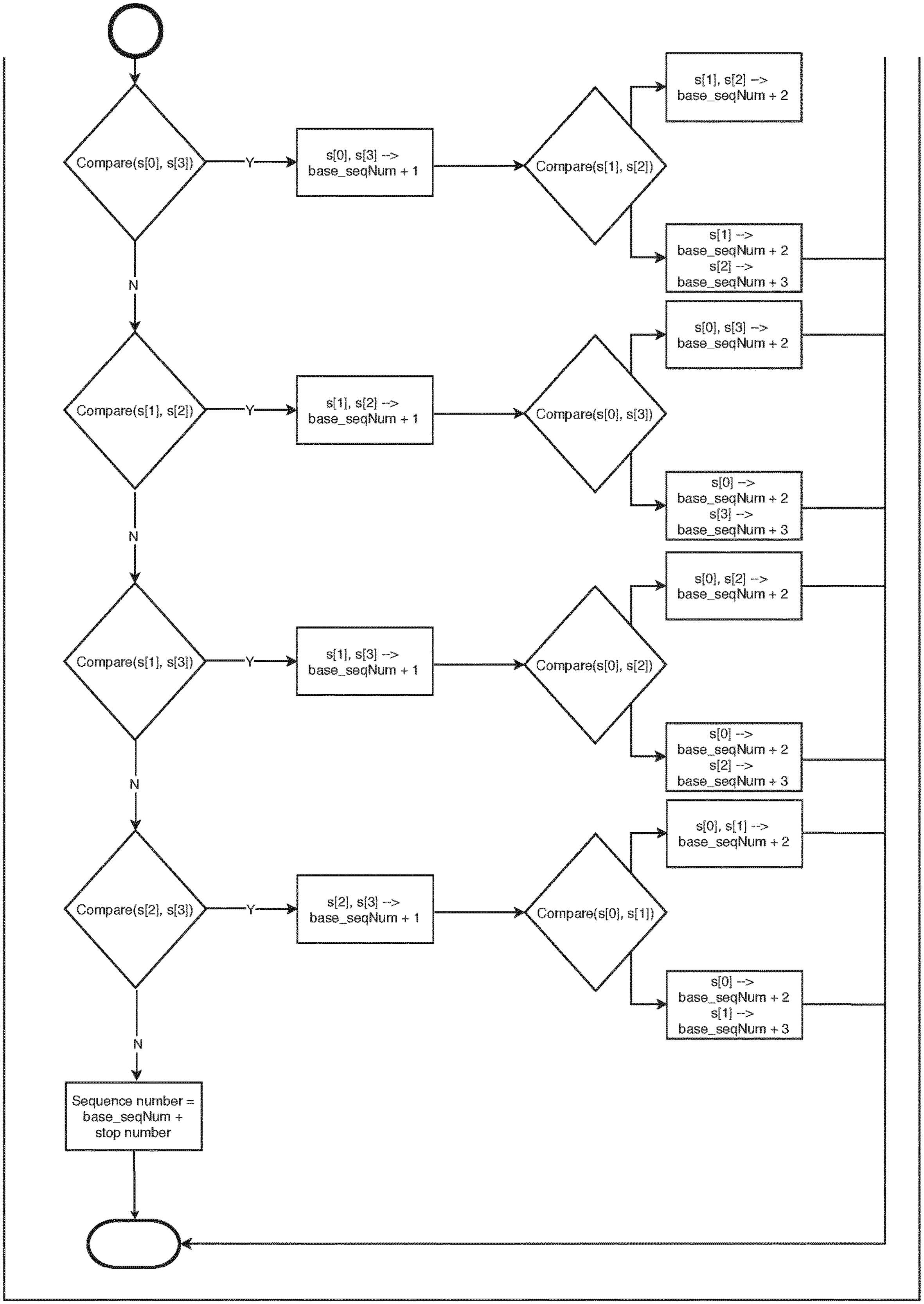

FIG. 22 illustrates one example of operations for computing sequence numbers to be associated with each of a plurality of transportation vehicles at an intersection conflict zone. As can be seen, the operations involve determining and comparing the stopList and the InConflictZone list to determine the number of vehicles to analyze. That analysis for two vehicles is illustrated in FIG. 23 with the incorporated comparison operation further illustrated in FIG. 24. Note, when there are only two vehicles at an intersection, the comparison operation need only be performed once. Whereas, when there are three vehicles (as illustrated in FIGS. 25A-25B) the comparison operation must be performed three times to identify the relative sequence among the three vehicles. Further, when there are four vehicles, (as illustrated in FIGS. 26A-26C) the comparison operation must be performed twelve times to provide the relative sequence among the four vehicles.

In above-identified figures, the sequence diagrams have been explained in the context of a four-way stop intersection; however, it should be understood that the disclosed embodiments and the underlying logic can be applied to an intersection of any size and complexity. In order to apply the solution, described here in detail for a 4-way stop, for an intersection of a different size, the analysis module need only create a new table listing each compatible combination of vehicle movements and adjust for doing sequence number comparisons for the new number of eligible vehicles, rather than the four detailed herein. All other functionality required for the disclosed embodiments, e.g., the MSWMs, lists, processes, etc., may be implemented as described herein.

In recognition of the fact that not all transportation vehicles will be fully-connected to transmit and receive V2V and V2X messaging technology, disclosed embodiments may be implemented to recognize that not all vehicles at an intersection are connected. If not all of the transportation vehicles at an intersection are connected, consensus among all of the transportation vehicles cannot be confirmed. As a result, the logic disclosed herein may be disabled or, alternatively, executed to provide one or more potential sequences for traversing the intersection with one or more non-connected vehicles (i.e., the vehicles unable to transmit and receive V2V and V2X messaging). For instance, the logic disclosed herein may predict one or more potential sequence orders for a non-connected vehicle based on one or more of the following: a time of arrival to a multiway stop intersection by the non-connected vehicle; visual, audio, and/or other sensory cue(s) from the non-connected vehicle; a predicted path through the intersection for the non-connected vehicle; and any other indicator of order or direction for the non-connected vehicle. An overall consensus among the connected vehicles can be executed based on the potential sequence orders for the one or more non-connected vehicles. To prevent potential collisions, the sequence order can be recalculated and executed on the fly by the connected vehicles based on any deviation in action by the non-connected vehicles.

Accordingly, in at least one disclosed embodiment, the analysis module may receive and analyze vehicle sensor data (e.g., one or more on-vehicle cameras, LiDAR, etc.) to determine whether all nearby transportation vehicles are communicating with BSMs/CAMs and MWSMs. Thus, it should be understood that, if a vehicle's analysis module determines that another vehicle approaching the intersection is not transmitting data, the analysis module can terminate the formulation of a proposed intersection navigation scheme for that intersection. Alternatively, the vehicle's analysis module can predict one or more potential sequence orders for the non-connected vehicle(s) and decide on one of those sequence orders for consensus.

It should be understood that the functionality and operations disclosed herein as being performed by a transportation vehicle or a transportation vehicle's analysis module, are provided by software as well as one or more processors, for example, a Central Processing Unit (CPU) along with one or more types of computer accessible memory and other components implemented within or on the transportation vehicle itself.

Thus, although not discussed in detail herein, it should be understood that the analysis module, implemented via software and hardware may be coupled to or included in a transportation vehicle's Controller Area Network (CAN) so as to communicate with sensors and control systems for the transportation vehicle via the vehicle's CANbus. Accordingly, it should be understood that the intersection navigation analysis module may be implemented in whole or in part using one or more Electronic Control Units (ECUs) communicating with one or more sensors to determine whether consensus/agreement can be reached by all transportation vehicles at or approaching an intersection.

The method operations and functionality described herein may be implemented by software and compiled and stored to a memory as software code. It should be understood that code disclosed herein was written in the C programming language; however, there is no specific requirement for any particular type of programming language. Therefore, disclosed embodiments and their functionality may be implemented in various different programming languages.

During runtime, the software may be invoked for execution by one or more processors. A memory controller may manage the flow of data by interfacing between memory and processors. A system or data bus, e.g., the CANbus, may electronically connect memory to one or more communications network interfaces that enable the transmission and receipt of MWSM data wirelessly via, for example, Dedicated Short-Range Communication (DSRC).

Thus, it should be understood that, although not disclosed in detail, each vehicle may have an ID generating system that generates vehicle identification information that can be used for vehicle monitoring purposes. The identification information may include, for example, a time stamp, vehicle location, such as by GPS coordinates and a time stamp associated with the GPS coordinates. As alluded to above-this is the basis of BSMs/CAMs in V2X technology.

Disclosed embodiments may be implemented in conjunction with components of autonomous driving systems and driver assistance systems included in transportation vehicles. Thus, the utility of the disclosed embodiments within those technical contexts has been described in detail. However, the scope of the innovative concepts disclosed herein is not limited to those technical contexts. Further, it should be understood that driver assistance and/or autonomous driving functionality may be provided by a vehicle control system that may be employed, wherein a driver may select or override a selection generated by the intersection navigation analysis module.

Figure 27:
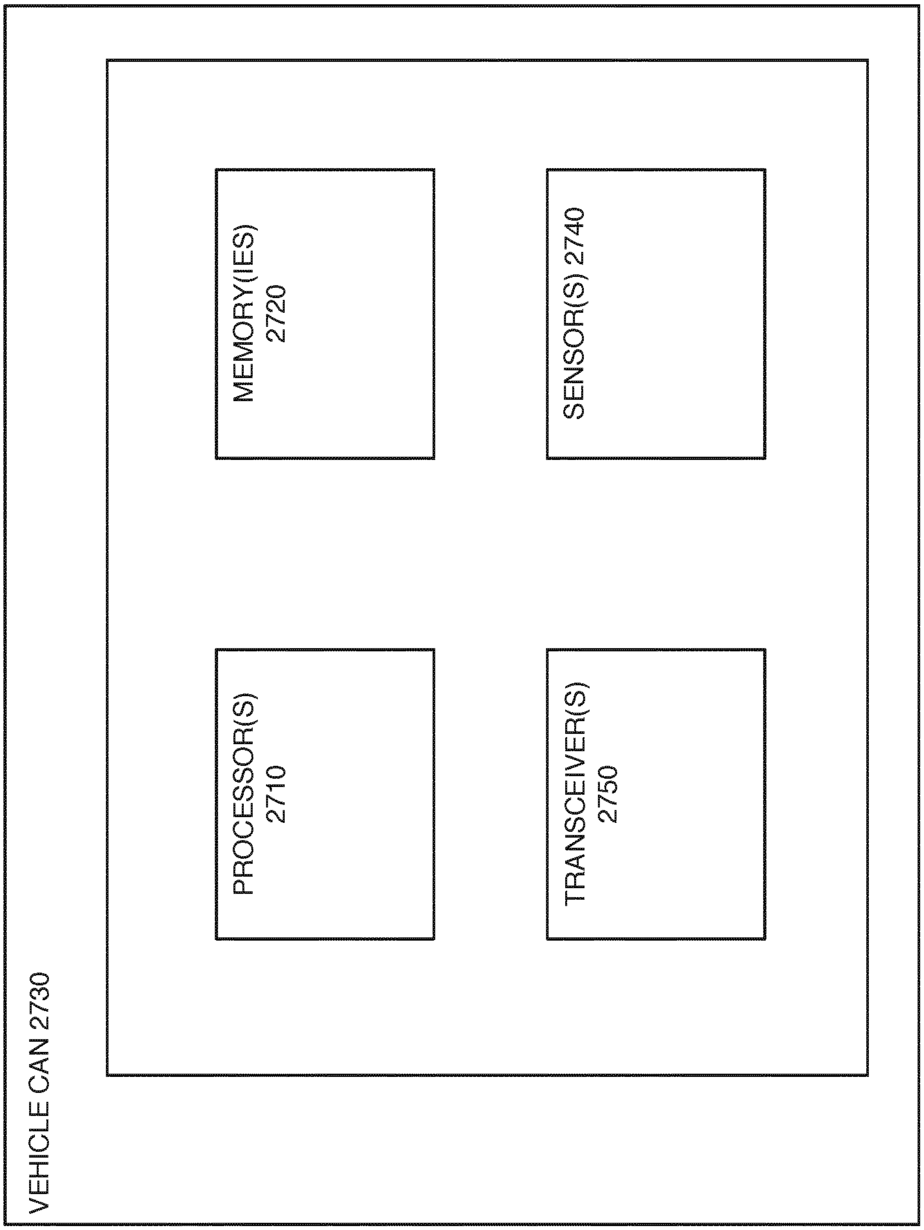
FIG. 27 illustrates an example of components of an intersection navigation analysis module that may be implemented as part of or coupled to a transportation vehicle's CAN.

As illustrated in FIG. 27, an intersection navigation analysis module 2700 may include one or more processors 2710 coupled to one or more memories 2720 and coupled to or implemented within a transportation vehicle's CAN 2730. That intersection navigation analysis module 2700 may similarly be coupled to one or more vehicle sensors 2740 and transceivers 2750 to communicate with other vehicles, infrastructure and components via communication technologies to implement V2X messaging, in particular, the transmission and receipt and analysis of MWSM data.

It should be understood that the intersection navigation analysis module may be implemented using dedicated or shared hardware included in a transportation vehicle. Therefore, components of the module may be used by other components of a transportation vehicle to provide vehicle functionality without departing from the scope of the invention.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. In some illustrative embodiments, well-known processes, well-known device structures, and well-known technologies are not described in detail.

Terminology has been used herein for the purpose of describing particular illustrative embodiments only and is not intended to be limiting. The singular form of elements may be intended to include the plural forms, unless the context indicates otherwise. The method steps, processes, and operations described herein are not to be construed as necessarily requiring their performance in the particular order discussed or illustrated, unless specifically identified as an order of performance or a particular order is inherently necessary for embodiment to be operational. It is also to be understood that additional or alternative steps may be employed.

Embodiments in accordance with the disclosure include the methods described herein and their equivalents, non-transitory computer readable media programmed to carry out the methods and a computer system configured to carry out the methods. Further included is a vehicle having components that include any of the methods, non-transitory computer readable media programmed to implement the instructions or carry out the methods, and systems to carry out the methods. The computer system, and any sub-computer systems will typically include a machine readable storage medium containing executable code; one or more processors; memory coupled to the one or more processors; an input device, and an output device connected to the one or more processors to execute the code. A machine-readable medium may include any mechanism for storing or transmitting information in a form readable by a machine, such as a computer processor. The information may be stored, for example, in volatile or non-volatile memory.

Modules, data structures, and the like are referred to as such for ease of discussion, and are not intended to imply that any specific implementation details are required. For example, any of the described modules or data structures may be combined or divided into sub-modules, sub-processes or other units of computer code or data as may be required by a particular design or implementation. In the drawings, specific arrangements or orderings of schematic elements may be shown for ease of description but may be suitably modified to implement embodiments of the disclosure. In general, schematic elements used to represent instructions or modules may be implemented using any suitable form of machine-readable instruction, and each such instruction may be implemented using any suitable programming language, library, API, or other software development tools or frameworks. Similarly, any suitable electronic arrangement or data structure of elements described may be implemented. Further, some connections, relationships or associations between elements may be simplified or not shown in the drawings so as not to obscure the disclosure.

It will also be understood that the term "module" as used herein does not limit the functionality to particular physical modules, but may include any number of tangibly-embodied software or hardware components. A module will typically comprise a tangible computer readable medium having computer-readable program code embodied therein, wherein the computer-readable program code is adapted to be executed by a processor (working in connection with an operating system) to implement one or more functions and methods of the module. In this regard, the program code may be implemented in any suitable language and as any suitable type of code. A module may also comprise a plurality of modules functioning in concert to carry out the intended function.

Various embodiments of the invention have been described, each having a different combination of elements. The invention is not limited to the specific embodiments disclosed, and may include different combinations of the elements disclosed, omission of some elements or the replacement of elements by the equivalents of such structures.

Embodiments include the methods described herein and their equivalents, a non-transitory computer readable medium programmed to carry out the methods and a system configured to carry out the methods. Further included is a vehicle having components that include any of the embodiments or components of other embodiments disclosed herein. The presently disclosed systems, and any sub-computer systems include a machine readable storage medium containing an executable code; one or more processors; memory coupled to the one or more processors; an input device, and an output device connected to the one or more processors. The system and methods can be coordinated on a server or other communications network or system.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

In the following FIGS. 1-27 are described in more detail.

FIGS. 1 to 7 show an exemplary illustration from a bird's eye perspective of four C-V2X equipped transportation vehicles, which actively coordinate how they proceed at a four-way stop intersection by C-V2X messages. C-V2X messages may include BSM (Basic Safety Message)/CAM (Cooperative Awareness Message) and MWSM (Multi-Way Stop message) transmitted between a host vehicle (HV) and one or more remote vehicles (RV) among the C-V2X equipped transportation vehicles. To enable the active coordination each vehicle has components and functionality, e.g. an intersection navigation analysis module. The four-way intersection as shown in FIGS. 1 to 7 is formed of four ways or road sections, with two lanes each. The first lane may be characterized as an arrival lane for vehicles approaching the intersection, whereas the second lane may be characterized as departure lane for vehicles leaving the intersection. The first lane has a stop attribute, such as a stop sign at which approaching vehicles must stop before crossing the intersection.

FIG. 1 shows the approach phase of four vehicles from different directions, thus each from a different first lane, at the four-way stop intersection. To determine if the respective vehicle is in a lane with a stop sign, map-matching functionality may be performed. Then the intersection navigation analysis module of each vehicle begins monitoring the vehicle velocity if some seconds away from a predefined stop location or stop position, determined by the stop sign. Subsequently the intersection navigation analysis module of each vehicle begins to match the received BSMs of all other approaching vehicles.

As shown in FIG. 2 the approaching according to FIG. 1 is ended when all vehicles come to a complete stop at the predefined stop location (stop phase) and the consensus protocol operations begins to determine the "first to launch".

FIG. 3 shows the agreement phase, in which the vehicles agree on the vehicle to launch first from stop position. The vehicles may also agree on a sequence or rank of launching one after the other. In the following the vehicle to launch first is referred to as first vehicle, the vehicle to launch second is referred to as second vehicle, the vehicle to launch third is referred to as third vehicle and the vehicle to launch fourth is referred to as fourth vehicle. As shown in FIG. 3 an output notification may be output to the driver of the respective vehicle via the HMI (Human Machine Interface). The HMI is displayed as display in the dashboard of each vehicle. The notification may display either a "STOP" or a "GO" message depending on whether the respective vehicle is the first vehicle. As shown in FIG. 3, vehicle 1 is agreed to be the first vehicle. Therefore the HMI of vehicle 1 displays the "GO" message for the driver. Simultaneously the HMI of vehicles number 2, 3 and 4 display the "STOP" message for the driver, as to indicate to remain in the stop position.

In FIG. 4 the subsequent departure of vehicle 1 is shown. Therefor the driver of vehicle 1 may accelerate and enter the intersection in a desired direction, e.g. straight ahead. While vehicle 1 enters the intersection, the HMI of vehicle 1 terminates displaying the notification information. Vehicles 2, 3 and 4 still remain in the stop position and the "STOP" message is still displayed to the respective driver.

As soon as the intersection is clear, that is vehicle 1 has left the conflict zone of the intersection, the second vehicle, which is according to the agreement phase agreed to be the second vehicle to launch, gets clearance to enter the intersection, as shown in FIG. 5. Therefore the HMI of the second vehicle switches from displaying the "STOP" message to displaying the "GO" message. Thereupon the driver of the second vehicle may accelerate and enter the intersection in a desired direction, e.g. straight ahead. In FIG. 5 vehicle 2 is shown as the second vehicle. Meanwhile, vehicles 3 and 4 still remain in the stop position and the "STOP" message is still displayed to the respective driver.

FIG. 6 shows the situation of the third vehicle getting clearance to enter the intersection. As soon as the intersection is clear, that is vehicle 2 has left the conflict zone of the intersection, the HMI of the third vehicle, which is according to the agreement phase agreed to be the third vehicle to launch, switches from displaying the "STOP" message to displaying the "GO" message. The driver of the second vehicle may then accelerate and enter the intersection in a desired direction, e.g. straight ahead. In FIG. 6 vehicle 3 is shown as the third vehicle. Meanwhile, vehicle 4 still remains in the stop position and the "STOP" message is still displayed to the respective driver.

Finally, after vehicle 3 has cleared the conflict zone of the intersection and the intersection is clear, the fourth vehicle which is according to the agreement phase agreed to be the last vehicle to launch, gets clearance to enter the intersection, as shown in FIG. 7. In FIG. 7 vehicle 4 is shown as the fourth vehicle. To allow the driver entering the intersection the HMI of vehicle 4 switches from displaying the "STOP" message to displaying the "GO" message. Thereupon the driver of the fourth vehicle may accelerate and enter the intersection in a desired direction, e.g. straight ahead.

According to an embodiment, among all vehicles still located at the intersection, the vehicle, which has first stopped at the respective stop location, may be the HV while all other vehicles may be the RVs.

In FIG. 8 a sequence chart outlining the message exchange between four participants to coordinate a launch at a multiway intersection, as described before, is shown. In this exemplary illustration the first participant may be an infrastructure, and the second and third participants may be vehicles. In particular the second participant may be a remote vehicle (RM) and the third participant may be a host vehicle (HV). The fourth participant may be the HMI of the HV.

The message exchange according to the sequence chart in FIG. 8 may proceed as follows. While the HV and the RV approach the intersection, the infrastructure broadcasts a MAP-message to the HV. The MAP-message may include information regarding the presence of the stop attribute. For example the infrastructure may provide a digital map (map data or map information) to the HV with the MAP message. Receiving the MAP-message triggers the map-matching functionality of the HV. Thus the HV verifies according to a first condition if it stays in a lane with the stop attribute (On Lane with Stop sign). In addition the HV determines the time of arrival (TOA) at the stop position and verifies according to a second condition whether the TOA is less than a specified threshold time (t_thresh_from_stop_location).

If both conditions are confirmed, a first activity of the HV is initiated. During the first activity the application to coordinate the launching at the multiway intersection is activated (Application start) by the HV and the HV performs a BSM matching functionality (BSM matching). To perform the BSM matching the RV provides a BSM to the HV. Thus the HV and the RV are enabled to recognize each other as connected V2X vehicles.

After receiving the BSM message the first activity is terminated and the HV provides a message to the host vehicle HMI to display a predefined approach interaction (display APPROACH interaction).

Afterwards the aforementioned approach phase is triggered as a second activity of the HV. A program sequence of the approach phase will be explained in more detail with regard to FIG. 9. As part of the approach phase and during the second activity, the HV broadcasts a first MWSM to the RV. Content of the first MWSM may only concern semantic information about the approach of the HV to the stop position (only ApproachContainer).

As soon as the second activity is ended, the approach phase is terminated and the HV provides a message to the host vehicle HMI to display a predefined stop interaction (display STOP interaction).

Thereafter follows the aforementioned stop phase which is triggered as a third activity of the HV. A program sequence of the approach phase will be explained in more detail with regard to FIG. 10. As part of the stop phase and during the third activity the HV broadcasts a second MWSM to the RV. In response the RV broadcasts a first MWSM as well. Both, the second MWSM of the HV and the first MWSM of the RV may include semantic information about the approach of the vehicles to their respective stop position as well as semantic information about the respective stop sequence (initiation of the stopping or breaking procedure) of the vehicles (Approach- and stoppedSequence Container). In addition the RV broadcasts a second MWSM, which may only concern semantic information about the stop sequence of the RV (only stoppedSequence Container), especially the time of the complete stop at the stop position of the RV.

After receiving the second MWSM of the RV, the third activity is terminated and the stop phase is completed. Subsequently the HV provides a message to the host vehicle HMI to display a predefined launch interaction for the driver (display LAUNCH interaction).

Afterwards the aforementioned launch phase is triggered as a fourth activity of the HV. A program sequence of the launch phase will be explained in more detail with regard to FIG. 11. As part of the launch phase and during the fourth activity, the HV broadcasts a third MWSM to the RV. Content of the third MWSM may only concern semantic information about the launch of the HV from the stop position to the conflict zone of the intersection (idInConflictZone). Particularly the fourth MWSM of the HV may indicate that the HV has left the conflict zone of the intersection.

Receiving the third MWSM by the RV terminates the fourth activity and the launch phase is completed. With completing the launch phase the message exchange between the four participants to coordinate a launch at a multiway intersection according to FIG. 8 is terminated.

FIGS. 9 to 11 show respective flow charts describing the program sequence of the approach phase, the stop phase and the launch phase from the perspective of a certain vehicle, such as the describes HV, approaching the multiway intersection in more detail.

The approach phase according to FIG. 9 starts with a start step. In a following first decision step the vehicle speed is compared to a predefined standstill threshold (vehicle speed<standstill threshold?). If the vehicle speed is less than the standstill threshold the approach phase is terminated and the process continues with the stop phase. However if the vehicle speed is greater than or equal the standstill threshold the flow continues with a second decision step. In the second decision step it is verified whether a predefined time to broadcast the MWSM (t_MsgGen) is less than a subtraction of a time when the last MWSM (t_lastMsg) was sent from the current time (t). This will ensure that the MSWM is broadcasted at a regular cadence. If no, the flow returns to the second decision step and the query regarding the time of message generation is repeated. If yes, the flow continues with accessing a list of all matched BSM vehicles. This list may include the IDs of all V2X equipped vehicles in a predefined surrounding area around the vehicle which are approaching the intersection together with the vehicle. In a following activity step the vehicle ID of the approaching vehicle is added to a vehiclesInApproach Container. The vehiclesInApproach Container may represent a list or data object with vehicle IDs of all vehicles which are approaching the intersection at a predefined time period together with the approaching vehicle. The vehiclesInApproach Container may represent the approach List as described before. In addition the vehicle ID of the approaching vehicle is also confirmed in a vehiclesStopSequence Container. The vehiclesStopSequence Container may represent a list or data object with vehicle IDs of all vehicles that have stopped at the respective stop position while the IDs are sorted by the vehicles' time of arrival at their respective stop position. The vehiclesStopSequence Container may represent the stopList as described before. Afterwards the flow continues with a third decision step to verify if more matched IDs are available. If yes, the flow returns to accessing the list of matched BSM vehicles, to add further vehicle IDs. If no, the flow continues with an activity step, where the vehicle broadcasts its MWSM regarding the approach of the intersection. After broadcasting the MWSM the flow returns to the second decision step and the process is repeated from there.

The stop phase according to FIG. 10 starts with a start step. In a subsequent first activity step a time of arrival of the HV at the respective stop position for the vehicle is set and the flow continues with a second activity step. In the second activity step the time of arrival and the vehicle (especially the vehicle ID) is added to the vehiclesStopSequence Container (stopList). The flow continues with a sorting step, in which the received vehicles (vehicle IDs) in the vehiclesStopSequence Container are sorted according to their time of arrival at the stop position. Afterwards the flow continues with a third activity step and the HV broadcasts the MWSM. In a subsequent first decision step it is verified whether all vehicles listed in the vehiclesStopSequence Container which match the vehicles in the list of matched BSM vehicles are stopped. If no, the flow continues with a fourth activity step whereas the vehicle first to launch among all stopped vehicles at the intersection is set as proposedLaunchVehicle while taking one (or more) vehicle(s) which is (are) already in the conflict zone of the intersection (idInConflictZone) into consideration. The vehicles in the conflict zone may be listed in the inConflictZone List as described before. Then the flow returns to the second activity step. If yes, the flow continues with a second decision step to verify whether this vehicle is the first vehicle according to the vehiclesStopSequence list. If no, the flow continues with the aforementioned fourth activity step. If yes, the flow continues with a third decision step to verify whether this vehicle is the vehicle first to launch, thus the proposedLaunchVehicle. If no, the flow continues with the aforementioned fourth activity step. If yes, the flow continues with a fourth decision step to verify whether the responses of all other vehicles confirm that this vehicle is proposed the vehicle first to launch. If no, the flow continues with the aforementioned fourth activity step. If yes, it is safe to advance, the stop phase is terminated and the process continues with the launch phase.

The launch phase according to FIG. 11 starts with a start step. In a first decision step it is verified whether the vehicle speed is greater than the standstill threshold. If no, the flow returns to the first decision step. If yes, the flow continues with a first activity step to set the vehicles ID for idInConflictZone. Afterwards the flow continues with a second activity step and the MWSM is broadcasted by the vehicle. In a subsequent decision step it is verified whether the vehicle has left the conflict zone of the intersection. If no, the flow returns to the first activity step. If yes, the process is terminated in a stop step and the launch phase of the vehicle is completed.

FIGS. 12 to 21C illustrate operations or processes performed by the intersection navigation analysis module for a vehicle, e.g. the HV, to match received BSM/CAM data from other vehicles, e.g. RVs, identified as approaching an intersection and coordinate their launch in more detail.

Two flow charts, as illustrated in FIG. 12, describe additional details regarding the list maintenance of the aforementioned approachList, the stopList and the inConflictZone List as well as an overview process from the map matching to the MWSM generation of the HV. The processes or operations illustrated in the flow charts in FIG. 12 may be performed simultaneously.

The list maintenance process begins with a start step, followed by a first activity step, in which the intersection analysis module may receive data from a so-called PC5-communication module for this PSID (Provider Service Identifier). The received data may be the aforementioned BSM/CAN data and/or the MWSM. Then the flow continues with a predefined process referred to as OnRx list maintenance, explained in more detail with regard to FIG. 21A to 21C.

The overview process according to FIG. 12 begins with a start step as well, which is followed by a first activation step to activate a cyclic trigger. The flow continues with a first predefined process referred to as map matching and HV state provider, explained in more detail with regard to FIG. 13. This first predefined process provides additional information about the map matching of the HV and the RVs as well as the analysis of the HV state. As explained before, the operations for the map matching and the state analysis of the HV may be performed on the cyclic trigger. After map matching and HV state analysis the flow continues with a second predefined process referred to as Application Logic, explained in more detail with regard to FIGS. 14 to 18 and 20. This second predefined process provides additional information about how the transition between the phases (e.g. approach phase, stop phase, launch phase) of the HV and the RVs may be realised. After the Application Logic process the flow continues with a third predefined process referred to as MWS Message generation, explained in more detail with regard to FIG. 19. This third predefined process provides additional information how the MWSM may be generated and transmitted to other vehicles as the RVs. Finally, the flow returns to the cyclic trigger activation and the process continues from the beginning.

As mentioned before, FIG. 13 illustrates the map matching and HV state provider process. The map matching an HV state analysis may include various operations performed on a cyclic triggered basis. The operations may be: creating and populating HV data, such as MWSM, performing map matching with regard to the received BSM/CAM data from the RVs, determining an offset to the closest lane, determining the current lane of the HV, determining the target lane of the HV based on a turn signal status, determining the distance to the stop location and performing an estimation of the TOA at the stop location. To perform the map matching the Intersection navigation analysis module may verify the position of each approaching vehicle within a predefined bounding box. The bounding box may be given by the dimensions of each way or road section of the four-way intersection, as shown in FIG. 13. In addition the module may verify that the orientation of each vehicle is within valid heading ranges to determine the approach to the intersection. The intersection navigation analysis module may also consider a +/−10 degree angle from a predefined centre around the respective median stripe of first and second lane to verify the orientation of the vehicle in the first lane.

FIG. 14 illustrates the aforementioned Application Logic process as a flow chart, describing the operation of a state machine provided by the intersection navigation analysis module to coordinate the launch at an intersection. The flow begins with a start step, followed by a decision regarding whether the MWSM application of the intersection navigation analysis module was activated by querying the state of a predefined variable referred to as activate_MWS_App (activate_MWS_App==true?). If no, the flow continues with a first predefined process referred to as AppL: Check App Activation, to confirm the functionality of the application. The AppL: Check App Activation process is described in more detail with regard to FIG. 15. After executing the AppL: Check App Activation process the flow continues with an end step and the Application Logic process is terminated. However, if activate_MWS_App is true, the flow continues with a first activity step, whereas a state machine of the intersection navigation analysis module selects or determines the current state of the vehicle (HV) and stores it in a predefined variable referred to as currentState. The possible states are: state_approach, indicating that the vehicle is in the approach phase, state_stop, indicating that the vehicle is in the stop phase, state_launch, indicating that the vehicle is in the launch phase, and state_inConflictZone, indicating that the vehicle has entered the conflict zone of the intersection. After the current state selection, the flow continues with a second activity step to set the value of a predefined variable referred to as last_state to the previously determined current state. If last_state is set to state_approach the flow continues with a second predefined process referred to as AppL: Approach, describing the approach operation of the state machine. The AppL: Approach process is described in more detail with regard to FIG. 16. However, if last_state is set to state_stop the flow continues with a third predefined process referred to as AppL: Stop, describing the stop operation of the state machine. The AppL: Stop process is described in more detail with regard to FIG. 17. However, if last_state is set to state_launch the flow continues with a fourth predefined process referred to as AppL: Launch, describing the launch operation of the state machine. The AppL: Launch process is described in more detail with regard to FIG. 20. Finally, if last_state is set to state_inConflictZone the flow continues with a second predefined process referred to as AppL: inConflictZone, describing the in conflict zone operation of the state machine. The AppL: inConflictZone process is described in more detail with regard to FIG. 18. After executing the AppL: Approach process or the AppL: Stop process or the AppL: Launch process or the AppL: inConflictZone process the flow continues with the end step and the Application Logic process is terminated.

Figure 15:
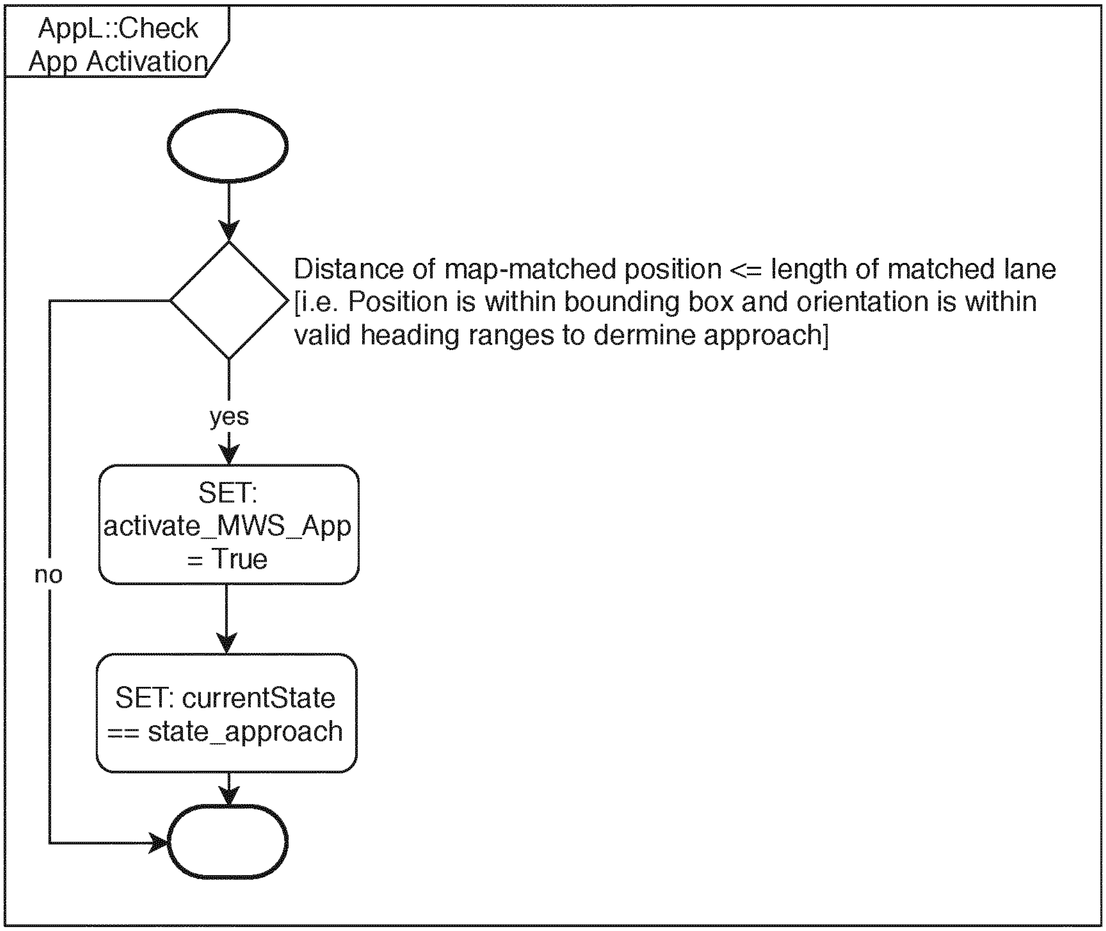
FIG. 15 illustrates additional detail regarding activation of the function of the disclosed embodiments.

FIG. 15 provides additional detail regarding the aforementioned AppL: Check App Activation process, illustrated as flow chart. The flow begins with a start step, followed by a decision step to verify whether the distance of a map-matched position of the vehicle is equal or less than the length of the matched lane. For this purpose the intersection navigation analysis module may determine whether the vehicles position is within a bounding box and its orientation is within valid heading range to determine the approach to the stop location, as described before. If no, the flow continues with an end step and the AppL: Check App Activation process is terminated. If yes, the flow continues with a first activity step and the aforementioned activate_MWS_App variable is set true. Then the flow continues with a second activity step in which the currentState variable is set to state_approach. Finally the flow continues with the end step and the AppL: Check App Activation process is terminated.

FIG. 16 provides additional detail regarding the aforementioned AppL: Approach process, illustrated as flow chart. The flow begins with a start step, followed by a first activity step to add a copy of data stored in the data object or data structure m_egoData is added to the data object or data structure m_approachList. m_approachList may represent the approachList as described before. m_egoData may include detailed information or fields about the vehicle such as: a timestamp [s], a position (e.g. latitude [deg], longitude [deg], heading [deg]), a velocity (e.g. longitudinal speed [m/s], lateral speed [m/s]), an acceleration (longitudinal acceleration [m/ss], lateral acceleration [m/ss]), a light_status (e.g. turn_signal_bitmask, brake_light [bool]), a map_matching (e.g. matched_lane_ID, dist_stop_location [m], target_lane_ID) and a MWSData (e.g. ETA, stopTime, sequenceNumber, sequenceNumber_verified, inConflictZone?). Afterwards the flow continues with a first decision step to verify whether the vehicle speed (vehicle_speed) is equal or less than the standstill threshold (standstill_threshold). If no, the flow continues with an end step and the AppL: Approach process is terminated. If yes, the flow continues with a second decision step to verify whether the distance to the stop location (dist_stop_location) is equal or less than a predefined distance threshold to the stop location (stop_location_threshold). If no, the flow again continues with the end step. If yes, the flow continues with a second activity step and the current state of the state machine is set to state_stop. Finally the flow continues with the end step and the AppL: Approach process is terminated.

FIG. 17 provides additional detail regarding the aforementioned AppL: Stop process, illustrated as flow chart. The flow begins with a start step, followed by a first decision step to verify whether the stop time (stopTime) is set for the vehicle. If no, the flow continues with a first activity step and the stop time is recorded. In addition a copy of data stored in m_egoData is added to the data object or data structure m_stopList and the vehicle (especially the vehicle ID) is removed from m_approachList. m_stopList may represent the stopList as described before and thus may be available as sorted list of all vehicles at the intersection according to their stop time. If yes, the flow continues with a second activity step and the data of m_egoData stored in m_stopList is updated. Afterwards the flow continues with a first decision step to determine whether the vehicle's sequence number (sequenceNumber) is equal to 1. At this step, every vehicle in the stop list may be assigned a sequence number. The sequence number may be assigned in the OnRx List Maintenance process. If there is only vehicle at the stop sign, the vehicle automatically get to proceed. Every vehicle may maintain its sequence number as long as it is in the intersection. If the sequence number is not equal to 1, the flow continues with an end step and the AppL: Stop process is terminated. However, if the sequence number is equal to 1, the flow continues with a third activity step and the current state of the state machine is set to state_launch. Finally the flow continues with the end step and the AppL: Approach process is terminated.

FIG. 20 provides additional detail regarding the aforementioned AppL: Launch process, illustrated as flow chart. The flow begins with a start step, followed by a first decision step to verify whether last_state was set to state_lauch. If no, a launch timer (m_launchTimer) is set to the current time in a first activity step and the flow continues with a second decision step. If yes, the flow directly continues with the second decision step in which the intersection navigation analysis module determines whether the stored launch time subtracted from the current time is greater than a predefined launch timer threshold ((currentTime−m_launchTimer) >launchTimerThreshold?). If yes, the flow continues with a second activity step to move the vehicle to the bottom of m_stopList. Then the flow continues with a third activity step where the current state of the state machine is set to state_stop. Subsequently the flow continues with an end step and the AppL: Launch process is terminated. However if m_launchTimer subtracted from currentTime is equal or less than launchTimerThreshold the flow continues with a third decision step to verify whether the vehicle speed is greater than the predefined standstill threshold (vehicle_speed> standstill_threshold). If no, the flow may return to the third decision step. If yes, the flow may continue with a fourth activity step and a copy of the data from m_egoData is added to the data object or data structure m_inConflictZone. m_inConflictZone may represent the inConflictZone list as described before. Then the flow continues with a fifth activity step and the current state of the state machine is set to state_nConflictZone. Finally the flow continues with the end step and the AppL: Launch process is terminated.

Figure 18:
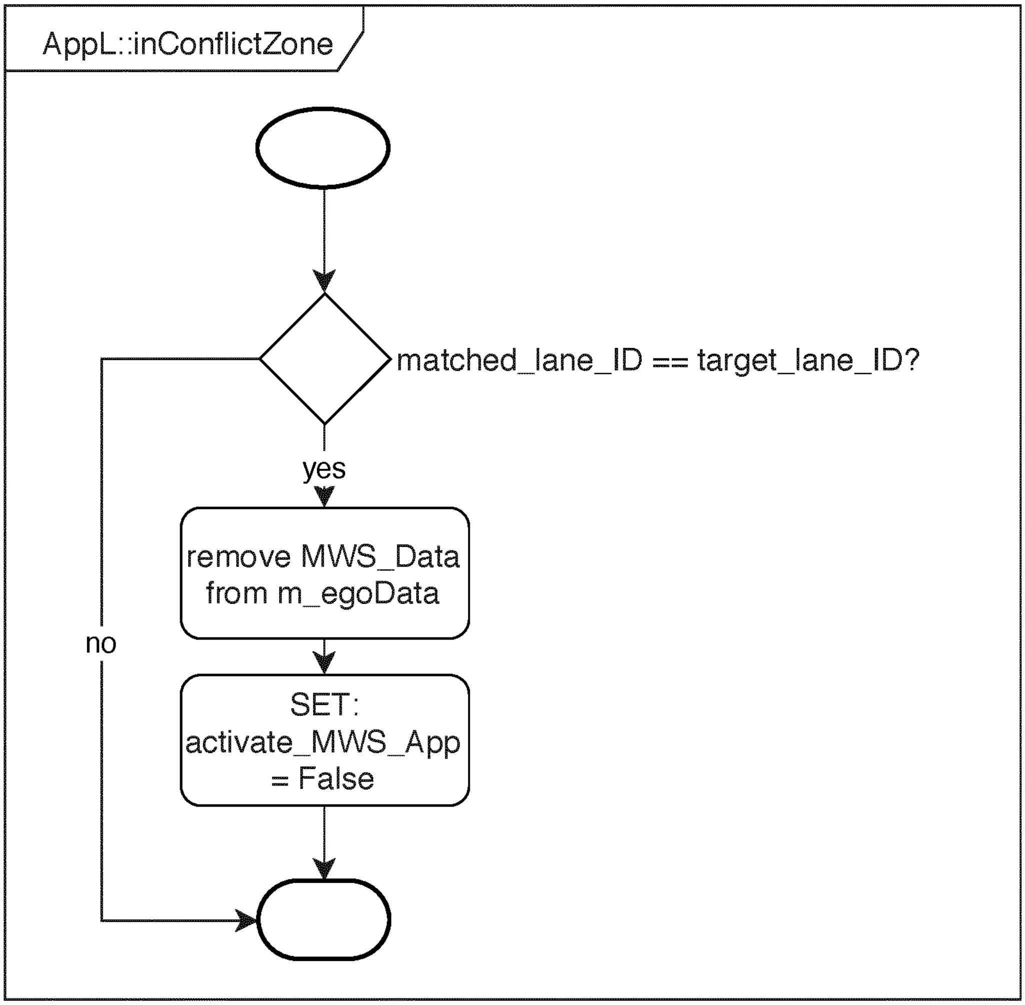
FIG. 18 illustrates additional detail regarding an inConflictZone list utilized in accordance with the disclosed embodiments.

FIG. 18 provides additional detail regarding the aforementioned AppL: inConflictZone process, illustrated as flow chart. The flow begins with a start step, followed by a first decision step to verify whether the ID of the matched lane equals the Id of the target lane (matched_lane_ID==target_lane_ID?). If no, the flow continues with an end step and the AppL: inConflictZone process is terminated. If yes, the flow continues with a first activity step and the aforementioned data of MWS_Data is removed from m_egoData. Then the flow continues with a second activity step at which the variable activate_MWS_App is set false. Finally the flow continues with the end step and the AppL: inConflictZone process is terminated.

FIG. 19 provides additional detail regarding the aforementioned MWS message generation process. The MWS message generation process is illustrated as flow chart. The flow begins with a start step, followed by a first decision step to determine whether the time of sending the last MWSM subtracted from the current time is greater than a predefined message transmission threshold time ((currentTime−m_lastMsgSent)>msgTransmissionTimerThreshold?). If no, the flow continues with an end step and the MWS message generation process is terminated. If yes, the flow continues with a first activity step and content concerning MWS and/or BSM data is gathered from m_egoData. Then the flow continues with a second decision step to verify whether the activate_MWS_App variable was set true. If yes, the flow continues with a second activity step at which the relevant data from m_approachList, m_stopList and m_inConflictZone List is provided as content of the MWS message (copied to the MWS message). Afterwards the flow continues with a third activity step. However, if the activate_MWS_App variable was set false the flow directly continues with the third activity step. In the third activity step the MWS message is transmitted to the respective vehicles (RVs). In a following fourth activity step the time of sending the last MWSM (m_lastMsgSent) is set to the current time. Finally the flow continues with the end step and the MWS message generation process is terminated.

Figure 21A:
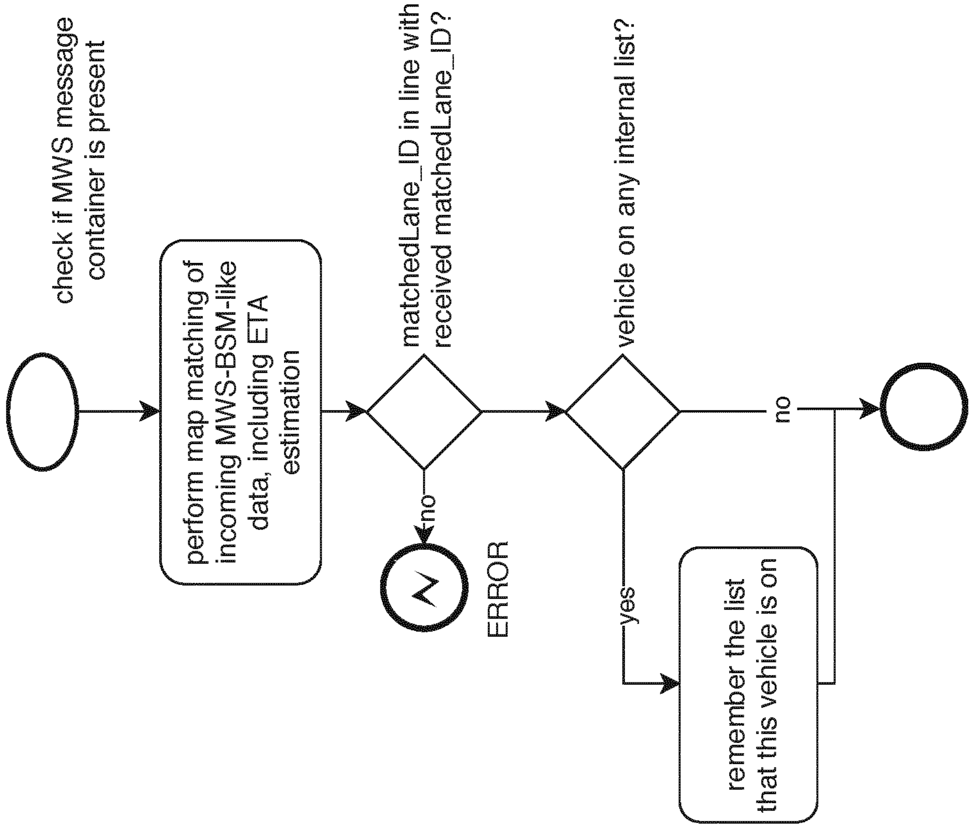
FIGS. 21A-21C illustrates various process operations for generating and maintaining lists of vehicles in accordance with the disclosed embodiments.
Figure 21B:
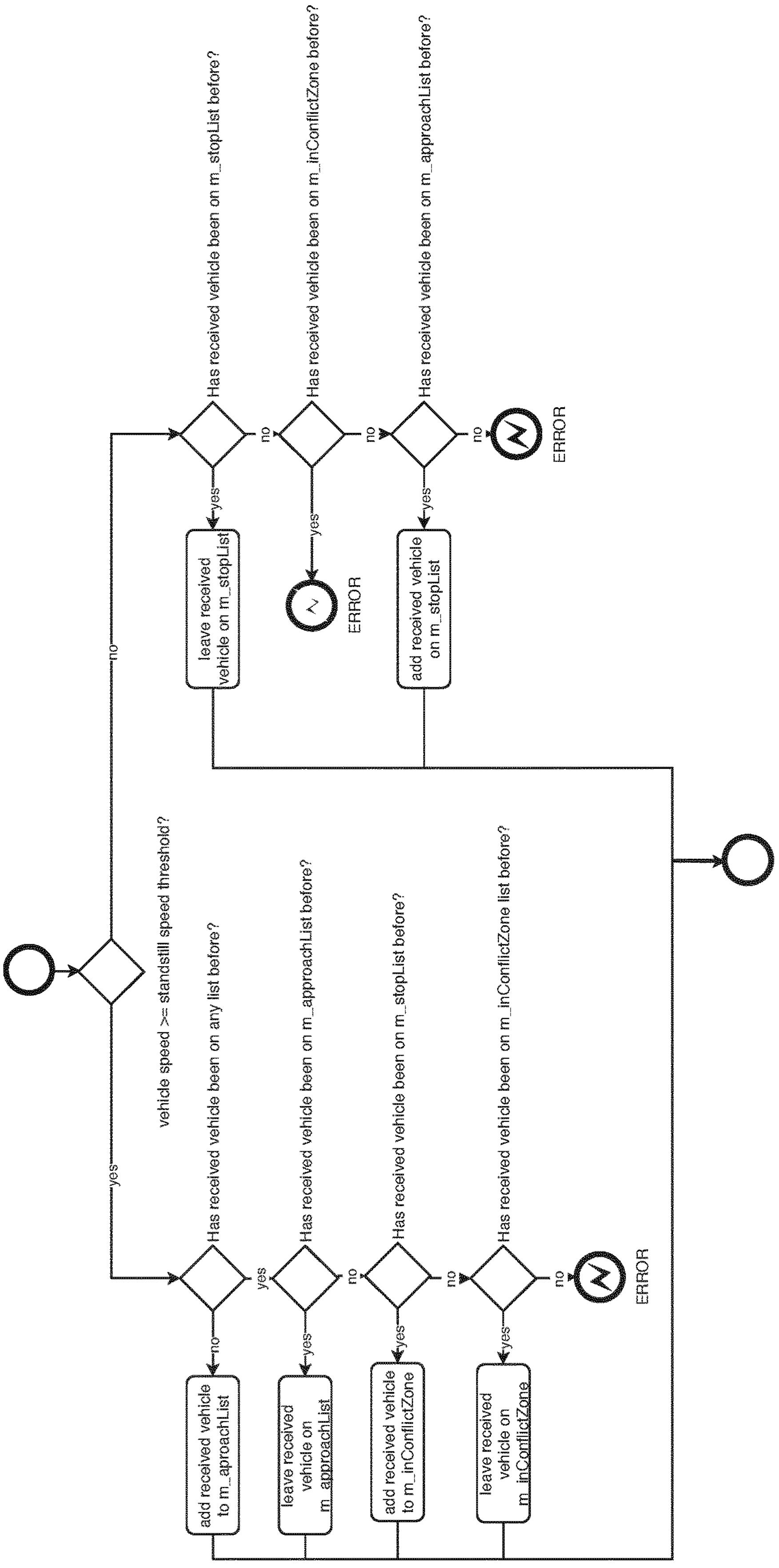
Figure 21C:
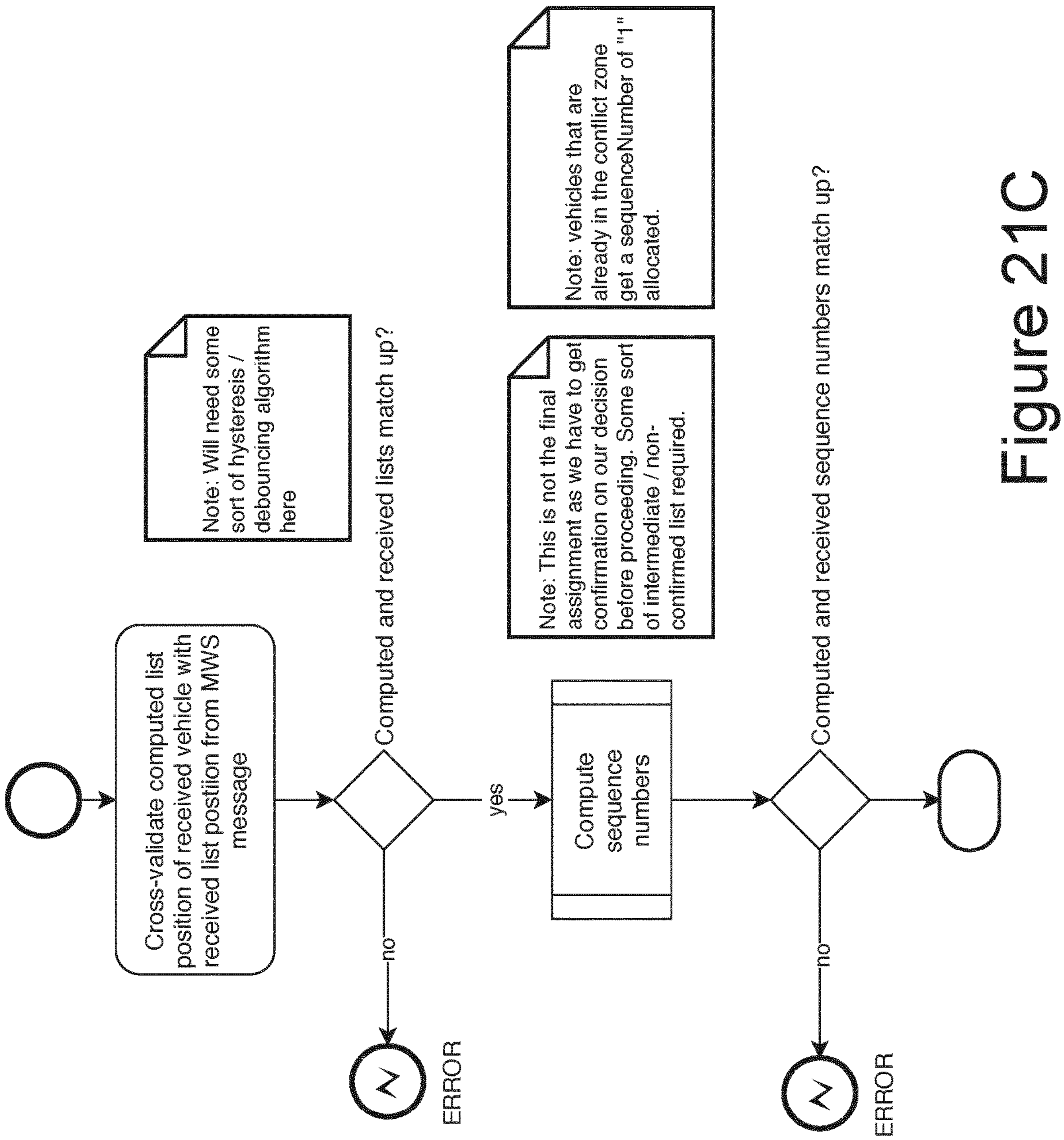

FIG. 21A to 21C provide additional detail regarding the aforementioned OnRx List Maintenance process. The OnRx List Maintenance process is illustrated as flow chart. The flow according to FIG. 21C begins with a start step, followed by a first activity step at which in case that the MWS message container is present the intersection navigation analysis module performs the map matching of the incoming MWS and/or BSM like data from all other vehicles, as well as the estimation of the estimated time of arrival (ETA). Then the flow continues with a first decision step to determine whether the ID of the matched lane (matchedLane_ID) corresponds to the received ID of the matched lane of all other vehicle. If the map matching result is not in line with the received map matching result, the intersection navigation analysis module goes to an error state. If yes, the flow continues with a second decision step to determine whether the vehicle is on any of the aforementioned internal lists, such as the approachList, the stopList and/or the inConflictZoneList. If yes, the flow continues with a second activity step and the intersection navigation analysis module stores or remembers the list the vehicle in on. Then the flow continues with a third decision step, illustrated in FIG. 21B. However if the vehicle is on none of the internal lists, the flow continues directly with the third decision step. In the third decision step it is verified whether the vehicle speed is equal or greater than the standstill threshold (vehicle speed>=standstill speed threshold?). Depending on the outcome of the verification the flow or main flow branches off into two different sub-flows.

If the verification shows that the vehicle speed is equal or greater than the standstill threshold the flow continues with a first sub-flow. The first sub-flow has a fourth decision step to determine whether the received vehicle, especially the vehicle data, according to the received vehicle BSM and/or MWS data has been stored on any of the lists before. If no, the received vehicle (data) is added to m_approachList in a third activity step and the first sub-flow returns to the main flow. If yes, the first sub-flow continues with a fifth decision step at which is determined whether the received vehicle (data) has been stored at m_approachList before. If yes, the received vehicle (data) is left in m_approachList in a fourth activity step and the first sub-flow returns to the main flow. If no, the first sub-flow continues with a sixth decision step to determine whether the received vehicle (data) has been stored at m_stopList before. If yes, the vehicle (data) is added to m_inConflictZone in a fifth activity step and the first sub-flow returns to the main flow. If no, the first sub-flow continues with a seventh decision step to determine whether the received vehicle (data) has been stored at m_inConflictZone before. If yes, the received vehicle (data) is left in m_inConflictZone in a sixth activity step and the first sub-flow returns to the main flow. If no, the intersection navigation analysis module goes to an error state.

However if the verification shows that the vehicle speed is less than the standstill threshold the flow continues with a second sub-flow. The second sub-flow has an eighth decision step to determine whether the received vehicle (data) has been stored at m_stopList before. If yes, the received vehicle (data) is left in m_stopList in a seventh activity step and the first sub-flow returns to the main flow. If no, the second sub-flow continues with a ninth decision step to determine whether the received vehicle (data) has been stored at m_inConflictZone before. If yes, the intersection navigation analysis module goes to an error state. If no, the second sub-flow continues with a tenth decision step to determine whether the received vehicle (data) has been stored at m_approachList before. If yes, the received vehicle (data) is added to m_stopList in an eighth activity step and the second sub-flow returns to the main flow. If no, the intersection navigation analysis module goes to an error state.

The continuation of the main flow is illustrated in FIG. 21C, with a ninth activity step at which a computed list position from the received vehicle (data) is cross validated with a received list position from the MWS message. A hysteresis or debouncing algorithm or a failure counting may be applied to ensure that the computed list and the received list match up over a predefined time. Then the flow continues with an eleventh decision step to determine whether the computed list by the HV and the received list from the RVs match up. If no, the intersection navigation analysis module goes to an error state. If yes, the flow continues with a predefined process referred to as Compute Sequence Numbers. In the Compute Sequence Numbers process the sequence number for all vehicles in the stopList and inConflictZone List is computed to and the rank or sequence of the vehicles at the intersection is assigned. Note that, vehicles that are already in the conflict zone or vehicles that have the clearance to launch first are allocated with a sequence number of "1" (sequenceNumber==1). The vehicles to launch second, third or fourth are allocated with a sequence number of "2", "3" or "4" respectively. The Compute Sequence Numbers process is described in more detail with regard to FIG. 22. Afterwards the flow continues with a twelfth decision step to determine whether the computed sequence numbers according to the Compute Sequence Numbers process and the received sequence number of the RVs match up. If no, the intersection navigation analysis module goes to an error state. If yes, the flow continues with an end step and the OnRx List Maintenance process is terminated.

FIG. 22 provides additional detail regarding the aforementioned Compute Sequence Numbers process. The Compute Sequence Numbers process is illustrated as a flow chart. The flow begins with a start step, followed by a first activity step at which a base sequence number of the vehicles (e.g., all vehicles at the intersection) is set to "0" (base_seqNum==0). Then the flow continues with a first decision step to verify whether there are already any vehicles in the conflict zone according to the inConflictZone List. If yes, the flow continues with a second activity step at which all vehicles which have already entered the intersection (all vehicles on inConflictZone list) are assigned with a sequence number of "1". In a subsequent third activity step the base sequence number of these vehicles is set to "1" (base_seqNum==1). Then the flow continues with a second decision step. However if there are no vehicles detected in the conflict zone the flow continues directly with the second decision step. In the second decision step the number of vehicles in the stopList and not in the inConflictZone list is determined. If there is no vehicle in the stopList and not in the inConflictZone list (outcome of the determination is "0") the flow continues with an end step and the Compute Sequence Numbers process is terminated. If there is one vehicle in the stopList and not in the inConflictZone list (outcome of the determination is "1") the flow continues with a fourth activity step and the sequence number of the only vehicle is assigned with the value of the base sequence number (base_seqNum) added by "1" (s[0] 'base_seqNum+1). If there are two vehicles (s[0], s[1]) in the stopList and not in the inConflictZone list (outcome of the determination is "2") the flow continues with a predefined process referred to as GetSeqNums: 2_vehicles at which the sequence number for coordinating the launch of two vehicles at the intersection is determined. GetSeqNums: 2_vehicles process is described in more detail with regard to FIG. 23. If there are three vehicles (s[0], s[1], s[2]) in the stopList and not in the inConflictZone list (outcome of the determination is "3") the flow continues with a predefined process referred to as GetSeqNums: 3_vehicles at which the sequence number for coordinating the launch of three vehicles at the intersection is determined. GetSeqNums: 3_vehicles process is described in more detail with regard to FIGS. 25A and 25B. Finally if there are four vehicles (s[0], s[1], s[2], s[3]) in the stopList and not in the inConflictZone list (outcome of the determination is "4") the flow continues with a predefined process referred to as GetSeqNums: 4_vehicles at which the sequence number for coordinating the launch of four vehicles at the intersection is determined. GetSeqNums: 4_vehicles process is described in more detail with regard to FIG. 26A to 26C.

FIG. 23 provides additional detail regarding the aforementioned GetSeqNums: 2_vehicles process. The GetSeqNums: 2_vehicles process is illustrated as flow chart. The flow begins with a start step, followed by a first decision step to determine whether a conflict or collision might occurs if both vehicles may enter the intersection simultaneously. To determine the possible conflict the actual position and intended direction of each vehicle (V1 and V2) is compared in a predefined Compare process.

A possible implementation of the Compare process is illustrated in FIG. 24. The vehicles intended directions with respect to their actual position are compared by a predefined compare function (function Compare (V1, V2)) using a look-up table. In the look-up table the heading fields of the first row show the intended direction of V1 (first vehicle) relative to the start position of V1. The heading fields of the first column in the look-up-table show the start position of V2 (second vehicle) with respect to the position of V1 in combination with the intended direction of V2 relative to the start position of V2. The intended directions of V1 and V2 according to the look-up-table are: straight ahead (?), right (?) and left (?). The start position start positions of V2 with respect to the position of V1 according to the look-up-table are: right (R), left (L), straight ahead (A) and no others, if there is only a single vehicle at the intersection. The result fields of the look-up table enclosed by both heading fields indicate whether a conflict or collision might occur if both vehicles enter the intersection together. To indicate no conflict or collision the respective result field shows a check mark symbol (✓). Result fields indicating a collision are left empty. Based on the look-up-table the aforementioned compare function may be executed to get or read out the entries of the result fields depending on the intended directions and the relative position of the vehicles. If the readout results in the check mark symbol the compare function returns a "Y" (yes), indicating that no collision will occur. Otherwise the compare function returns an "N" (no), indicating that a collision might occur.

With regard to the GetSeqNums: 2_vehicles process in FIG. 23 if the Compare Process (especially the compare function) returns a "Y" the flow continues with a first activity step and the sequence numbers of both vehicles are allocated with the respective base sequence number (base_seqNum) added by 1 (s[0], s[1]'base_seqNum+1). Thus the sequence numbers of both vehicles at the intersection may be set "1" and both vehicles may be enabled to launch (simultaneously). Afterwards the flow continues with an end step and the GetSeqNums: 2_vehicles process is terminated. However, if the Compare Process returns an "N" the flow continues with a second activity step and the sequence numbers of both vehicles are allocated with the respective base sequence number (base_seqNum) added by the respective stop number of each vehicle. The stop number indicates the rank of the respective vehicle according to the position in the stopList, which is sorted by the respective stop time of each vehicle. Hence the sequence number of the vehicle which was the first in time to stop may be set "1" and this vehicle may be the first to get clearance to launch. The sequence number of the other vehicle may be set to "2" and has to await the launch of the first vehicle. Finally the flow continues with the end step as well and the GetSeqNums: 2_vehicles process is terminated.

FIGS. 25A and 25B provide additional detail regarding the aforementioned GetSeqNums: 3_vehicles process. The GetSeqNums: 3_vehicles process is illustrated as flow chart. According to FIG. 25A the flow begins with a start step, followed by a first decision step to verify whether all three vehicles s[0], s[1], and s[2] are turning right. If yes, the flow continues with a first activity step and the sequence numbers of all three vehicles are allocated with the respective base sequence number added by "1" (s[0], s[1], s[2]'base_seqNum+1). Afterwards the flow continues with an end step and the GetSeqNums: 3_vehicles process is terminated.

If no, the flow continues with a second decision step and the intended directions with respect to the actual position of vehicle s[0] and s[1] are compared according to the Compare process, as described before. If the Compare Process returns "Y" the flow continues with a second activity step and the sequence numbers of vehicles s[0] and s[1] are allocated with the respective base sequence number added by "1" (s[0], s[1]'base_seqNum+1) and the sequence numbers of vehicle s[2] is allocated with the respective base sequence number added by "2" (s[2]'base_seqNum+2). Afterwards the flow continues with the end step and the GetSeqNums: 3_vehicles process is terminated.

If the Compare Process returns "N" the flow continues with a third decision step and the intended directions with respect to the actual position of vehicle s[0] and s[2] are compared according to the Compare process, as described before. If the Compare Process returns "Y" the flow continues with a third activity step and the sequence numbers of vehicles s[0] and s[2] are allocated with the respective base sequence number added by "1" (s[0], s[2]'base_seqNum+1) and the sequence numbers of vehicle s[1] is allocated with the respective base sequence number added by "2" (s[1] 'base_seqNum+2). Afterwards the flow continues with the end step and the GetSeqNums: 3_vehicles process is terminated.

According to FIG. 25B, if the Compare Process returns "N" the flow continues with a fourth decision step and the intended directions with respect to the actual position of vehicle s[1] and s[2] are compared according to the Compare process, as described before. If the Compare Process returns "Y" the flow continues with a fourth activity step and the sequence numbers of vehicles s[1] and s[2] are allocated with the respective base sequence number added by "1" (s[1], s[2]'base_seqNum+1) and the sequence numbers of vehicle s[1] is allocated with the respective base sequence number added by "2" (s[0]'base_seqNum+2). Afterwards the flow continues with the end step and the GetSeqNums: 3_vehicles process is terminated.

If the Compare Process returns "N" the flow continues with a fifth activity step and the sequence numbers of all three vehicles are allocated with the respective base sequence number (base_seqNum) added by the respective stop number of each vehicle. Finally the flow continues with the end step and the GetSeqNums: 3_vehicles process is terminated.

FIG. 26A to 26C provide additional detail regarding the aforementioned GetSeqNums: 3_vehicles process. The GetSeqNums: 3_vehicles process is illustrated as flow chart. According to FIG. 26A the flow begins with a start step, followed by a first decision step to verify whether all four vehicles (s[0], s[1], s[2], s[3]) are turning right. If yes, the flow continues with a first activity step and the sequence numbers of all three vehicles are allocated with the respective base sequence number added by "1" (s[0], s[1], s[2], s[3]'base_seqNum+1). Afterwards the flow continues with an end step and the GetSeqNums: 4_vehicles process is terminated.

If no, the flow continues with a second decision step to verify whether vehicles s[0], s[1] and s[2]) are turning right. If yes, the flow continues with a second activity step and the sequence numbers of these vehicles are allocated with the respective base sequence number added by "1" (s[0], s[1], s[2]'base_seqNum+1). In addition the sequence number of vehicle s[3] is allocated with the respective base sequence number added by "2" (s[3]'base_seqNum+2). Afterwards the flow continues with the end step and the GetSeqNums: 4_vehicles process is terminated.

If no, the flow continues with a third decision step to verify whether vehicles s[0], s[1] and s[3] are turning right. If yes, the flow continues with a third activity step and the sequence numbers of these vehicles are allocated with the respective base sequence number added by "1" (s[0], s[1], s[3]'base_seqNum+1). In addition the sequence number of vehicle s[2] is allocated with the respective base sequence number added by "2" (s[2]'base_seqNum+2). Afterwards the flow continues with the end step and the GetSeqNums: 4_vehicles process is terminated.

If no, the flow continues with a third decision step to verify whether vehicles s[0], s[1] and s[3] are turning right. If yes, the flow continues with a third activity step and the sequence numbers of these vehicles are allocated with the respective base sequence number added by "1" (s[0], s[1], s[3]'base_seqNum+1). In addition the sequence number of vehicle s[2] is allocated with the respective base sequence number added by "2" (s[2]'base_seqNum+2). Afterwards the flow continues with the end step and the GetSeqNums: 4_vehicles process is terminated.

If no, the flow continues with a fourth decision step to verify whether vehicles s[0], s[2] and s[3] are turning right. If yes, the flow continues with a fourth activity step and the sequence numbers of these vehicles are allocated with the respective base sequence number added by "1" (s[0], s[2], s[3]'base_seqNum+1). In addition the sequence number of vehicle s[1] is allocated with the respective base sequence number added by "2" (s[1]'base_seqNum+2). Afterwards the flow continues with the end step and the GetSeqNums: 4_vehicles process is terminated.

If no, the flow continues with a fifth decision step (see FIG. 26B) to verify whether vehicles s[1], s[2] and s[3] are turning right. If yes, the flow continues with a fifth activity step and the sequence numbers of these vehicles are allocated with the respective base sequence number added by "1" (s[1], s[2], s[3]'base_seqNum+1). In addition the sequence number of vehicle s[0] is allocated with the respective base sequence number added by "2" (s[1] 'base_seqNum+2). Afterwards the flow continues with the end step and the GetSeqNums: 4_vehicles process is terminated.

If no, the flow continues with a sixth decision step and the intended directions with respect to the actual position of vehicles s[0] and s[1] are compared according to the Compare process, as described before. If the Compare Process returns "Y" the flow continues with a sixth activity step and the sequence numbers of vehicles s[0] and s[1] are allocated with the respective base sequence number added by "1" (s[0], s[1]'base_seqNum+1). Then the flow continues with a seventh decision step and the intended directions with respect to the actual position of vehicle s[2] and s[3] are compared according to the Compare process. If the Compare Process returns "Y" the flow continues with a seventh activity step and the sequence numbers of vehicles s[2] and s[3] are allocated with the respective base sequence number added by "2" (s[2], s[3]'base_seqNum+2). Afterwards the flow continues with the end step and the GetSeqNums: 4_vehicles process is terminated. However if the Compare Process returns "N" the flow continues with an eighth activity step and the sequence number of vehicle s[2] is allocated with the respective base sequence number added by "2" (s[2]'base_seqNum+2), whereas the sequence number of vehicle s[3] is allocated with the respective base sequence number added by "3" (s[3]'base_seqNum+3). Afterwards the flow continues with the end step and the GetSeqNums: 4_vehicles process is terminated.

However, if the Compare Process according to the sixth decision step returns "N" the flow continues with an eighth decision step and the intended directions with respect to the actual position of vehicles s[0] and s[2] are compared according to the Compare process. If the Compare Process returns "Y" the flow continues with a ninth activity step and the sequence numbers of vehicles s[0] and s[2] are allocated with the respective base sequence number added by "1" (s[0], s[2]'base_seqNum+1). Then the flow continues with a ninth decision step and the intended directions with respect to the actual position of vehicles s[1] and s[3] are compared according to the Compare process. If the Compare Process returns "Y" the flow continues with a tenth activity step and the sequence numbers of vehicles s[1] and s[3] are allocated with the respective base sequence number added by "2" (s[1], s[3]'base_seqNum+2). Afterwards the flow continues with the end step and the GetSeqNums: 4_vehicles process is terminated. However if the Compare Process returns "N" the flow continues with an eleventh activity step and the sequence number of vehicle s[1] is allocated with the respective base sequence number added by "2" (s[1] 'base_seqNum+2), whereas the sequence number of vehicle s[3] is allocated with the respective base sequence number added by "3" (s[3]'base_seqNum+3). Afterwards the flow continues with the end step and the GetSeqNums: 4_vehicles process is terminated.

However, if the Compare Process according to the eighth decision step returns "N" the flow continues with a tenth decision step (see FIG. 26C) and the intended directions with respect to the actual position of vehicles s[0] and s[3] are compared according to the Compare process. If the Compare Process returns "Y" the flow continues with a twelfth activity step and the sequence numbers of vehicles s[0] and s[3] are allocated with the respective base sequence number added by "1" (s[0], s[3]'base_seqNum+1). Then the flow continues with an eleventh decision step and the intended directions with respect to the actual position of vehicles s[1] and s[2] are compared according to the Compare process. If the Compare Process returns "Y" the flow continues with a thirteenth activity step and the sequence numbers of vehicles s[1] and s[2] are allocated with the respective base sequence number added by "2" (s[1], s[2] 'base_seqNum+2). Afterwards the flow continues with the end step and the GetSeqNums: 4_vehicles process is terminated. However if the Compare Process returns "N" the flow continues with an fourteenth activity step and the sequence number of vehicle s[1] is allocated with the respective base sequence number added by "2" (s[1]'base_seqNum+2), whereas the sequence number of vehicle s[2] is allocated with the respective base sequence number added by "3" (s[2]'base_seqNum+3). Afterwards the flow continues with the end step and the GetSeqNums: 4_vehicles process is terminated.

However, if the Compare Process according to the tenth decision step returns "N" the flow continues with a twelfth decision step and the intended directions with respect to the actual position of vehicles s[1] and s[2] are compared according to the Compare process. If the Compare Process returns "Y" the flow continues with a fifteenth activity step and the sequence numbers of vehicles s[1] and s[2] are allocated with the respective base sequence number added by "1" (s[1], s[2]'base_seqNum+1). Then the flow continues with an thirteenth decision step and the intended directions with respect to the actual position of vehicles s[0] and s[3] are compared according to the Compare process. If the Compare Process returns "Y" the flow continues with a sixteenth activity step and the sequence numbers of vehicles s[0] and s[3] are allocated with the respective base sequence number added by "2" (s[0], s[3]'base_seqNum+2). Afterwards the flow continues with the end step and the GetSeqNums: 4_vehicles process is terminated. However if the Compare Process returns "N" the flow continues with an seventeenth activity step and the sequence number of vehicle s[0] is allocated with the respective base sequence number added by "2" (s[0]'base_seqNum+2), whereas the sequence number of vehicle s[3] is allocated with the respective base sequence number added by “3” (s[3] 'base_seqNum+3). Afterwards the flow continues with the end step and the GetSeqNums: 4_vehicles process is terminated.

However, if the Compare Process according to the twelfth decision step returns “N” the flow continues with a fourteenth decision step and the intended directions with respect to the actual position of vehicles s[1] and s[3] are compared according to the Compare process. If the Compare Process returns “Y” the flow continues with an eighteenth activity step and the sequence numbers of vehicles s[1] and s[3] are allocated with the respective base sequence number added by “1” (s[1], s[3]'base_seqNum+1). Then the flow continues with an fifteenth decision step and the intended directions with respect to the actual position of vehicles s[0] and s[2] are compared according to the Compare process. If the Compare Process returns “Y” the flow continues with a nineteenth activity step and the sequence numbers of vehicles s[0] and s[2] are allocated with the respective base sequence number added by “2” (s[0], s[2]'base_seqNum+2). Afterwards the flow continues with the end step and the GetSeqNums: 4_vehicles process is terminated. However if the Compare Process returns “N” the flow continues with a twentieth activity step and the sequence number of vehicle s[0] is allocated with the respective base sequence number added by “2” (s[0]'base_seqNum+2), whereas the sequence number of vehicle s[2] is allocated with the respective base sequence number added by “3” (s[3]'base_seqNum+3). Afterwards the flow continues with the end step and the GetSeqNums: 4_vehicles process is terminated.

However, if the Compare Process according to the twelfth decision step returns “N” the flow continues with a fourteenth decision step and the intended directions with respect to the actual position of vehicles s[1] and s[3] are compared according to the Compare process. If the Compare Process returns “Y” the flow continues with an eighteenth activity step and the sequence numbers of vehicles s[1] and s[3] are allocated with the respective base sequence number added by “1” (s[1], s[3]'base_seqNum+1). Then the flow continues with an fifteenth decision step and the intended directions with respect to the actual position of vehicles s[0] and s[2] are compared according to the Compare process. If the Compare Process returns “Y” the flow continues with a nineteenth activity step and the sequence numbers of vehicles s[0] and s[2] are allocated with the respective base sequence number added by “2” (s[0], s[2]'base_seqNum+2). Afterwards the flow continues with the end step and the GetSeqNums: 4_vehicles process is terminated. However if the Compare Process returns “N” the flow continues with a twentieth activity step and the sequence number of vehicle s[0] is allocated with the respective base sequence number added by “2” (s[0]'base_seqNum+2), whereas the sequence number of vehicle s[2] is allocated with the respective base sequence number added by “3” (s[3]'base_seqNum+3). Afterwards the flow continues with the end step and the GetSeqNums: 4_vehicles process is terminated.

However, if the Compare Process according to the fourteenth decision step returns “N” the flow continues with a sixteenth decision step and the intended directions with respect to the actual position of vehicles s[2] and s[3] are compared according to the Compare process. If the Compare Process returns “Y” the flow continues with an twenty-first activity step and the sequence numbers of vehicles s[2] and s[3] are allocated with the respective base sequence number added by “1” (s[2], s[3]'base_seqNum+1). Then the flow continues with an seventeenth decision step and the intended directions with respect to the actual position of vehicles s[0] and s[1] are compared according to the Compare process. If the Compare Process returns “Y” the flow continues with a twenty-second activity step and the sequence numbers of vehicles s[0] and s[1] are allocated with the respective base sequence number added by “2” (s[0], s[1]'base_seqNum+2). Afterwards the flow continues with the end step and the GetSeqNums: 4_vehicles process is terminated. However if the Compare Process returns “N” the flow continues with a twenty-third activity step and the sequence number of vehicle s[0] is allocated with the respective base sequence number added by “2” (s[0]'base_seqNum+2), whereas the sequence number of vehicle s[1] is allocated with the respective base sequence number added by “3” (s[1] 'base_seqNum+3). Afterwards the flow continues with the end step and the GetSeqNums: 4_vehicles process is terminated.

However, if the Compare Process according to the sixteenth decision step returns “N” the flow continues with a twenty-fourth activity step and the sequence number of vehicles s[0], s[1], s[2], s[3] are allocated with the respective base sequence number (base_seqNum) added by the respective stop number of each vehicle. Finally the flow continues with the end step and the GetSeqNums: 4_vehicles process is terminated.

FIG. 27 illustrates a possible arrangement of the intersection navigation analysis module 2700 within the respective transportation vehicle as described before.

We claim:

1. A method of coordinating a launch of a first vehicle, a second vehicle, a third vehicle and a fourth vehicle approaching a four-way stop intersection from different directions comprising:

evaluating vehicle data of the first vehicle, approaching the four-way stop intersection according to first predefined approaching criteria from a first direction, to determine a first stop time at a first predefined stop location and a first intended direction the first vehicle;

evaluating vehicle data of the second vehicle, approaching the four-way stop intersection according to second predefined approaching criteria from a second direction, which is different from the first direction, to determine a second stop time at a second predefined stop location and a second intended direction of the second vehicle;

evaluating vehicle data of the third vehicle, approaching the four-way stop intersection according to third predefined approaching criteria from a third direction, which is different from the first direction and the second direction, to determine a third stop time at a third predefined stop location and a third intended direction of the third vehicle, evaluating vehicle data of the fourth vehicle, approaching the four-way stop intersection according to fourth predefined approaching criteria from a fourth direction, which is different from the first direction, the second direction and the third direction, to determine a fourth stop time at a fourth predefined stop location and a fourth intended direction of the fourth vehicle;

allocating the first vehicle, the second vehicle, the third vehicle and the fourth vehicle with respective sequence numbers, based on which a launch sequence for the first vehicle, the second vehicle, the third vehicle and the fourth vehicle will be specified according to the following:

setting a base sequence number;

verifying whether all of the four vehicles are turning right and, if yes, allocating respective sequence numbers of the four vehicles with the base sequence number added by 1;

if no: verifying whether the first vehicle, the second vehicle and the third vehicle are turning right; if yes, the respective sequence numbers of the first vehicle, the second vehicle and the third vehicle are allocated with the base sequence number added by 1, and a fourth sequence number of the fourth vehicle is allocated with the base sequence number added by 2;

if no: verifying whether the first vehicle, the second vehicle and the fourth vehicle are turning right; if yes, the respective sequence numbers of the first vehicle, the second vehicle and the fourth vehicle are allocated with the base sequence number added by 1, and a third sequence number of the third vehicle is allocated with the base sequence number added by 2;

if no: verifying whether the first vehicle, the third vehicle and the fourth vehicle are turning right; if yes, the respective sequence numbers of the first vehicle, the third vehicle and the fourth vehicle are allocated with the base sequence number added by 1, and a second sequence number of the second vehicle is allocated with the base sequence number added by 2;

if no: verifying whether the second vehicle, the third vehicle and the fourth vehicle are turning right; if yes, the respective sequence numbers of the second vehicle, third vehicle and the fourth vehicle are allocated with the base sequence number added by 1, and a first sequence number of the first vehicle is allocated with the base sequence number added by 2;

if no: determining a first collision parameter by comparing the first intended direction and the first predefined stop location of the first vehicle in relation to the second intended direction and the second predefined stop location of the second vehicle; if no conflict or collision might occur: the respective sequence numbers of the first vehicle and the second vehicle are allocated with the base sequence number added by 1; and determining a second collision parameter by comparing the third intended direction and the third predefined stop location of the third vehicle in relation to the fourth intended direction and the fourth predefined stop location of the fourth vehicle; if no conflict or collision might occur: the respective sequence numbers of the third vehicle and the fourth vehicle are allocated with the base sequence number added by 2; if conflict or collision might occur: the third vehicle is allocated with the base sequence number added by 2 and the fourth vehicle is allocated with the base sequence number added by 3;

if conflict or collision might occur: determining a third collision parameter by comparing the first intended direction and the first predefined stop location of the first vehicle in relation to the third intended direction and the third predefined stop location of the third vehicle; if no conflict or collision might occur: the respective sequence numbers of the first vehicle and the third vehicle are allocated with the base sequence number added by 1; and determining a fourth collision parameter by comparing the second intended direction and the second predefined stop location of the second vehicle in relation to the fourth intended direction and the fourth predefined stop location of the fourth vehicle; if no conflict or collision might occur: the respective sequence numbers of the second vehicle and the fourth vehicle are allocated with the base sequence number added by 2; if conflict or collision might occur: the second vehicle is allocated with the base sequence number added by 2 and the fourth vehicle is allocated with the base sequence number added by 3;

if conflict or collision might occur: determining a fifth collision parameter by comparing the first intended direction and the first predefined stop location of the first vehicle in relation to the fourth intended direction and the fourth predefined stop location of the fourth vehicle; if no conflict or collision might occur: the respective sequence numbers of the first vehicle and the fourth vehicle are allocated with the base sequence number added by 1; and determining a sixth collision parameter by comparing the second intended direction and the second predefined stop location of the second vehicle in relation to the third intended direction and the third predefined stop location of the third vehicle; if no conflict or collision might occur: the respective sequence numbers of the second vehicle and the third vehicle are allocated with the base sequence number added by 2; if conflict or collision might occur: the second vehicle is allocated with the base sequence number added by 2 and the third vehicle is allocated with the base sequence number added by 3;

if conflict or collision might occur: determining the sixth collision parameter by comparing the second intended direction and the second predefined stop location of the second vehicle in relation to the third intended direction and the third predefined stop location of the third vehicle; if no conflict or collision might occur: the respective sequence numbers of the second vehicle and the third vehicle are allocated with the base sequence number added by 1; and determining the fifth collision parameter by comparing the first intended direction and the first predefined stop location of the first vehicle in relation to the fourth intended direction and the fourth predefined stop location of the fourth vehicle; if no conflict or collision might occur: the respective sequence numbers of the first vehicle and the fourth vehicle are allocated with the base sequence number added by 2; if conflict or collision might occur: the first vehicle is allocated with the base sequence number added by 2 and the fourth vehicle is allocated with the base sequence number added by 3;

if conflict or collision might occur: determining the fourth collision parameter by comparing the second intended direction and the second predefined stop location of the second vehicle in relation to the fourth intended direction and the fourth predefined stop location of the fourth vehicle; if no conflict or collision might occur: the respective sequence numbers of the second vehicle and the fourth vehicle are allocated with the base sequence number added by 1; and determining the third collision parameter by comparing the first intended direction and the first predefined stop location of the first vehicle in relation to the third intended direction and the third predefined stop location of the third vehicle; if no conflict or collision might occur: the respective sequence numbers of the first vehicle and the third vehicle are allocated with the base sequence number added by 2; if conflict or collision might occur: the first vehicle is allocated with the base sequence number added by 2 and the third vehicle is allocated with the base sequence number added by 3;

if conflict or collision might occur: determining the second collision parameter by comparing an intended direction and the third predefined stop location of the third vehicle in relation to the fourth intended direction and the fourth stop location of the fourth vehicle; if no conflict or collision might occur: the respective sequence numbers of the third vehicle and the fourth vehicle are allocated with the base sequence number added by 1; and determining the first collision parameter by comparing the first intended direction and the first stop location of the first vehicle in relation to the second intended direction and the second stop location of the second vehicle; if no conflict or collision might occur: the respective sequence numbers of the first vehicle and the second vehicle are allocated with the base sequence number added by 2; if conflict or collision might occur: the first vehicle is allocated with the base sequence number added by 2 and the second vehicle is allocated with the base sequence number added by 3; and if conflict or collision might occur: specifying a launch sequence of the first vehicle, the second vehicle, the third vehicle and the fourth vehicle depending on the respective stop time wherein the launch sequence is specified depending on ascending stop times of the first, second, third and fourth vehicles, so that a first-in-time vehicle, which was first in time to stop at a corresponding stop location is provided with the launch signal first; and controlling the first, second, third and fourth vehicles depending on the launch sequence.

2. A method of coordinating a launch of a first vehicle, a second vehicle and a third vehicle approaching a four-way stop intersection from different directions comprising:

evaluating first vehicle data of the first vehicle, approaching the four-way stop intersection according to first predefined approaching criteria from a first direction, to determine a first stop time at a first predefined stop location and a first intended direction of the first vehicle;

evaluating second vehicle data of the second vehicle, approaching the four-way stop intersection according to second predefined approaching criteria from a second direction, which is different from the first direction, to determine a second stop time at a second predefined stop location and a second intended direction of the second vehicle;

evaluating third vehicle data of the third vehicle, approaching the four-way stop intersection according to third predefined approaching criteria from a third direction, which is different from the first direction and the second direction, to determine a third stop time at a third predefined stop location and a third intended direction of the third vehicle;

allocating to all three vehicles, among the first vehicle, the second vehicle and the third vehicle, respective sequence numbers specifying a launch sequence of the first vehicle, the second vehicle and the third vehicle by following a sequence of operations, including determining whether all of the three vehicles are turning right;

upon determining that all of the three vehicles are turning right, assigning all the respective sequence numbers of the three vehicles to the base sequence number increased by 1;

upon determining that all of the three vehicles are not turning right; obtaining a first collision parameter by comparing the first intended direction and the first stop location of the first vehicle in relation to the second intended direction and the second stop location of the second vehicle;

upon determining that no conflict or collision might occur between the first and second vehicles based on the first collision parameter, assigning the base sequence number increased by 1 to the first and second vehicles, and the base sequence number increased by 2 to the third vehicle;

upon determining that conflict or collision might occur between the first and second vehicles, obtaining a second collision parameter by comparing the first intended direction and the first stop location of the first vehicle in relation to the third intended direction and the third stop location of the third vehicle;

upon determining that no conflict or collision might occur between the first and third vehicles based on the second collision parameter, assigning the base sequence number increased by 1 to the first and third vehicles and the base sequence number increased by 2 to the second vehicle;

upon determining that conflict or collision might occur between the first and third vehicles based on the second collision parameter, obtaining a third collision parameter by comparing the second intended direction and the second stop location of the second vehicle in relation to the third intended direction and the third stop location of the third vehicle;

upon determining that no conflict or collision might occur between the second and third vehicles based on the third collision parameter, assigning the base sequence number increased by 1 to the second and third vehicles and the base sequence number increased by 2 to the first vehicle; and upon determining that conflict or collision might occur between the second and third vehicles based on the third collision parameter, specifying the launch sequence of the first vehicle, the second vehicle and the third vehicle depending on ascending stop times of the three vehicles, so that an earliest vehicle, among the three vehicles, which was first in time to stop at the four-way stop intersection, is provided with a launch signal first; and controlling the first, second and third vehicles depending on the launch sequence.

3. The method according to claim 2, wherein the launch signal is provided after no other vehicle is detected in a predefined conflict zone of the intersection.

4. The method according to claim 3, wherein respective intersection navigation modules are assigned to the three vehicles, wherein respective vehicle data, among the first, second and third vehicle data, are allocated to an approach list as a respective vehicle, among the first, second and third vehicles, approaches the four-way stop intersection according to respective predefined approaching criteria among the first, second and third predefined approaching criteria, wherein the respective vehicle data are allocated to a stop list upon determining that the respective vehicle has stopped at a respective stop location among the first, second and third stop locations, wherein the respective vehicle data are allocated to a conflict list upon determining that the respective vehicle has entered the predefined conflict zone of the four-way stop intersection according to the launch signal, and wherein the respective intersection navigation modules assigned to the three vehicles compare the respective vehicle data of the approach, stop and conflict lists to coordinate launching the three vehicles.

5. The method according to claim 4, further comprising evaluating map data to determine whether the respective vehicle is in a lane with a stop attribute, where the respective stop location is specified by the stop attribute.

6. The method according to claim 5, further comprising controlling a display module corresponding to the respective vehicle to display a launch interaction upon the launch signal being provided to the respective vehicle.

7. A method of coordinating a launch of a first vehicle, a second vehicle, a third vehicle and a fourth vehicle approaching a four-way stop intersection from different directions comprising:

evaluating first vehicle data of the first vehicle, approaching the four-way stop intersection according to first predefined approaching criteria from a first direction, to determine a stop time at a first predefined stop location and a first intended direction the first vehicle;

evaluating second vehicle data of the second vehicle, approaching the four-way stop intersection according to second predefined approaching criteria from a second direction, which is different from the first direction, to determine a second stop time at a second predefined stop location and a second intended direction of the second vehicle;

evaluating third vehicle data of the third vehicle, approaching the four-way stop intersection according to third predefined approaching criteria from a third direction, which is different from the first and the second direction, to determine a third stop time at a third predefined stop location and a third intended direction of the third vehicle, evaluating fourth vehicle data of the fourth vehicle, approaching the four-way stop intersection according to fourth predefined approaching criteria from a fourth direction, which is different from the first, the second and the third direction, to determine a fourth stop time at a fourth predefined stop location and a fourth intended direction of the fourth vehicle;

allocating to all four vehicles, among the first vehicle, the second vehicle, the third vehicle and the fourth vehicle, respective sequence numbers specifying a launch sequence of the first vehicle, the second vehicle, the third vehicle and the fourth vehicle by following a sequence of operations, including determining whether all of the four vehicles are turning right;

upon determining that all of the four vehicles are turning right, assigning all of the respective sequence numbers of the four vehicles to the base sequence number increased by 1;

upon determining that all of the four vehicles are not turning right, determining whether the first vehicle, the second vehicle and the third vehicle are turning right;

upon determining that the first vehicle, the second vehicle and the third vehicle are turning right, assigning to the first vehicle, the second vehicle and the third vehicle the base sequence number increased by 1, and assigning to the fourth vehicle the base sequence number increased by 2;

upon determining that the first vehicle, the second vehicle and the third vehicle are not turning right, determining whether the first vehicle, the second vehicle and the fourth vehicle are turning right;

upon determining that the first vehicle, the second vehicle and the fourth vehicle are turning right, assigning to the first vehicle, the second vehicle and fourth vehicle the base sequence number increased by 1, and assigning to the third vehicle the base sequence number increased by 2;

upon determining that the first vehicle, the second vehicle and the fourth vehicle are not turning right, determining whether the first vehicle, the third vehicle and the fourth vehicle are turning right;

upon determining that the first vehicle, the third vehicle and the fourth vehicle are turning right, assigning to the first vehicle, the third vehicle and the fourth vehicle the base sequence number increased by 1, and assigning to the second vehicle the base sequence number increased by 2;

upon determining that the first vehicle, the third vehicle and the fourth vehicle are not turning right, determining whether the second vehicle, the third vehicle and the fourth vehicle are turning right;

upon determining that the second vehicle, the third vehicle and the fourth vehicle are turning right, assigning to the second vehicle, the third vehicle and the fourth vehicle the base sequence number increased by 1, and assigning to the first vehicle the base sequence number increased by 2;

upon determining that the second vehicle, the third vehicle and the fourth vehicle are not turning right, obtaining a first collision parameter by comparing the first intended direction and the first stop location of the first vehicle in relation to the second intended direction and the second stop location of the second vehicle;

upon determining that no conflict or collision might occur between the first and second vehicles based on the first collision parameter, assigning the base sequence number increased by 1 to the first and second vehicles, obtaining a second collision parameter by comparing the third intended direction and the third stop location of the third vehicle in relation to the fourth intended direction and the fourth stop location of the fourth vehicle, upon determining that no conflict or collision might occur between the third and fourth vehicles based on the second collision parameter, assigning the base sequence number increased by 2 to the third and fourth vehicles, and upon determining that conflict or collision might occur between the third and fourth vehicles based on the second collision parameter, assigning to the third vehicle the base sequence number increased by 2 and assigning to the fourth vehicle the base sequence number increased by 3;

upon determining that conflict or collision might occur between the first and second vehicles based on the first collision parameter, obtaining a third collision parameter by comparing the first intended direction and the first stop location of the first vehicle in relation to the third intended direction and the third stop location of the third vehicle, upon determining that no conflict or collision might occur between the first vehicle and the third vehicle based on the third collision parameter, assigning the base sequence number increased by 1 to the first vehicle and the third vehicle, obtaining a fourth collision parameter by comparing the second intended direction and the second stop location of the second vehicle in relation to the fourth intended direction and the fourth stop location of the fourth vehicle, upon determining that no conflict or collision might occur between the second and fourth vehicles based on the fourth collision parameter, assigning the base sequence number increased by 2 to the second and fourth vehicles, and upon determining that conflict or collision might occur between the second and fourth vehicles based on the fourth collision parameter, assigning the second vehicle the base sequence number increased by 2 and the fourth vehicle the base sequence number increased by 3;

upon determining that conflict or collision might occur between the first and third vehicles based on the third collision parameter, obtaining a fifth collision parameter by comparing the first intended direction and the first stop location of the first vehicle in relation to the fourth intended direction and the fourth stop location of the fourth vehicle, upon determining that no conflict or collision might occur between the first and fourth vehicles based on the fifth collision parameter, assigning to the first vehicle and the fourth vehicle the base sequence number increased by 1, obtaining a sixth collision parameter by comparing the second intended direction and the second stop location of the second vehicle in relation to the third intended direction and the third stop location of the third vehicle, upon determining that no conflict or collision might occur between the second and third vehicles based on the sixth collision parameter, assigning to the second vehicle and the third vehicle the base sequence number increased by 2, and upon determining that conflict or collision might occur between the second and third vehicles based on the sixth collision parameter, assigning to the second vehicle the base sequence number increased by 2 and assigning to the third vehicle the base sequence number increased by 3;

upon determining that conflict or collision might occur between the first and fourth vehicles based on the fifth collision parameter, obtaining the sixth collision parameter by comparing the second intended direction and the second stop location of the second vehicle in relation to the third intended direction and the third stop location of the third vehicle, upon determining that no conflict or collision might occur between the second and third vehicles based on the sixth collision parameter, assigning to the second vehicle and the third vehicle the base sequence number increased by 1, assigning to the first vehicle the base sequence number increased by 2 and assigning to the fourth vehicle the base sequence number increased by 3; and upon determining that conflict or collision might occur between the second vehicle and the third vehicle, specifying a launch sequence of the first vehicle, the second vehicle, the third vehicle and the fourth vehicle depending on ascending stop times of the four vehicles, so that an earliest vehicle, among the four vehicles, which was first in time to stop at the four-way stop intersection, is provided with a launch signal first; and controlling the first, second and third vehicles depending on the launch sequence.

8. The method according to claim 7, wherein the launch signal is provided after no other vehicle is detected in a predefined conflict zone of the intersection.

9. The method according to claim 7, wherein respective intersection navigation modules are assigned to the four vehicles, wherein respective vehicle data, among the first, second, third and fourth vehicle data, are allocated to an approach list as a respective vehicle, among the first, second, third and fourth vehicles, approaches the four-way stop intersection according to respective predefined approaching criteria, among the first, second, third and fourth predefined approaching criteria, wherein the respective vehicle data are allocated to a stop list upon determining that the respective vehicle has stopped at a respective stop location among the first, second, third and fourth stop locations, wherein the respective vehicle data are allocated to a conflict list upon determining that the respective vehicle has entered a predefined conflict zone of the four-way stop intersection according to the launch signal, and wherein the respective intersection navigation modules assigned to the four vehicles compare the respective vehicle data of the approach, stop and conflict lists to coordinate launching the four vehicles.

10. The method according to claim 7, further comprising evaluating map data to determine whether the respective vehicle is on a lane with a stop attribute, where the respective stop location is specified by the stop attribute.

11. The method according to claim 7, further comprising controlling a display module corresponding to the respective vehicle to display a launch interaction upon the launch signal being provided to the respective vehicle.

12. An intersection navigation module included in a transportation vehicle communicating with other intersection navigation modules in other vehicles, comprising:

at least one processor programmed to execute software that actively coordinates with the other intersection navigation modules included in the other vehicles by sharing data that facilitate agreement regarding a sequence of controlled movement of the transportation vehicle and the other vehicles through a four-way stop intersection; and at least one transceiver coupled to the at least one processor that transmits the shared data to the other intersection navigation modules included in the other vehicles via Vehicle-to-Everything messaging technology, wherein the sequence of controlled movement of the transportation vehicle and the other vehicles, corresponding to three vehicles consisting of first, second and third vehicles, being coordinated by allocating to the three vehicles respective sequence numbers specifying a launch sequence by the software executed in the at least one processor performing a sequence of operations, including evaluating vehicle data as the three vehicles approach the four-way stop intersection, according to predefined approaching criteria from a respective direction, to determine a stop time at a predefined stop location and an intended direction of the three vehicles, respectively, determining whether all of the three vehicles are turning right, upon determining that all of the three vehicles are turning right, assigning the base sequence number increased by 1 to all of the respective sequence numbers of the three vehicles, upon determining that all of the three vehicles are not turning right; obtaining a first collision parameter by comparing the intended direction and the stop location of the first and second vehicles, respectively, upon determining that no conflict might occur between the first and second vehicles based on the first collision parameter, assigning the base sequence number increased by 1 to the respective sequence numbers of the first and second vehicles, and the base sequence number increased by 2 to the respective sequence number of the third vehicle, upon determining that conflict might occur between the first and second vehicles, obtaining a second collision parameter by comparing the intended direction and the stop location of the first and third vehicles, respectively, upon determining that no conflict might occur between the first and third vehicles based on the second collision parameter, assigning the base sequence number increased by 1 to the respective sequence numbers of the first and third vehicles, and the base sequence number increased by 2 to the respective sequence number of the second vehicle, upon determining that conflict might occur between the first and third vehicles based on the second collision parameter, obtaining a third collision parameter by comparing the intended direction and the stop location of the second and third vehicles, respectively, upon determining that no conflict might occur between the second and third vehicles based on the third collision parameter, assigning the base sequence number increased by 1 to the respective sequence numbers of the second and third vehicles, and the base sequence number increased by 2 to the respective sequence number of the first vehicle, and upon determining that conflict might occur between the second and third vehicles based on the third collision parameter, specifying the launch sequence of the three vehicles depending on ascending stop times of the three vehicles, so that an earliest vehicle, among the three vehicles, which was first in time to stop at the four-way stop intersection, is provided with a launch signal first, and wherein the at least one processor controls the transportation vehicle based on the launch sequence.

13. The intersection navigation module according to claim 12, wherein at least one transceiver further communicates with a stationary unit configured to support vehicle coordination through the four-way stop intersection.

14. A non-transitory computer readable medium having stored thereon machine readable instructions executable to cause an intersection navigation module included in a transportation vehicle to perform operations comprising:

coordinating with other intersection navigation modules included in other vehicles to share data to facilitate agreement regarding a sequence of controlled movement of the transportation vehicle and the other vehicles corresponding to four vehicles, consisting of first, second, third and fourth vehicles, through a four-way stop intersection;

transmitting shared data to the other intersection navigation modules included in the other vehicles via Vehicle-to-Everything messaging technology, wherein the coordinating includes evaluating vehicle data as the four vehicles approach the four-way stop intersection, according to predefined approaching criteria from a respective direction, to determine a stop time at a predefined stop location and an intended direction of the four vehicles, respectively, and allocating to the four vehicles respective numbers specifying a launch sequence by following a sequence of operations, including determining whether all of the four vehicles are turning right, upon determining that all of the four vehicles are turning right, assigning the base sequence number increased by 1 to respective sequence numbers of the four vehicles, upon determining that all of the four vehicles are not turning right, determining whether the first, second and third vehicles are turning right, upon determining that the first, second and third vehicles are turning right, assigning the base sequence number increased by 1 to the respective sequence number of the first, second and third vehicles, and assigning the base sequence number increased by 2 to the respective sequence number of the fourth vehicle, upon determining that the first, second vehicle and third vehicles are not turning right, determining whether the first, second and fourth vehicles are turning right, upon determining that the first, second and fourth vehicles are turning right, assigning the base sequence number increased by 1 to the respective sequence number of the first, second and fourth vehicles, and assigning the base sequence number increased by 2 to the respective sequence number of the third vehicle, upon determining that the first, second vehicle and fourth vehicles are not turning right, determining whether the first, third and fourth vehicles are turning right, upon determining that the first, third and fourth vehicles are turning right, assigning the base sequence number increased by 1 to the respective sequence number of the first, third and fourth vehicles, and assigning the base sequence number increased by 2 to the respective sequence number of the second vehicle, upon determining that the first, third vehicle and fourth vehicles are not turning right, determining whether the second, third and fourth vehicles are turning right, upon determining that the second, third and fourth vehicles are turning right, assigning the base sequence number increased by 1 to the respective sequence number of the second, third and fourth vehicles, and assigning the base sequence number increased by 2 to the respective sequence number of the first vehicle, upon determining that the second, third and fourth vehicles are not turning right, obtaining a first collision parameter by comparing the intended direction and the stop location of the first and second vehicles, respectively, upon determining that no conflict might occur between the first and second vehicles based on the first collision parameter, assigning the base sequence number increased by 1 to the respective sequence number of the first and second vehicles, obtaining a second collision parameter by comparing the intended direction and the stop location of the third and fourth vehicles, respectively, upon determining that no conflict might occur between the third and fourth vehicles based on the second collision parameter, assigning the base sequence number increased by 2 to the respective sequence number of the third and fourth vehicles, and upon determining that conflict might occur between the third and fourth vehicles based on the second collision parameter, assigning to the third vehicle the base sequence number increased by 2 and assigning to the fourth vehicle the base sequence number increased by 3, upon determining that conflict might occur between the first and second vehicles based on the first collision parameter, obtaining a third collision parameter by comparing the intended direction and the stop location of the first and third vehicles, respectively, upon determining that no conflict might occur between the first and third vehicles based on the third collision parameter, assigning the base sequence number increased by 1 to the first and third vehicles, obtaining a fourth collision parameter by comparing the intended direction and the stop location of the second and fourth vehicles, respectively, upon determining that no conflict might occur between the second and fourth vehicles based on the fourth collision parameter, assigning the base sequence number increased by 2 to the second and fourth vehicles, and upon determining that conflict might occur between the second and fourth vehicles based on the fourth collision parameter, assigning the base sequence number increased by 2 to the second vehicle and the base sequence number increased by 3 to the fourth vehicle;

upon determining that conflict might occur between the first and third vehicles based on the third collision parameter, obtaining a fifth collision parameter by comparing the intended direction and the stop location of the first and fourth vehicles, upon determining that no conflict might occur between the first and fourth vehicles based on the fifth collision parameter, assigning the base sequence number increased by 1 to the first and fourth vehicles, obtaining a sixth collision parameter by comparing the intended direction and the stop location of the second and third vehicles, respectively, upon determining that no conflict might occur between the second and third vehicles based on the sixth collision parameter, assigning the base sequence number increased by 2 to the second and third vehicles, and upon determining that conflict might occur between the second and third vehicles based on the sixth collision parameter, assigning the base sequence number increased by 2 to the second vehicle and the base sequence number increased by 3 to the third vehicle;

upon determining that conflict might occur between the first and fourth vehicles based on the fifth collision parameter, obtaining the sixth collision parameter by comparing the intended direction and the stop location of the second and third vehicles, respectively, upon determining that no conflict might occur between the second and third vehicles based on the sixth collision parameter, assigning the base sequence number increased by 1 to the second and third vehicles, assigning the base sequence number increased by 2 to the first vehicle and assigning the base sequence number increased by 3 to the fourth vehicle, and upon determining that conflict might occur between the second and third vehicles based on the sixth collision parameter, specifying a launch sequence of the four vehicles depending on ascending stop times of the four vehicles, so that an earliest vehicle, among the four vehicles which was first in time to stop at the four-way stop intersection, is provided with a launch signal first; and controlling the transportation vehicle based on the launch sequence.

* * * * *